(12) United States Patent
Wheatley et al.

(10) Patent No.: US 11,708,962 B2
(45) Date of Patent: Jul. 25, 2023

(54) OPTICAL SYSTEM WITH SWITCHABLE DIFFUSER

(71) Applicant: 3M INNOVATIVE PROPERTIES COMPANY, St. Paul, MN (US)

(72) Inventors: John A. Wheatley, Lake Elmo, MN (US); Guanglei Du, Woodbury, MN (US); Kenneth A. Epstein, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/701,881

(22) Filed: Mar. 23, 2022

(65) Prior Publication Data
US 2022/0214027 A1  Jul. 7, 2022

Related U.S. Application Data

(63) Continuation of application No. 15/545,360, filed as application No. PCT/US2016/019506 on Feb. 25, 2016, now abandoned.
(Continued)

(51) Int. Cl.
*F21V 14/00* (2018.01)
*G02B 5/02* (2006.01)
(Continued)

(52) U.S. Cl.
CPC .......... *F21V 14/003* (2013.01); *G02B 5/0221* (2013.01); *G02B 5/0278* (2013.01);
(Continued)

(58) Field of Classification Search
CPC .......... G02F 1/133504; G02F 1/13756; G02F 1/133606; G02F 1/137; G02B 5/0221; G02B 5/0215; G02B 5/0278; F21V 14/003
See application file for complete search history.

(56) References Cited

U.S. PATENT DOCUMENTS 4,893,117 A  1/1990  Blomley
5,175,030 A  12/1992  Lu
(Continued)

FOREIGN PATENT DOCUMENTS

JP    2011197537    10/2011
KR    2011-0078614   7/2011
(Continued)

OTHER PUBLICATIONS

Kienle, "Determination of the scattering coefficient and the anisotropy factor from laser Doppler spectra of liquids including blood", Applied Optics, Jul. 1, 1996, vol. 25, No. 19, pp. 3404-3412.
(Continued)

*Primary Examiner* — Angela K Davison
(74) *Attorney, Agent, or Firm* — Clifton F. Richardson

(57) ABSTRACT

An optical system including a lighting component and a switchable diffuser in optical communication with the lighting component. The optical system may further include a low absorbing optical component. At least one outer surface of the switchable diffuser and/or the low absorbing optical component includes light redirecting structures. When the switchable diffuser is in a first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

20 Claims, 31 Drawing Sheets

Related U.S. Application Data

(60) Provisional application No. 62/128,742, filed on Mar. 5, 2015.

(51) Int. Cl.
   *G02F 1/1335* (2006.01)
   *G02F 1/133* (2006.01)
   *G02F 1/1334* (2006.01)
   *G02F 1/137* (2006.01)

(52) U.S. Cl.
   CPC ............ *G02F 1/137* (2013.01); *G02F 1/1334* (2013.01); *G02F 1/13306* (2013.01); *G02F 1/133504* (2013.01); *G02F 1/13756* (2021.01)

(56) References Cited

U.S. PATENT DOCUMENTS

| | | | |
|---|---|---|---|
| 5,183,597 | A | 2/1993 | Lu |
| 5,644,369 | A | 7/1997 | Jachimowicz |
| 5,831,698 | A | 11/1998 | Depp |
| 5,882,774 | A | 3/1999 | Jonza |
| 6,179,948 | B1 | 1/2001 | Merrill |
| 6,783,349 | B2 | 8/2004 | Neavin |
| 7,273,640 | B2 | 9/2007 | Laney |
| 7,532,800 | B2 | 5/2009 | Iimura |
| 7,699,516 | B1 | 4/2010 | Lee |
| 8,033,706 | B1 | 10/2011 | Kelly et al. |
| 8,300,304 | B2 | 10/2012 | Gally et al. |
| 2002/0033909 | A1 | 3/2002 | Hiyama et al. |
| 2003/0185011 | A1 | 10/2003 | Strazzanti |
| 2005/0259193 | A1 | 11/2005 | Sumiyoshi |
| 2006/0203336 | A1 | 9/2006 | Van Berkel |
| 2006/0256244 | A1 | 11/2006 | Jak |
| 2007/0053064 | A1* | 3/2007 | Kim .................... G02B 5/0278 359/599 |
| 2008/0151577 | A1 | 6/2008 | Li |
| 2009/0201571 | A1 | 8/2009 | Gally |
| 2010/0014027 | A1 | 1/2010 | Li |
| 2012/0038990 | A1 | 2/2012 | Hao |
| 2013/0321686 | A1 | 12/2013 | Tan |
| 2014/0078410 | A1 | 3/2014 | Wang |
| 2014/0313579 | A1 | 10/2014 | Liu |
| 2015/0029211 | A1 | 1/2015 | Weber |
| 2015/0131033 | A1 | 5/2015 | Min |
| 2015/0271482 | A1* | 9/2015 | Chen .................... G02B 6/0043 349/65 |

FOREIGN PATENT DOCUMENTS

| | | |
|---|---|---|
| WO | WO 2006-043196 | 4/2006 |
| WO | WO 2016-137773 | 9/2016 |

OTHER PUBLICATIONS

Walker, "Structured surfaces for active daylighting", Ixscient, Nov. 20, 2013, pp. 1-18.

International Search report for PCT International application No. PCT/US2016/019506 dated Jun. 14, 2016, 3 pages.

\* cited by examiner

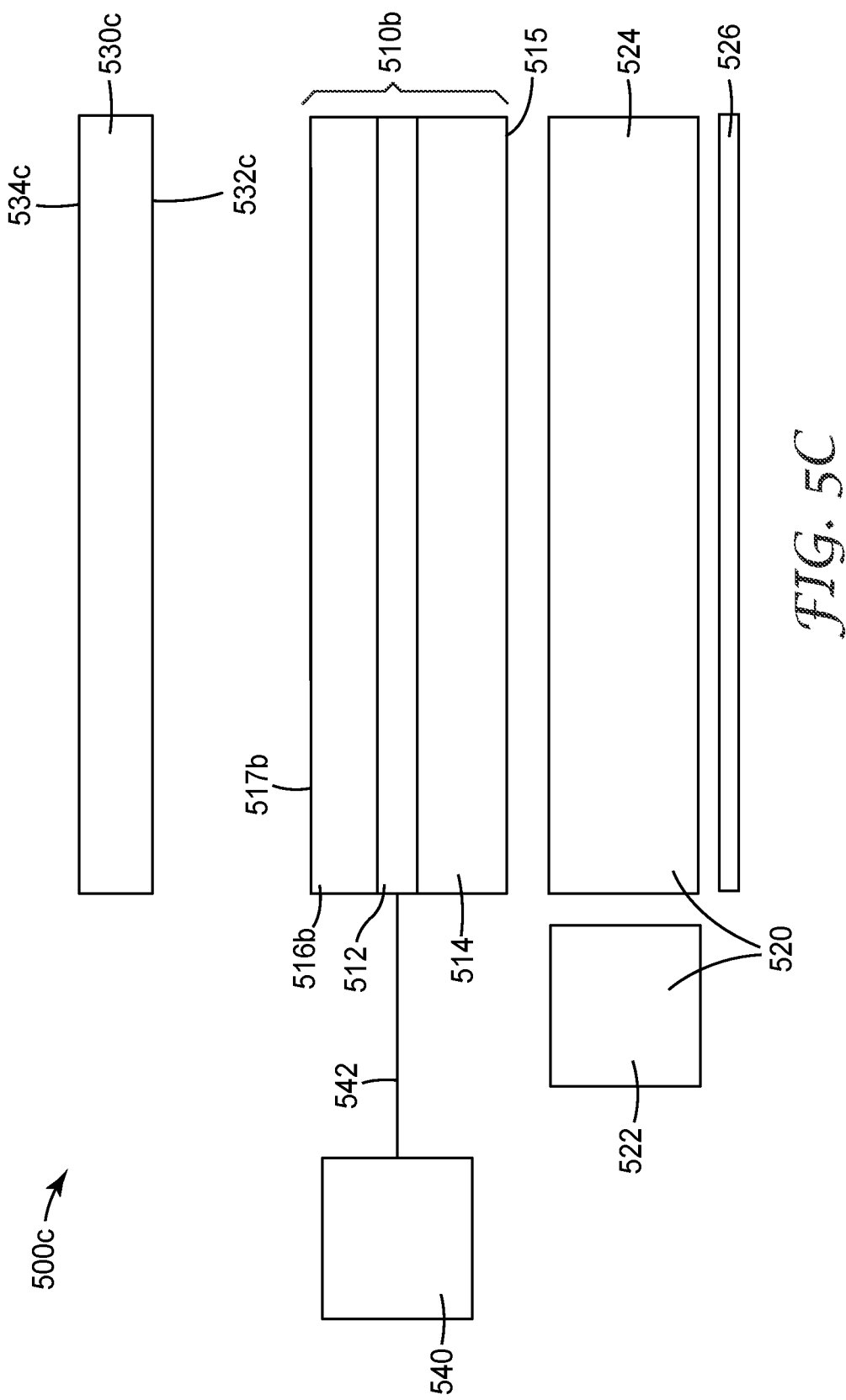

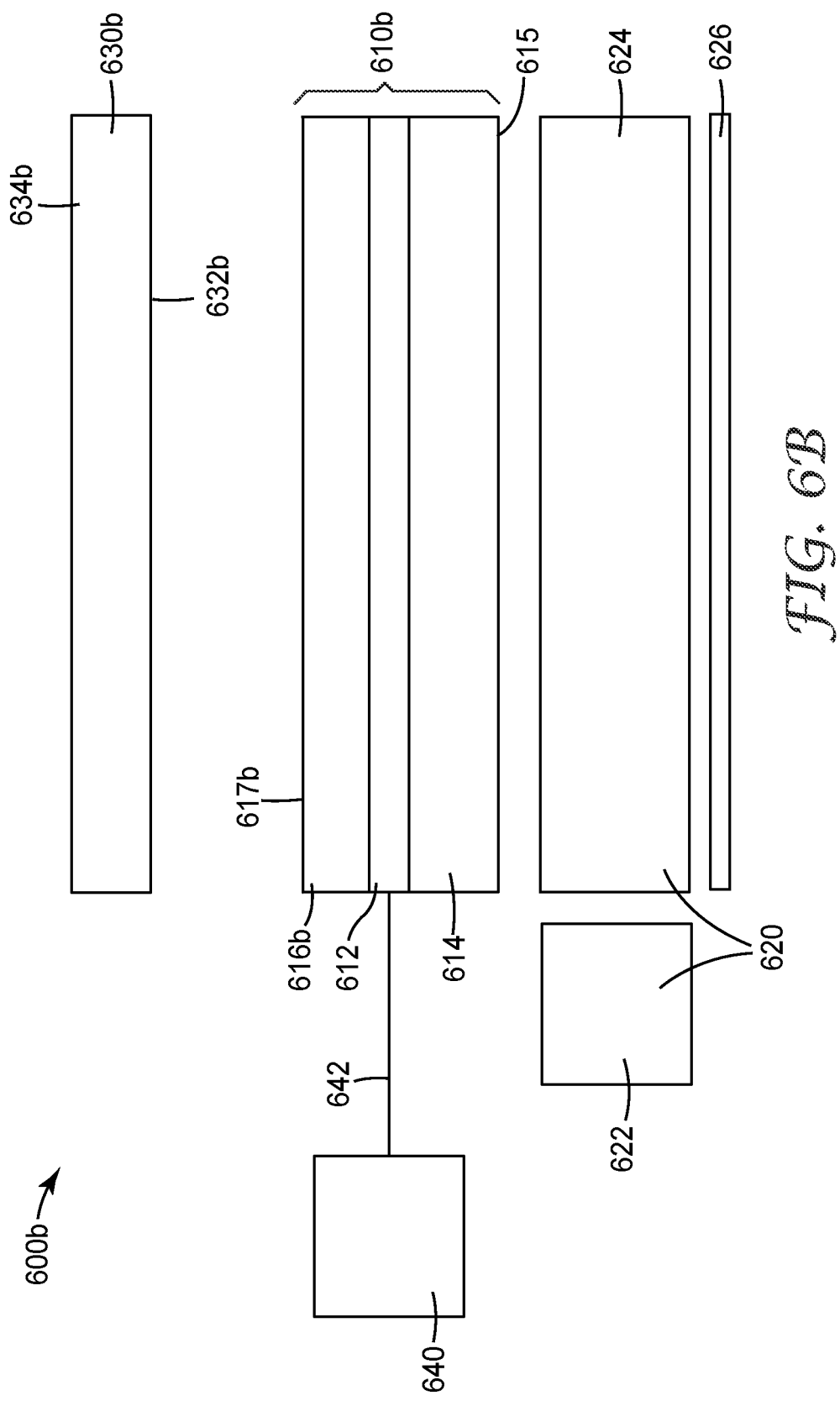

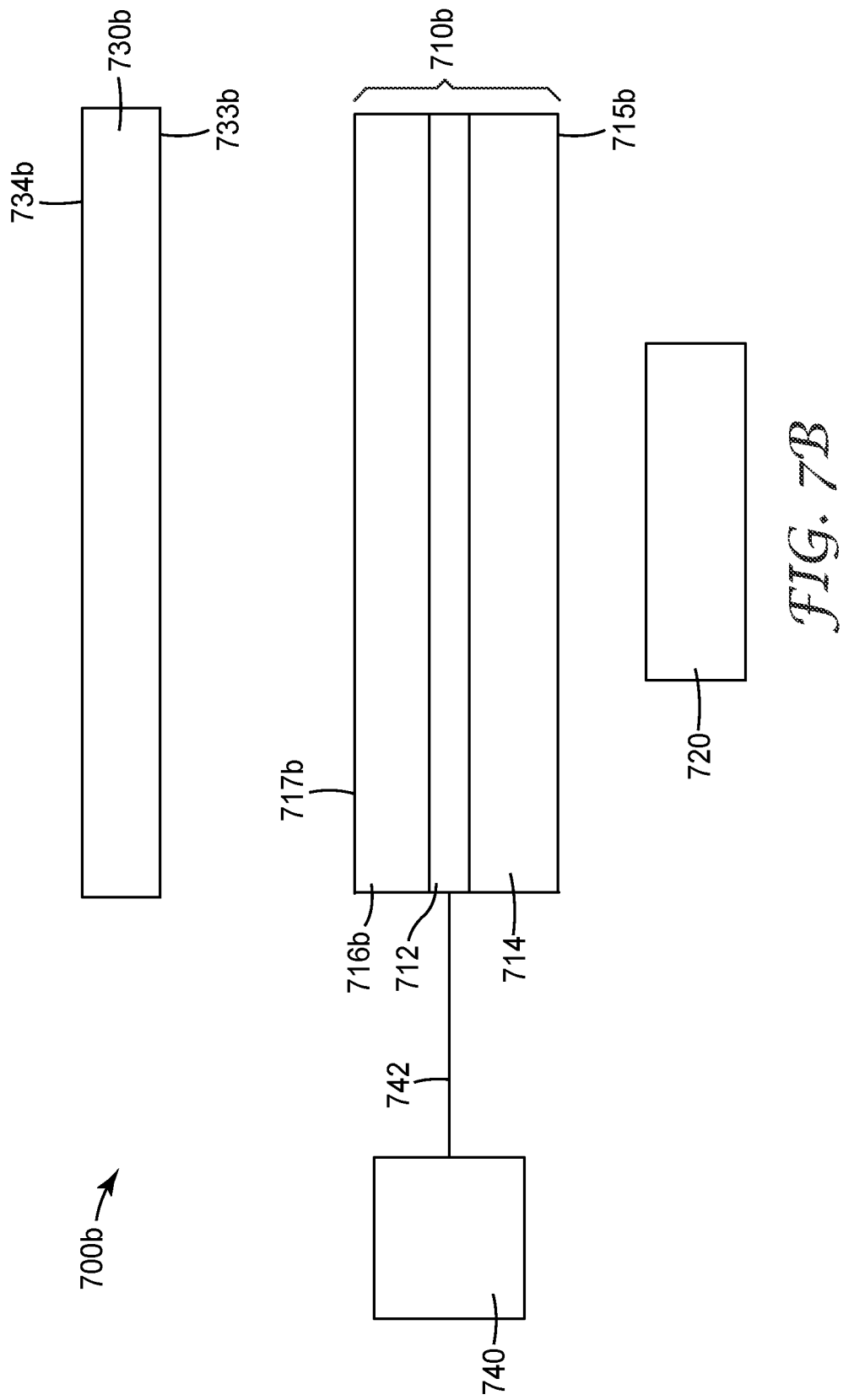

OPTICAL SYSTEM WITH SWITCHABLE DIFFUSER

CROSS REFERENCE TO RELATED APPLICATIONS

This application is a continuation of application Ser. No. 15/545,360, filed Jul. 21, 2017, which is a national stage filing under 35 U.S.C. 371 of PCT/US2016/019506, filed Feb. 25, 2016, which claims the benefit of Provisional Application No. 62/128,742, filed Mar. 5, 2015, the disclosures of which are incorporated by reference in their entirety herein.

BACKGROUND

Optical systems may include a diffuser to improve the uniformity of the light output. In some cases, it may be desirable to be able to electrically adjust the light output from an optical system and a switchable diffuser, which may include a polymer dispersed liquid crystal (PDLC) layer, can be used for this purpose.

SUMMARY

In some aspects of the present description, an optical system including a lighting component, a switchable diffuser in optical communication with the lighting component, and a low absorbing optical component in optical communication with the lighting component and in optical communication with the switchable diffuser is provided. The switchable diffuser has at least a first state and a second state. The first state is characterized by a first haze and the second state is characterized by a second haze different from the first haze. The low absorbing optical component includes opposing first and second outer surfaces where at least one of the first and second outer surfaces includes light redirecting structures. When the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

In some aspects of the present description, an optical system including a lighting component and a switchable diffuser in optical communication with the lighting component is provided. The switchable diffuser has at least a first state and a second state. The first state is characterized by a first haze and the second state is characterized by a second haze different from the first haze. The switchable diffuser includes an active layer disposed between a first outer layer and a second outer layer. The first outer layer has a first outer surface opposite the active layer and the second outer layer has a second outer surface opposite the active layer with the second outer layer facing the lighting component. At least one of the first and second outer surfaces includes light redirecting structures. When the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

In some aspects of the present description, an optical system including a lighting component, a switchable diffuser in optical communication with the lighting component, and a low absorbing optical component in optical communication with the lighting component and in optical communication with the switchable diffuser is provided. The switchable diffuser has at least a first state and a second state. The first state is characterized by a first haze and the second state characterized by a second haze different from the first haze. The switchable diffuser includes an active layer disposed between a first outer layer and a second outer layer. The first outer layer has a first outer surface opposite the active layer and the second outer layer has a second outer surface opposite the active layer. The low absorbing optical component includes opposing third and fourth outer surfaces. At least one of the first, second, third and fourth outer surfaces includes light redirecting structures. When the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

BRIEF DESCRIPTION OF THE DRAWINGS

FIG. 5C is a cross-sectional view of an otherwise equivalent optical system having a switchable diffuser without light redirecting structures and having a low absorbing optical component without light redirecting structures;

FIG. 6B is a cross-sectional view of an otherwise equivalent optical system having a switchable diffuser without the light redirecting structures and having a low absorbing optical component without the light redirecting structures;

FIG. 7B is a cross-sectional view of an otherwise equivalent optical system having a switchable diffuser without the light redirecting structures and having a low absorbing optical component without the light redirecting structures;

DETAILED DESCRIPTION

Figure 1A:
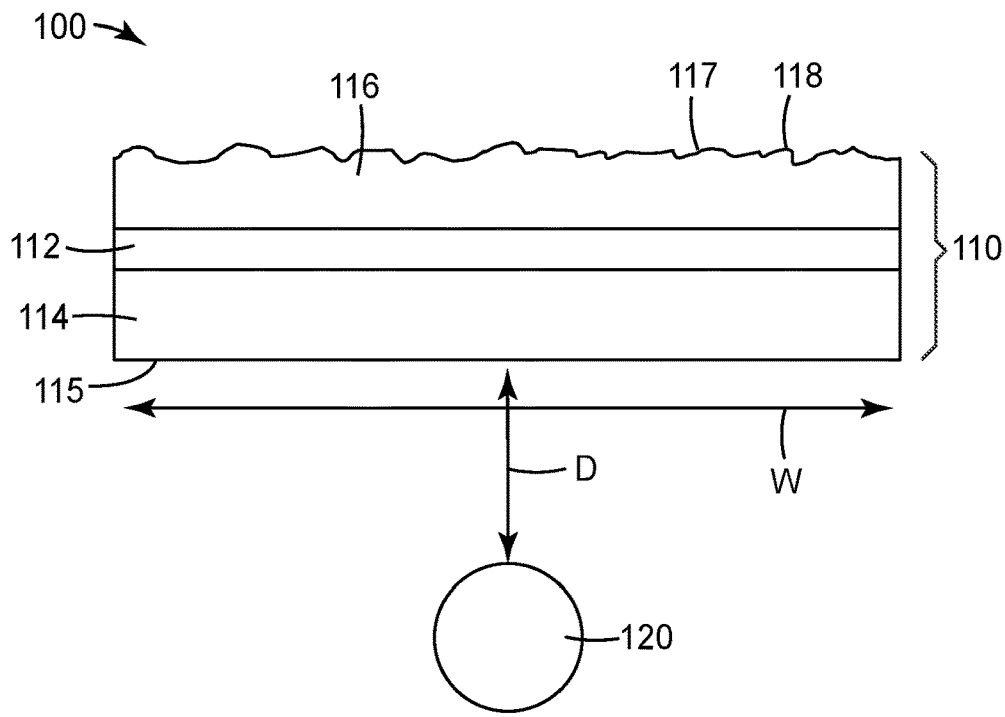
FIG. 1A is a schematic cross-sectional view of an optical system having a switchable diffuser including light redirecting structures.

In the following description, reference is made to the accompanying drawings that forms a part hereof and in which are shown by way of illustration. The drawings are not necessarily to scale. It is to be understood that other embodiments are contemplated and may be made without departing from the scope or spirit of the present description.

Optical systems that have electronically adjustable output distributions are sometimes desired. For example, it may be desirable to be able to switch between different types of lighting outputs of a luminaire, for example, in real time; that is, without the need to disassemble, reconfigure, and reassemble light fixtures, physically manipulate the lamp, or provide and install additional components. As another example, it may be desirable for a display or a sign to have a wide viewing angle mode and a narrow viewing angle mode. The light output of an optical system can be altered by disposing a diffuser in the light path. If the diffuser is an electrically switchable diffuser, the output of the optical system can be altered by electronically changing the state of the switchable diffuser.

It may be desired to include both a fixed diffuser and a switchable diffuser in an optical system. The fixed diffuser may be used to increase width of the angular distribution of the light from the optical system beyond what would be achievable with conventional electronically switchable diffusers. However, including a bulk diffuser can cause backscattering of light as it passes through the bulk diffuser leading to a less efficient optical system. According to the present description, it has been discovered that utilizing surface structures to provide diffusion in an optical system that incorporates a switchable diffuser can provide an unexpectedly high degree of forward scattering relative to any backscattering. As shown in the Examples, using surface structures to produce a given level of light spread (e.g., for a given FWHM of the output) can give a significantly higher transmission than using a bulk diffuser. The surface structures may be present on the switchable diffuser and/or may be present on an additional optical component, which may be a low absorbing optical component, included in the optical system.

Optical systems according to the present description include an electrically switchable diffuser and may include one or more low absorbing optical components. At least one outer surface of the switchable diffuser and any included low absorbing optical components include light redirecting structures configured to increase the full-width at half maximum (FWHM) of the light output of the optical system relative to an otherwise equivalent optical system that does not include the light redirecting structures. The FWHM refers to the angular distribution of the light output. The light redirecting structures may increase the FWHM by at least 5 degrees, or at least 7 degrees, or at least 10 degrees, or at least 15 degrees, or at least 20 degrees, and may increase the FWHM by as much as 45 degrees, or as much as 60 degrees, or as much as 90 degrees, or as much as 120 degrees, or as much as 150 degrees along at least one axis for at least one state (e.g., a lowest haze state) of the switchable diffuser.

An unstructured component that does not include light redirecting structures may be said to be otherwise equivalent to a structured component that includes light redirecting structures if the two components are composed of equivalent materials and have the same size (e.g., length, width and average thickness) and shape except for the light redirecting structures.

As used herein, "low absorbing" films or components are films or components that absorb less than about 20 percent of the luminous flux of an input light from standard illuminant E having a Lambertian angular distribution. Standard illuminant E is an equal-energy illuminant having a spectral power distribution that is constant over the visible wavelength range (380 nm-780 nm). In comparison, louver films, which are sometimes used in a system with a switchable diffuser, can absorb about 30% of the luminous flux of an input light from standard illuminant E having a Lambertian angular distribution. In some embodiments, low absorbing components or films are used that absorb less than about 15% or less than about 10% or even less than about 5% the luminous flux of an input light from standard illuminant E having a Lambertian angular distribution. Using low absorbing optical components can provide a desired level of efficiency of the optical systems.

In some embodiments, the switchable diffuser includes smectic A liquid crystals. A switchable diffuser including smectic A liquid crystals can have an on-axis haze of about 3% or less when the switchable diffuser is in a substantially clear state. In some cases the on-axis haze can be as low as 1%. In contrast, PDLC diffusers have an on-axis haze of greater than 5% when in their clearest state. The off-axis haze of a PDLC diffuser is significantly higher than 5% when in its clear state, while the off-axis haze of a smectic A diffuser remains low off axis. The maximum haze of smectic A switchable diffusers and PDLC switchable diffusers approach 100 percent. Haze can be defined as the percent of transmitted light that is scattered so that its direction deviates more than 2.5 degrees from the direction of the incident beam as specified in ASTM D1003-13 "Standard Test Method for Haze and Luminous Transmittance of Transparent Plastics". Haze can be determined using a HAZE-GARD PLUS meter available from BYK-Gardner Inc. (Silver Springs, Md.) which complies with the ASTM D1003-13 standard.

In some embodiments, the switchable diffusers used in the optical systems of the present description have a haze less than about 5 percent for all angles of incidence in the range of zero degrees (normal incidence) to about 85 degrees (e.g., glancing incidence) for at least one state of the switchable diffuser (e.g., a lowest haze state). In some embodiments, the switchable diffusers used in the optical systems of the present description include an active layer that has a haze less than about 5 percent for all angles of incidence in the range of zero degrees to about 85 degrees for at least one state of the switchable diffuser (e.g., a lowest haze state).

Use of a low-haze switchable diffuser, such as a smectic A switchable diffuser, with light redirecting structures that increase the FWHM of light output of an optical system can provide an unexpectedly high degree of forward scattering relative to any backscattering. The light redirecting structures may be on the surface of the diffuser and/or on the surface of a low absorbing optical component.

In some embodiments, the switchable diffuser has one or more independently addressable regions. In some embodiments, the switchable diffuser is "bistable". As used herein, a "bistable" switchable diffuser is an electrically switchable diffuser having one or more regions where each region has two or more states that are substantially stable. "Substantially stable" means that the states are maintained over a time period, such as hours or days, without a voltage applied across the switchable diffuser. In some embodiments, the switchable diffuser includes smectic A liquid crystal which is bistable. Electrically switchable diffusers using smectic A liquid crystal may have a substantially stable substantially clear state, and a plurality of substantially stable hazy states that can be characterized by the haze value in the various hazy states.

The state of a switchable diffuser may be characterized by a haze of the active layer of the switchable diffuser. A first switchable diffuser having an outer surface that includes light redirecting elements may have an overall haze higher than that of an otherwise equivalent second switchable diffuser that does not include light redirecting elements but that has an equivalent active layer in the same state as that the first switchable diffuser.

As described elsewhere, the spectral output of the optical systems can be altered by using a switchable diffuser having independently addressable regions and using a plurality of LEDs with locations related to the independently addressable regions. Also as described elsewhere, the polarization distribution of the output of the optical systems can be altered by incorporating polarization selective components such as a reflective polarizer at a major surface of an optical volume of the optical system. By suitably arranging the switchable diffuser and any low absorbing optical component(s) included in the optical system, the angular distribution, the spectral distribution (e.g., color output), and/or the polarization distribution of the light output of the optical system can be changed depending on the state of the switchable diffuser.

FIG. 1A is a schematic cross sectional view of optical system 100 including switchable diffuser 110 having an active layer 112, first outer layer 114 having first outer surface 115 opposite active layer 112, second layer 116 having second outer surface 117 opposite active layer 112. Second outer surface 117 includes light redirecting structures 118. Active layer 112 is disposed between first outer layer 114 and second outer layer 116. Active layer 112 may be a liquid crystal layer and may include smectic A liquid crystal. First and second outer layers 114 and 116 may be polymeric layers or may be glass layers or one of the outer layers may be a glass layer while the other is a polymeric layer. Optical system 100 further includes lighting component 120 in optical communication with switchable diffuser 110. Lighting component 120 may be any type of lighting component, such as one or more light emitting diodes (LEDs) or cold cathode fluorescent lamps (CCFLs), for example. The lighting components used in any of the optical systems of the present description may or may not include a light guide and may or may not include reflectors disposed to direct light in a desired direction. In some embodiments, the lighting component includes a light guide with a light source, such as LEDs, disposed to inject light into an edge of the light guide. Suitable light guides are described in US Pat. App. Pub. No. 2010/0014027 (Li et al.) and U.S. Pat. No. 7,532,800 (Iimura) and U.S. Pat. No. 7,699,516 (Lee). Switchable diffuser 110 has a first state characterized by a first haze and a second state characterized by a second haze different from the first haze.

In the illustrated embodiment, first outer surface 115 is unstructured while second outer surface 117 is structured. In other embodiments, first outer surface 115 is structured while second outer surface 117 is unstructured. In still other embodiments, both first and second outer surfaces 115 and 117 are structured. The structures provided by second outer surface 117 are light redirecting structures 118 configured to increase the full width at half-maximum (FWHM) of the light output of the optical system in at least one direction relative to that of an otherwise equivalent optical system that does not include the light redirecting structures. For example, the light redirecting structures 118 may increase the FWHM by at least 5 degrees, or at least 7 degrees, or at least 10 degrees, or at least 15 degrees, or at least 20 degrees, and may increase the FWHM by as much as 45 degrees, or as much as 60 degrees, or as much as 90 degrees, or as much as 120 degrees, or as much as 150 degrees along at least one direction when the switchable diffuser is in the first state, which may be a lowest haze state.

In any of the optical systems of the present description, it may be desirable to dispose the light redirecting structures such that an air interface is present at the light redirecting structures in order to maximize the effectiveness of the light redirecting structures. For example, an air interface may be present at second outer surface 117. In other embodiments, a layer of a low-index material is disposed on or over the light redirecting structures. As used herein, "low-index" material refers to a material having a refractive index less than or equal to about 1.45. As used herein, unless specified differently, "refractive index" refers to refractive index for light having a wavelength of 589 nm (sodium D line) at 25° C. In some embodiments, the low-index material is an optically clear adhesive having a refractive index less than or equal to about 1.45 or less than or equal to about 1.42 or less than or equal to about 1.41 or less than or equal to about 1.39. Suitable low-index optically clear adhesives include Norland Optical Adhesives 1315, 132, 138, 142, and 144 having refractive indices quoted by the manufacturer ranging from 1.315 to 1.44 (available from Norland Products, Cranbury, N.J.). In some embodiments, the low-index layer is an ultra low-index (ULI) layer having a refractive index less than about 1.3 or less than about 1.2 or even less than about 1.15, and may be as low as about 1.05. Suitable ULI materials include nanovoided materials such as those described in U.S. Pat. Appl. Pub. No. 2012/0038990 (Hao et al.).

The switchable diffuser 110 is spaced from the lighting component 120 by a distance D. The switchable diffuser 110 has a width W. The distance D can be less than about 20 times, or less than about 10 times, or less than about 5 times the width W and can be substantially zero.

Optical system 100 may further include a diffuser controller configured to change the state of the switchable diffuser 110. Alternatively, a diffuser controller may be disposed external to optical system 100. The diffuser controller may change the state of the switchable diffuser 110 in response to a sensor input or based on the setting of a switch, for example. The diffuser controller may provide diffuser control signals to the switchable diffuser 110 through a wired or wireless connection.

Figure 1B:
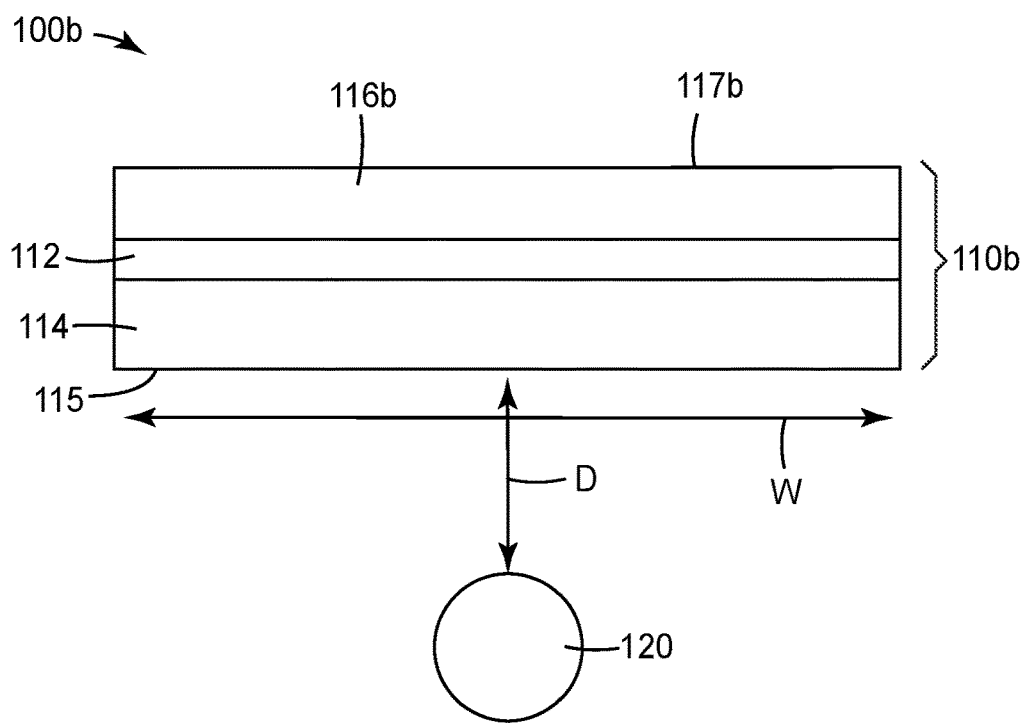
FIG. 1B is a schematic cross-sectional view of an otherwise equivalent optical system having a switchable diffuser without the light redirecting structures.

FIG. 1B is schematic cross sectional view of optical system 100b which is otherwise equivalent to optical system 100 except that the light redirecting structures 118 of second outer layer 116 are not present and instead optical system 100b includes a switchable diffuser 110b having a second outer layer 116b having second outer surface 117b which is unstructured. Second outer layer 116b is otherwise equivalent to second outer layer 116 of switchable diffuser 110 and switchable diffuser 110b is otherwise equivalent to switchable diffuser 110. Optical system 100 may have a FWHM along at least one axis and for at least one state of the switchable diffuser that is greater than the corresponding FWHM of optical system 100b by an amount in any of the ranges described elsewhere. For example, the FWHM of system 100 along a first axis when switchable diffuser 110 is in a first state may be greater than the FWHM of system 100b along the first axis when switchable diffuser 110b is in the corresponding first state by an amount in the range of 5 degrees to 150 degrees.

Figure 2A:
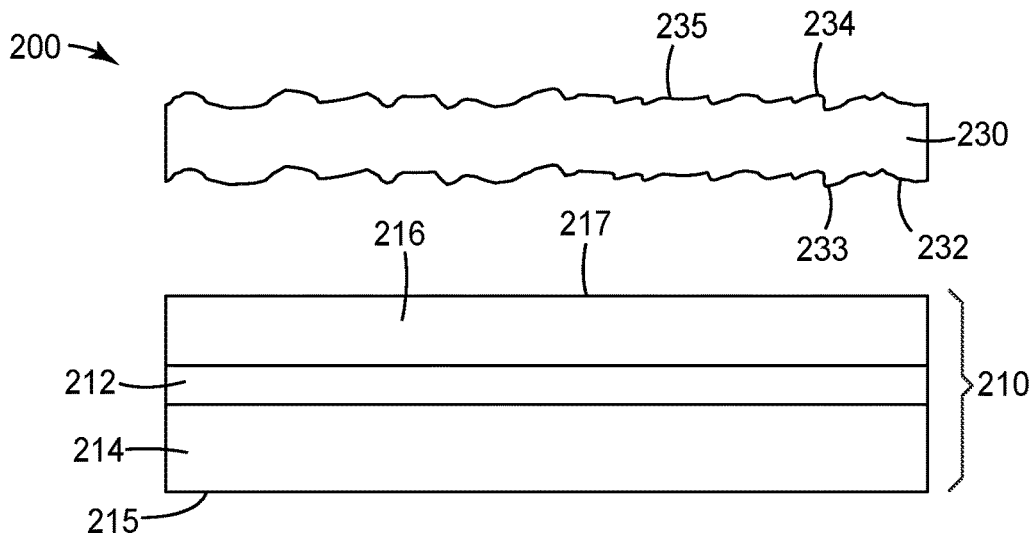
FIG. 2A is a schematic cross-sectional view of an optical system having a low absorbing optical component including light redirecting structures.
Figure 2A:
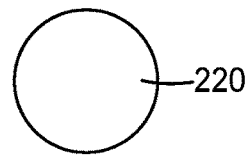

FIG. 2A is a schematic cross sectional view of optical system 200 including switchable diffuser 210 having an active layer 212, first outer layer 214 having first outer surface 215 opposite active layer 212, second layer 216 having second outer surface 217 opposite active layer 212. Active layer 212 is disposed between first outer layer 214 and second outer layer 216. Active layer 212 may be a liquid crystal layer and may include smectic A liquid crystal. First and second outer layers 214 and 216 may be polymeric layers or may be glass layers or one of the outer layers may be a glass layer while the other is a polymeric layer. Optical system 200 further includes lighting component 220 in optical communication with switchable diffuser 210 and with a light output direction facing first outer surface 215. Lighting component 220 may be any type of lighting component, such as one or more LEDs or CCFLs, for example. In the illustrated embodiment, first and second outer surfaces 215 and 217 are unstructured. Switchable diffuser 210 has a first state characterized by a first haze and a second state characterized by a second haze different from the first haze.

Optical system 200 further includes low absorbing optical component 230 having opposing first outer surface 232, which includes light redirecting structures 233, and second outer surface 234, which includes light redirecting structures 235. Low absorbing optical component 230 is in optical communication with lighting component 220 and with switchable diffuser 210. In the illustrated embodiment, both first and second outer surfaces 232 and 234 include light redirecting structures. In other embodiments, one of first and second outer surfaces 232 and 234 is unstructured. In still other embodiments, one, two, three or four of the first and second outer surfaces 232 and 234 of the low absorbing optical component 230 and the first and second outer surfaces 215 and 217 of the switchable diffuser 210 includes light redirecting structures. Low absorbing optical component 230 may be formed from a polymer or a glass layer.

Figure 2B:
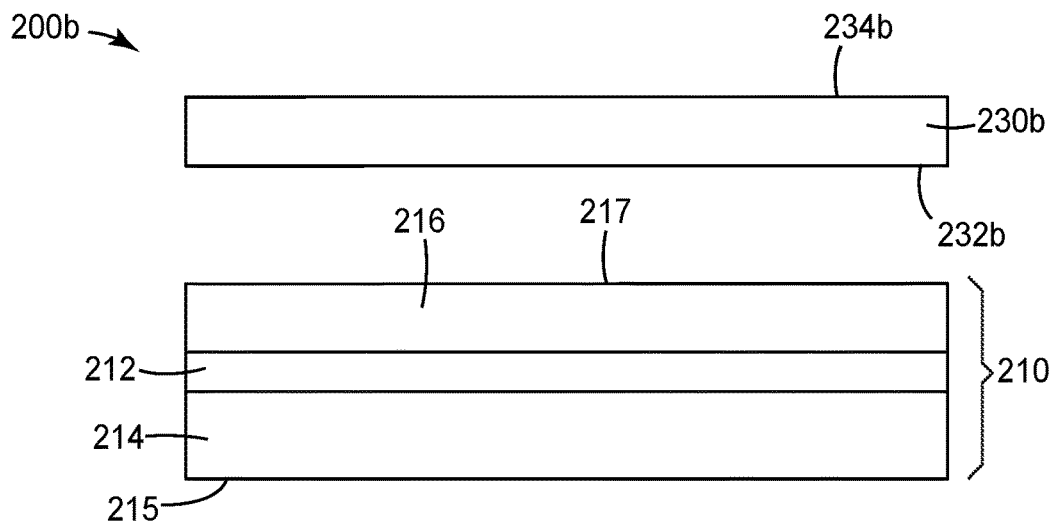
FIG. 2B is a schematic cross-sectional view of an otherwise equivalent optical system having a low absorbing optical component without the light redirecting structures.
Figure 2B:
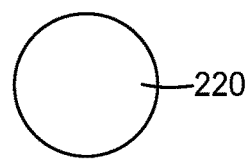

FIG. 2B shows optical system 200b which is otherwise equivalent to optical system 200 except that low absorbing optical component 230 has been replaced with low absorbing optical component 230b which includes unstructured outer surfaces 232b and 234b. In other words, optical system 200b is otherwise equivalent to optical system 200 except that light redirecting structures 233 and 235 are not included in optical system 200b.

The light redirecting structures 233 and 235 provided by outer surfaces 232 and 234, respectively, are configured to increase the full width at half-maximum (FWHM) of the light output of the optical system in at least one direction relative to that of otherwise equivalent optical system 200b that does not include the light redirecting structures 233 and 235. For example, the light redirecting structures 233 and 235 may increase the FWHM by at least 5 degrees, or at least 7 degrees, or at least 10 degrees, or at least 15 degrees, or at least about 20 degrees, and may increase the FWHM by as much as 45 degrees, or as much as 60 degrees, or as much as 90 degrees, or as much as 120 degrees, or as much as 150 degrees along at least one direction when the switchable diffuser 210 is in the first state, which may be a lowest haze state. An air interface or a low-index layer may be present at first and second outer surfaces 232 and 234.

Figure 3A:
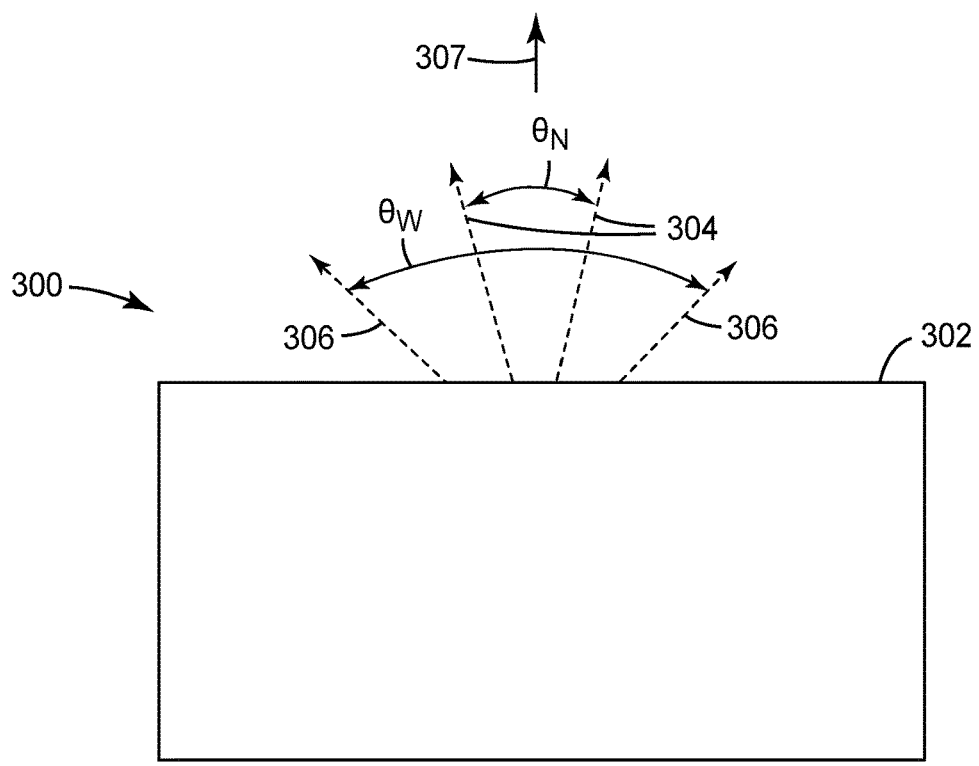
FIGS. 3A-3C are schematic side views of optical systems.

FIG. 3A is a schematic side view of optical system 300 having an output surface 302. Optical system 300, which may correspond to optical system 100 or optical system 200, includes a switchable diffuser and may include a low absorbing optical component and at least one outer surface of the switchable diffuser and/or the low absorbing optical component includes light redirecting structures. When the switchable diffuser is in a first state, which may be a lowest haze state, the light output of optical system 300 has a relatively narrow output distribution 304 having a full-width at half maximum of $\theta_N$. When the switchable diffuser is in a second state, which may be a high haze state, the light output of optical system 300 has a relatively wide output distribution 306 having a full-width at half maximum of $\theta_W$. The direction of average light output 307 of optical system 300 is substantially normal to output surface 302.

Figure 3B:
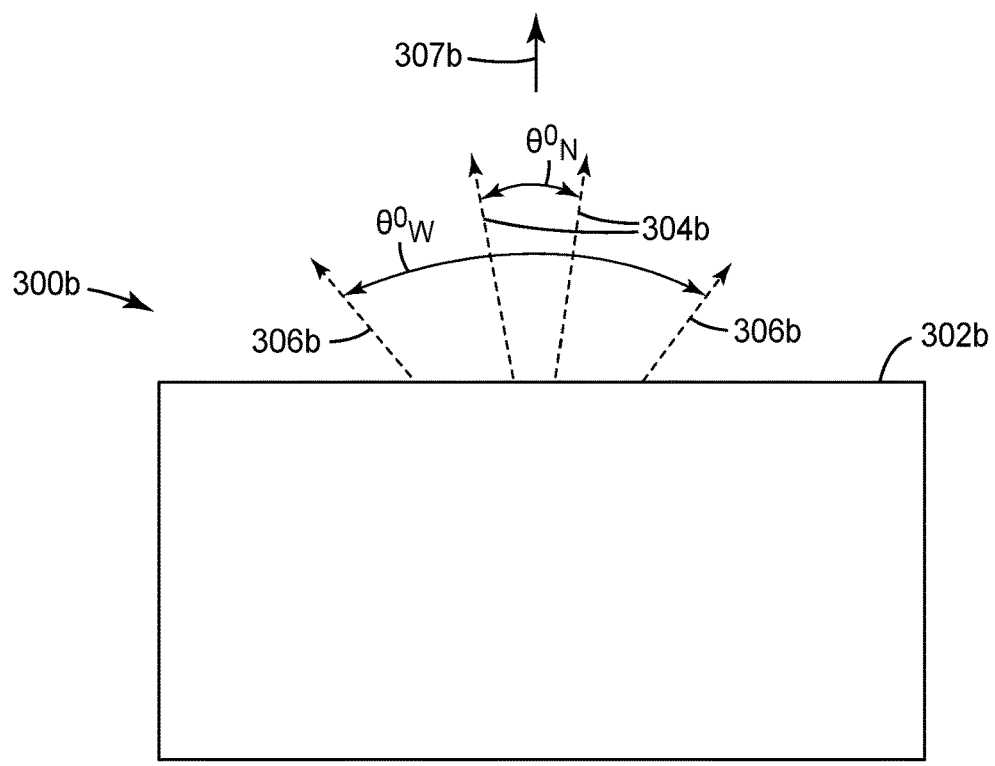

FIG. 3B is a schematic side view of optical system 300b having an output surface 302b. Optical system 300b is equivalent to optical system 300 except that each major surface of the switchable diffuser and the low absorbing optical component (if present) is replaced with substantially flat surfaces. That is, the light redirection structures are removed. When the switchable diffuser is in a first state, which may be a lowest haze state, the light output of optical system 300b has a relatively narrow output distribution 304b having a full-width at half maximum of $\theta^\circ_N$. When the switchable diffuser is in a second state, which may be a high haze state, the light output of optical system 300b has a relatively wide output distribution 306b having a full-width at half maximum of $\theta^\circ_W$. In some embodiments, $\theta_N$ is greater than $\theta^\circ_N$ by at least 5 degrees, or at least 7 degrees, or at least 10 degrees, or at least 15 degrees, or at least 20 degrees, and $\theta_N$ may be greater than $\theta^\circ_N$ by as much as 45 degrees, or as much as 60 degrees, or as much as 90 degrees, or as much as 120 degrees, or as much as 150 degrees, or even as much as 175 degrees. In some embodiments, $\theta_W$ is greater than $\theta^\circ_W$ by at least 5 degrees, or at least 7 degrees, or at least 10 degrees, or at least 15 degrees, or at least 20 degrees, and $\theta_W$ may be greater than $\theta^\circ_W$ by as much as 45 degrees, or as much as 60 degrees, or as much as 90 degrees, or as much as 120 degrees, or as much as 150 degrees, or even as much as 175 degrees. The direction of average light output 307b of optical system 300b is substantially normal to output surface 302b and is substantially the same as the direction of average light output 307 of optical system 300.

Figure 3C:
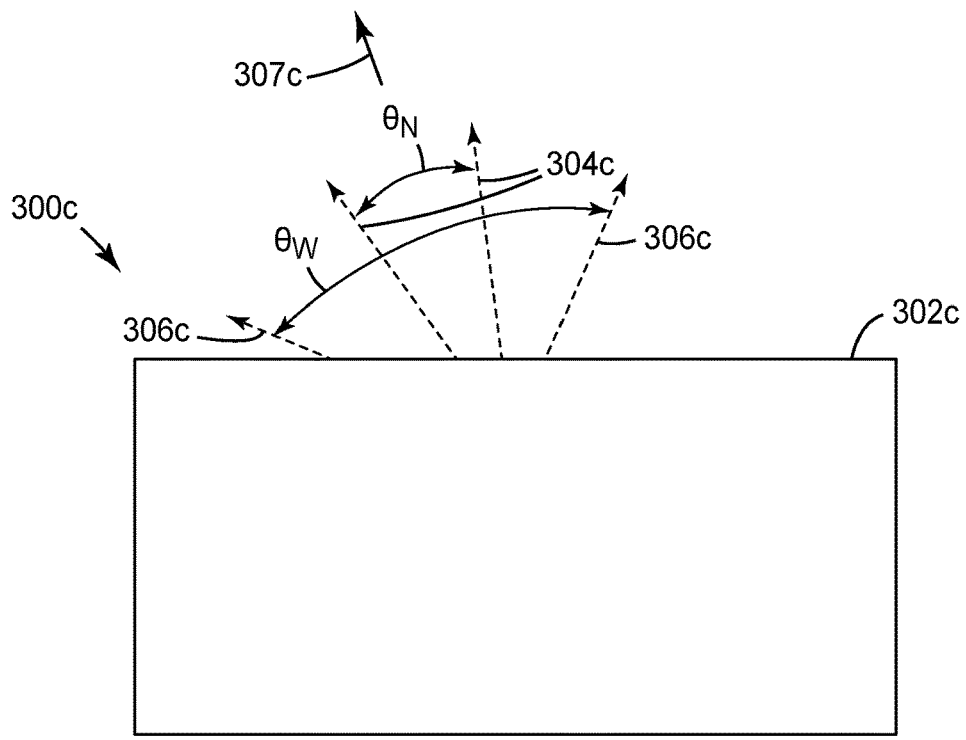

The optical systems of the present description may include light redirecting structures that change both a FWHM of the light output and the average direction of the light output. FIG. 3C is a schematic side view of optical system 300c having an output surface 302c. Optical system 300c includes a switchable diffuser and may include a low absorbing optical component and at least one outer surface of the switchable diffuser and/or the low absorbing optical component includes light redirecting structures. Optical system 300c may be equivalent to optical system 300 except for the arrangement of light redirecting structures and/or except for the placement or arrangement of the switchable diffuser and/or the low absorbing optical component. The output of an optical system that is otherwise equivalent to optical system 300c except without the light redirecting structures may have the same output distribution as optical system 300b. When the switchable diffuser is in a first state, which may be a lowest haze state, the light output of optical system 300c has a relatively narrow output distribution 304c having a full-width at half maximum of $\theta_N$. When the switchable diffuser is in a second state, which may be a high haze state, the light output of optical system 300c has a relatively wide output distribution 306c having a full-width at half maximum of $\theta_W$. The direction of average light output 307c of optical system 300c is different from that of optical system 300b.

In some embodiments the average light output direction depends on the state of the switchable diffuser. For example, if the switchable diffuser is disposed at an angle relative to an optical axis of the optical system, the average light output direction could be different when the switchable diffuser is in a high haze state from the average light output direction when the switchable diffuser is in a low haze state. In some embodiments, an average direction of the light output of the optical system when the switchable diffuser is in the first state is the same as an average direction of a light output of the otherwise equivalent optical system when the switchable diffuser is in the first state. In some embodiments, an average direction of the light output of the optical system when the switchable diffuser is in the first state is different from an average direction of a light output of the otherwise equivalent optical system when the switchable diffuser is in the first state. The light output directions may differ by at least 5 degrees or at least 10 degrees and can differ by as much as 60 degrees, as much as 80 degrees. The first state may be a lowest haze state of the switchable diffuser (e.g., a substantially clear state).

Figure 4A:
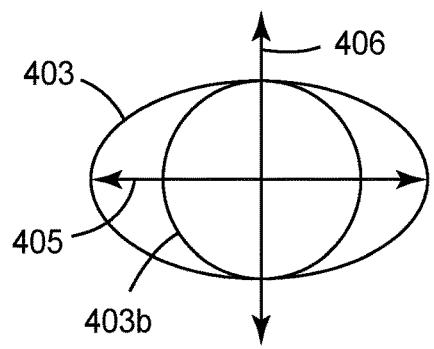
FIGS. 4A-4B schematically illustrate top views of light output distributions of optical systems.
Figure 4B:
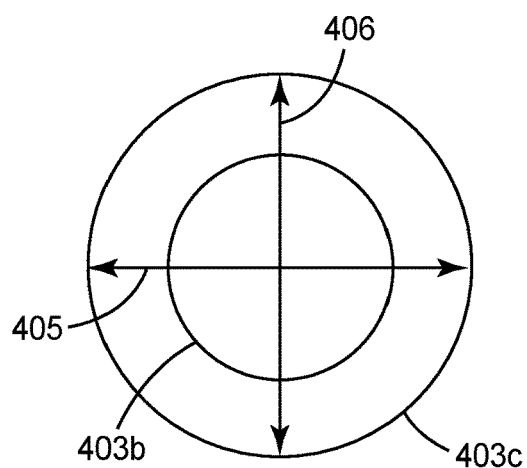

The light output of the optical systems of the present description may be axially symmetric or may be axially asymmetric. The light redirecting structures may increase the FWHM in one or two non-collinear (e.g., orthogonal) axes. FIG. 4A schematically illustrates a top view of the axially asymmetric FWHM output distribution 403 from an optical system having light redirecting structures configured to increase the FWHM along first axis 405 and not along non-collinear second axis 406. The otherwise equivalent optical system that does not have the light redirecting structures produces the axially symmetric FWHM output distribution 403b. FIG. 4B schematically illustrates a top view of the axially symmetric FWHM output distribution 403c from an optical system having light redirecting structures configured to increase the FWHM along first axis 405 and along non-collinear second axis 406. The otherwise equivalent optical produces the FWHM output distribution 403b.

Figure 5A:
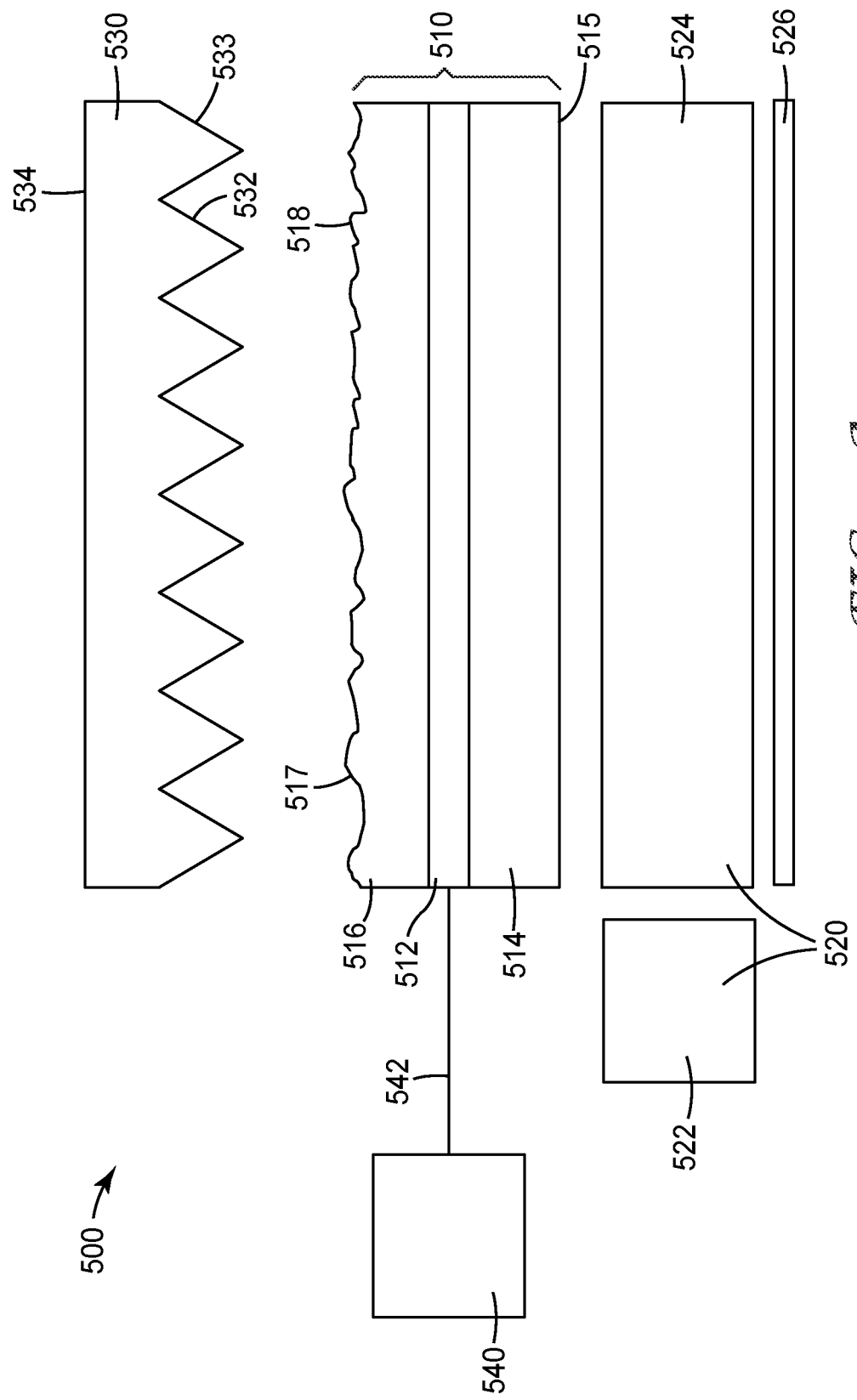
FIG. 5A is a cross-sectional view an optical system having a switchable diffuser including light redirecting structures and having a low absorbing optical component including light redirecting structures.

FIG. 5A is a schematic cross sectional view of optical system 500 including switchable diffuser 510 having an active layer 512, first outer layer 514 having first outer surface 515 opposite active layer 512, second layer 516 having second outer surface 517 opposite active layer 512. Active layer 512 is disposed between first outer layer 514 and second outer layer 516. Active layer 512 may be a liquid crystal layer and may include smectic A liquid crystal. First and second outer layers 514 and 516 may be polymeric layers or may be glass layers or one of the outer layers may be a glass layer while the other is a polymeric layer. Optical system 500 further includes lighting component 520 facing first outer surface 515. Lighting component 520 includes light source 522 and light guide 524. Light source 522 may be any type of lighting source, such as one or more LEDs or CCFLs, for example. A reflector 526 may be included adjacent light guide 524 to direct light that exits the light guide 524 opposite the switchable diffuser 510 back into light guide 524. Optical system 500 further includes a diffuser controller 540 which provides diffuser state data and diffuser control signals to switchable diffuser 510 on diffuser data channel 542.

Second outer surface 517 includes light redirecting structures 518 configured to increase the FWHM of the light output along at least one axis as described elsewhere.

Optical system 500 further includes low absorbing optical component 530 having opposing first outer surface 532 and second outer surface 534. In the illustrated embodiment, first outer surface 532 includes light redirecting structures 533 while second outer surface 534 is substantially unstructured. Low absorbing optical component 530, switchable diffuser 510 and lighting component 520 are in optical communication with each other. Light redirecting structures 533 may be prism elements configured to change an average output direction of light from optical system 500.

Figure 5B:
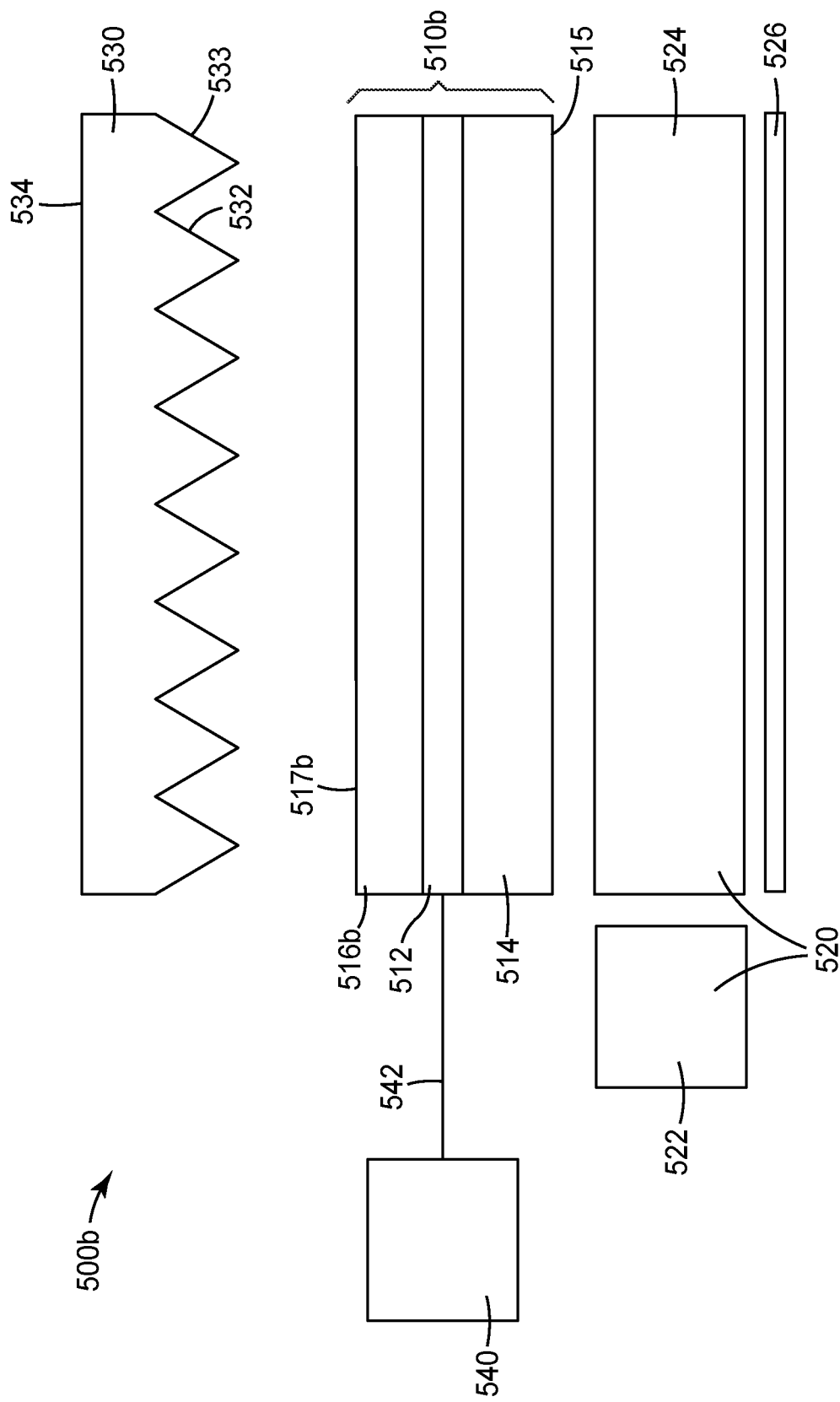
FIG. 5B is a cross-sectional view of an otherwise equivalent optical system having a switchable diffuser without light redirecting structures.

FIG. 5B is a schematic cross-sectional view of optical system 500b which is otherwise equivalent to optical system 500 except that the light redirecting structures 518 of second outer layer 516 are not included and instead second outer surface 517b of second outer layer 516b of switchable diffuser 510b is unstructured. In some embodiments, the FWHM of the light output of optical system 500 is greater than the FWHM of the light output of optical system 500b by at least 5 degrees, or at least 7 degrees, or at least 10 degrees, or at least 15 degrees, or at least 20 degrees, and may be greater by as much as 45 degrees, or as much as 60 degrees, or as much as 90 degrees, or as much as 120 degrees, or as much as 150 degrees along at least one axis for at least one state of the switchable diffuser.

FIG. 5C is a schematic cross-sectional view of optical system 500c which is otherwise equivalent to optical system 500 except that the light redirecting structures 518 of second outer layer 516 and light redirection structures 533 of low absorbing optical component 530 are not included. The switchable diffuser 510b of optical system 500c is equivalent to that of optical system 500b. Low absorbing optical component 530 of optical system 500 is replaced with low absorbing optical component 530c in optical system 500c. Low absorbing optical component 530c includes opposing first and second outer surfaces 532c and 534c. Low absorbing optical component 530c is equivalent to low absorbing optical component 530 except that first outer surface 532c is substantially unstructured. In some embodiments, the FWHM of the light output of optical system 500 is greater than the FWHM of the light output of optical system 500c by at least 5 degrees, or at least 7 degrees, or at least 10 degrees, or at least 15 degrees, or at least 20 degrees, and may be greater by as much as 45 degrees, or as much as 60 degrees, or as much as 90 degrees, or as much as 120 degrees, or as much as 150 degrees along at least one axis for at least one state of the switchable diffuser.

In the optical systems described herein, any of the opposing major surfaces of the switchable diffuser and/or a low absorbing optical component may include light redirecting structures at least some of which contribute to increasing the FWHM of light output of the optical system. In some embodiments, one or more surfaces include light redirecting elements configured to change the direction of light output in addition to or instead of increasing the FWHM of light output of the optical system.

Figure 6A:
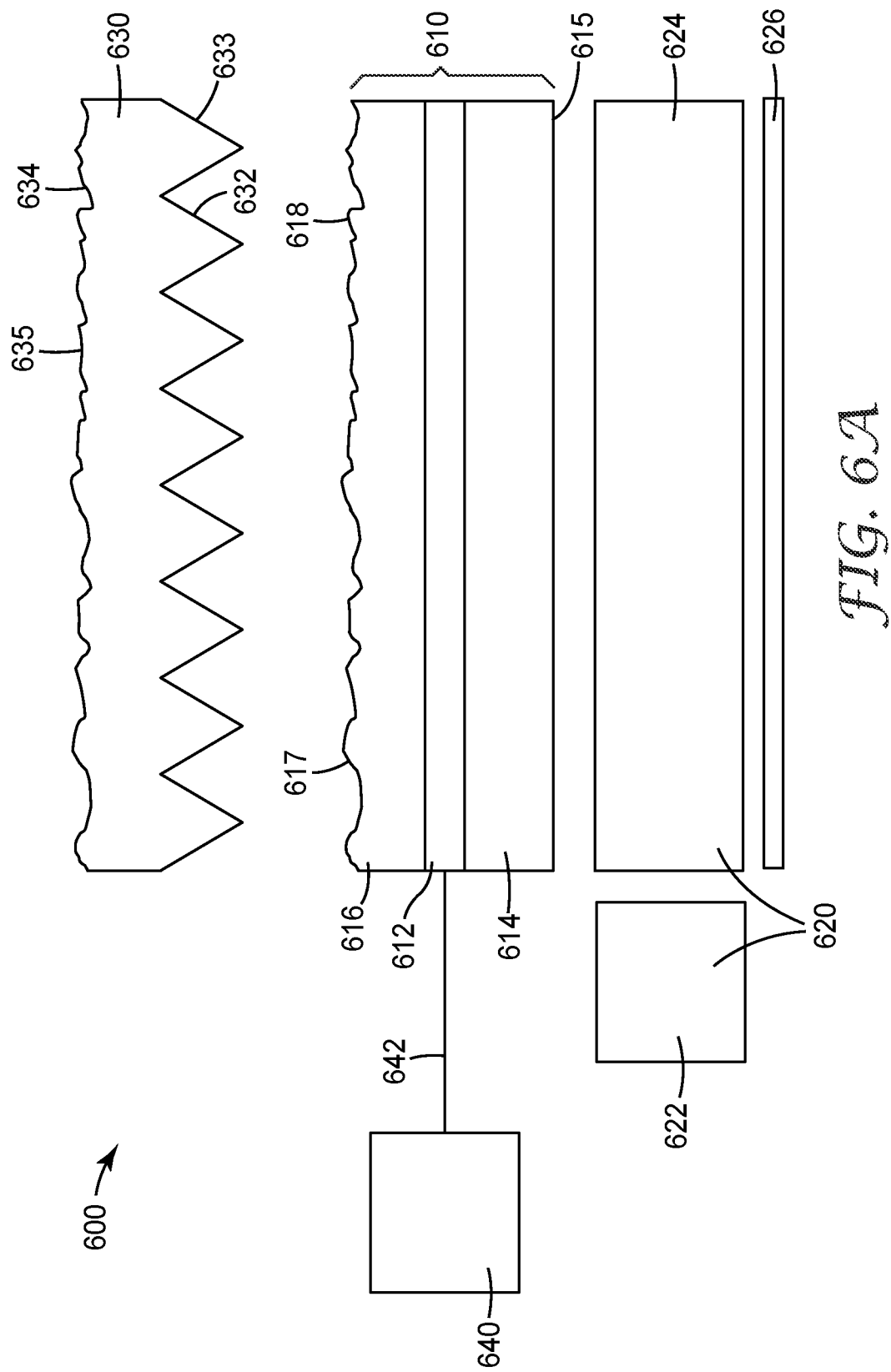
FIG. 6A is a cross-sectional view an optical system having a switchable diffuser including light redirecting structures and having a low absorbing optical component including light redirecting structures.

FIG. 6A is a schematic cross sectional view of optical system 600 including switchable diffuser 610 having an active layer 612, first outer layer 614 having first outer surface 615 opposite active layer 612, second layer 616 having second outer surface 617 opposite active layer 612. Active layer 612 is disposed between first outer layer 614 and second outer layer 616. Active layer 612 may be a liquid crystal layer and may include smectic A liquid crystal. First and second outer layers 614 and 616 may be polymeric layers or may be glass layers or one of the outer layers may be a glass layer while the other is a polymeric layer. Optical system 600 further includes lighting component 620 facing first outer surface 615. Lighting component 620 includes light source 622 and light guide 624. Light source 622 may be any type of lighting source, such as one or more LEDs or CCFLs, for example. A reflector 626 may be included adjacent light guide 624 to direct light that exits the light guide 624 opposite the switchable diffuser 610 back into light guide 624. Optical system 600 further includes a diffuser controller 640 which provides diffuser state data and diffuser control signals to switchable diffuser 610 on diffuser data channel 642.

Second outer surface 617 includes light redirecting structures 618 configured to increase the FWHM of the light output along at least one axis as described elsewhere. Optical system 600 further includes low absorbing optical component 630 having opposing first outer surface 632 and second outer surface 634. In the illustrated embodiment, first outer surface 632 includes a first set of light redirecting structures 633 while second outer surface 634 includes a second set of light redirecting structures 635. The first set of light redirecting structures 633 are configured to change an average light output direction of the optical system 600 while the second set of light redirecting structures 635 are configured to increase the FWHM of the light output along at least one axis as described elsewhere. Low absorbing optical component 630, switchable diffuser 610 and lighting component 620 are in optical communication with each other.

FIG. 6B is a schematic cross-sectional view of optical system 600b which is equivalent to optical system 600 except that the light redirecting structures 618 of switchable diffuser 610 are not included and the first and second set of light redirecting structures 633 and 635 of low absorbing optical component 630 are not included. Instead, switchable diffuser 610 has been replaced with switchable diffuser 610b which is equivalent to switchable diffuser 610 except that second layer 616 has been replaced with second layer 616b having second outer surface 617b which is unstructured, and low absorbing optical component 630 has been replaced with low absorbing optical component 630b which is equivalent to low absorbing optical component 630 except that first and second outer surfaces 632 and 634 have been replaced with first and second outer surfaces 632b and 634b, both of which are unstructured.

In some embodiments, the FWHM of the light output of optical system 600 is greater than the FWHM of the light output of optical system 600b by at least 5 degrees, or at least 7 degrees, or at least 10 degrees, or at least 15 degrees, or at least 20 degrees, and may be greater by as much as 45 degrees, or as much as 60 degrees, or as much as 90 degrees, or as much as 120 degrees, or as much as 150 degrees along at least one axis for at least one state of the switchable diffuser.

Figure 7A:
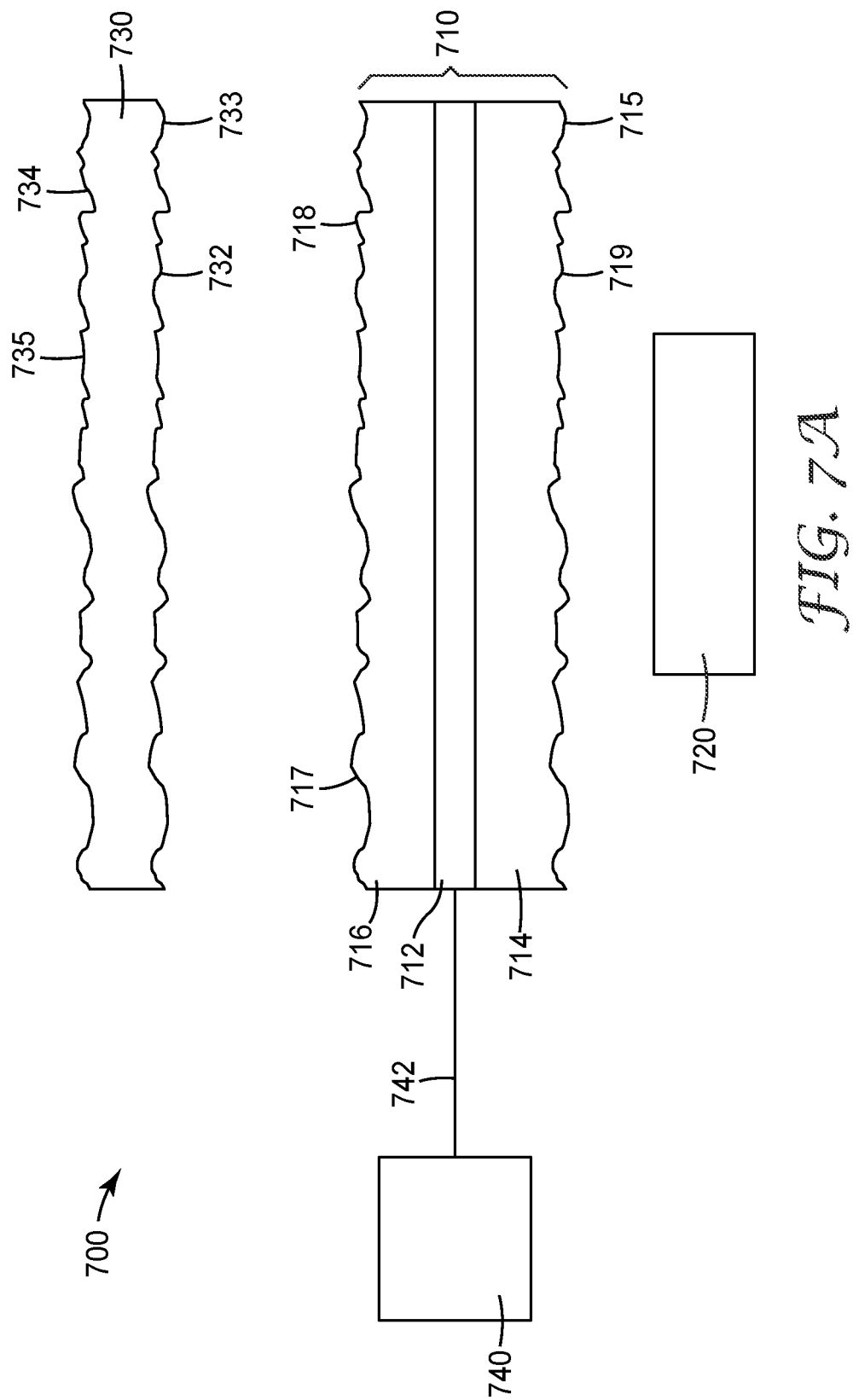
FIG. 7A is a cross-sectional view an optical system having a switchable diffuser including light redirecting structures and having a low absorbing optical component including light redirecting structures.

FIG. 7A is a schematic cross sectional view of optical system 700 including switchable diffuser 710 having an active layer 712, first outer layer 714 having first outer surface 715 opposite active layer 712, second layer 716 having second outer surface 717 opposite active layer 712. First outer surface 715 includes light redirecting structures 719 and second outer surface 717 includes light redirecting structures 718. Active layer 712 is disposed between first outer layer 714 and second outer layer 716 and may be a liquid crystal layer and may include smectic A liquid crystal. First and second outer layers 714 and 716 may be polymeric layers or may be glass layers or one of the outer layers may be a glass layer while the other is a polymeric layer. Optical system 700 further includes lighting component 720, schematically illustrated in FIG. 7A, facing first outer surface 715. Lighting component 720 may include one or more LEDs and may or may not include a reflector and may or may not include a light guide. Optical system 700 further includes a diffuser controller 740 which provides diffuser state data and diffuser control signals to switchable diffuser 710 on diffuser data channel 742.

Optical system 700 further includes low absorbing optical component 730 having opposing first outer surface 732 and second outer surface 734. First outer surface 732 includes light redirecting structures 733 and second outer surface 734 includes light redirecting structures 735. Light redirecting structures 719, 718, 733 and 735 are configured to increase the FWHM of the light output along at least one axis as described elsewhere. Low absorbing optical component 730, switchable diffuser 710 and lighting component 720 are in optical communication with each other.

FIG. 7B is a schematic cross-sectional view of optical system 700b which is equivalent to optical system 700 except that the light redirecting structures 718 and 719 of switchable diffuser 710 are not included and the light redirecting structures 733 and 735 of low absorbing optical component 730 are not included. Switchable diffuser 710 has been replaced with switchable diffuser 710b which is equivalent to switchable diffuser 710 except that first layer 714 has been replaced with first layer 714b having first outer surface 714b which is unstructured, and second layer 716 has been replaced with second layer 716b having second outer surface 717b which is unstructured. Similarly, low absorbing optical component 730 has been replaced with low absorbing optical component 730b which is equivalent to low absorbing optical component 730 except that first and second outer surfaces 732 and 734 have been replaced with first and second outer surfaces 732b and 734b, both of which are unstructured.

In some embodiments, the FWHM of the light output of optical system 700 is greater than the FWHM of the light output of optical system 700b by at least 5 degrees, or at least 7 degrees, or at least 10 degrees, or at least 15 degrees, or at least 20 degrees, and may be greater by as much as 45 degrees, or as much as 60 degrees, or as much as 90 degrees, or as much as 120 degrees, or as much as 150 degrees along at least one axis for at least one state (e.g., a first state which may be a substantially clear state or a lowest haze state) of the switchable diffuser.

The optical systems of the present description can be used in many different applications including lighting applications, displays, and signs. In some cases, a luminaire is provided that includes an optical system of the present description. In some cases, a display is provided that includes an optical system of the present description and that includes a display panel. The display panel may be any type of display panel; for example, a liquid crystal display (LCD) panel. In some cases, a sign is provided that includes an optical system of the present description. The sign may further include an LCD panel. Many different arrangements of the lighting component, the switchable diffuser, and the low absorbing optical components (if included) are possible. Some exemplary arrangements are shown in FIGS. 8 and 9.

Figure 8:
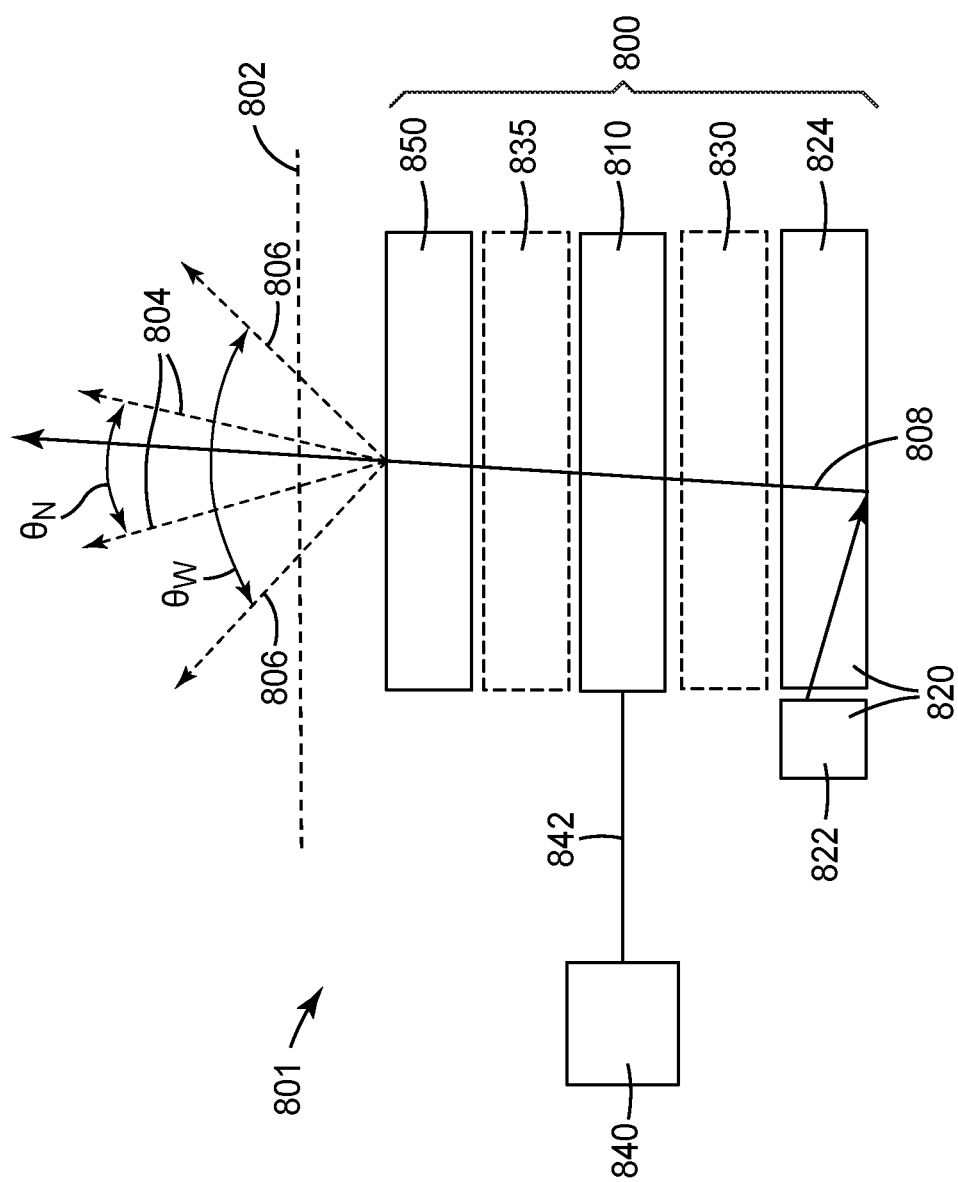
FIGS. 8-9 are schematic cross-sectional views of optical systems.
Figure 9:
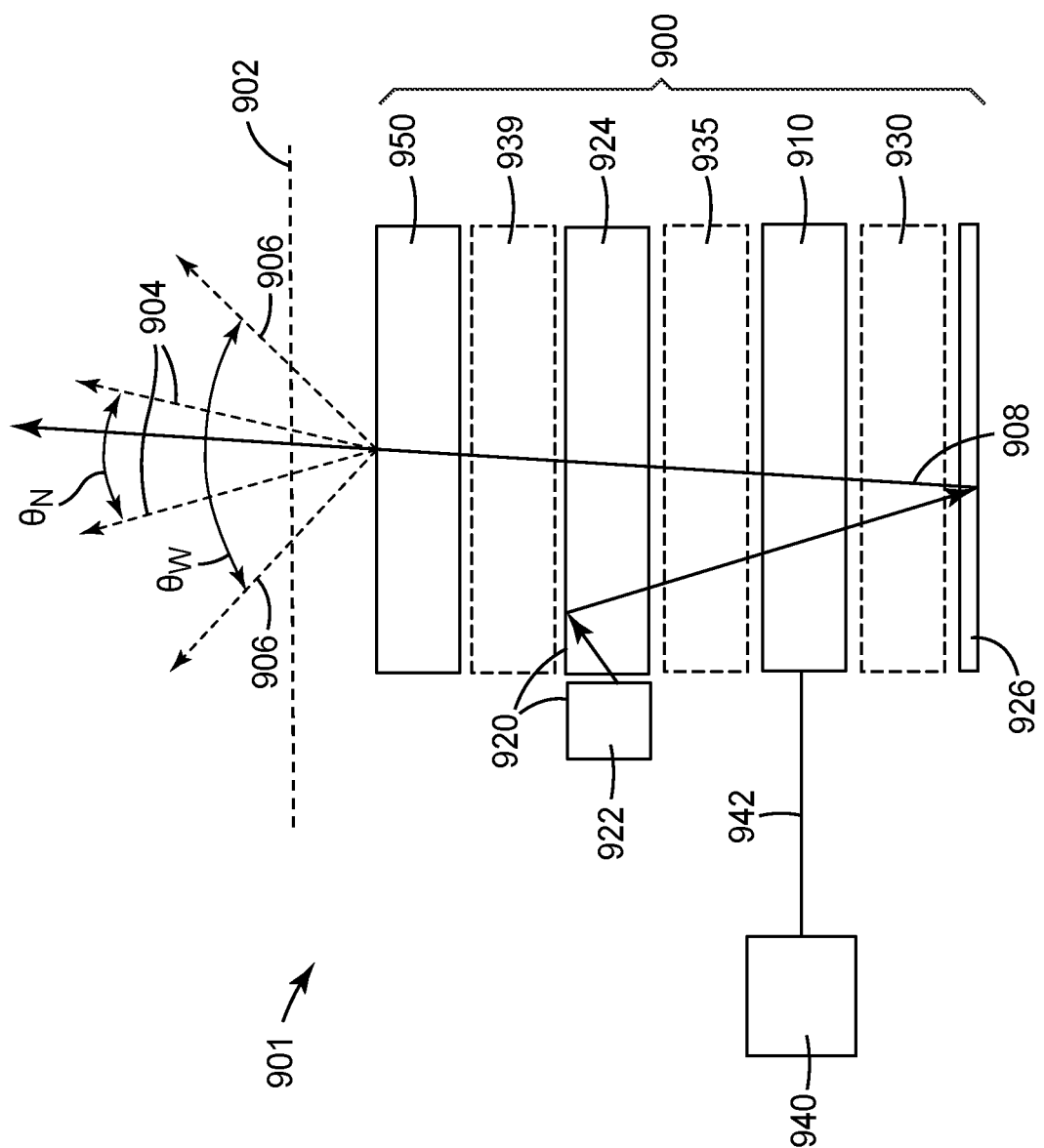

FIG. 8 is a schematic side view of optical system 801 that includes optical system 800, display panel 850 and output surface 802. Optical system 801 is capable of having a narrow viewing angle output 804 or a wide viewing angle output 806. Optical system 800 includes lighting component 820 that is capable of producing light having optical path 808. Optical system 800 includes electrically switchable diffuser 810 in optical communication with lighting component 820 and includes diffuser controller 840 which provides diffuser state data and diffuser control signals to switchable diffuser 810 on diffuser data channel 842. Lighting component 820 includes light source 822 and light guide 824. Lighting component 820 is disposed adjacent switchable diffuser 810 opposite output surface 802. Optical system 800 can also include optional optical component 830 and optional optical component 835. Optional optical components 830 and 835, if included, are in optical communication with lighting component 822 and in optical communication with switchable diffuser 810. Optional optical component 835 is adjacent the switchable diffuser 810 opposite the lighting component 820. Optional optical component 830 is adjacent the switchable diffuser 810 opposite output surface 802. Either or both of optional optical component 830 and 835 can be a single film or can be a stack of films which may be laminated together with an optically clear adhesive or may be stacked together with an air gap between layers. In some embodiments, optional optical component 830 is included and is a low-index layer. In some embodiments, optional optical component 830 is not included so that only an air gap separates switchable diffuser 810 and light guide 824. In some embodiments, either or both of optional optical components 830 and 835 are additional diffusers and may be surface diffusers or may be additional electrically switchable diffusers.

In some embodiments, when switchable diffuser 810 is in a first state, optical system 801 produces a narrow viewing angle output 804 having a characteristic viewing angle $\theta_N$ and when switchable diffuser 810 is in a second state, optical system 801 produces a wide viewing angle output 806 having a characteristic viewing angle $\theta_W$. The first state may be a clearest state of the switchable diffuser and the second state may be a high haze state. The characteristic viewing angle may be defined in terms of the output angular distribution of the intensity as the full width at half maximum. In some embodiments, optical system 800 has a first characteristic viewing angle along a first direction and a second characteristic viewing angle along a second direction different from the first direction. For example, optical system 800 may have an output with a narrow viewing angle in a vertical direction when switchable diffuser 810 is both the first and second states and may have a wide viewing angle output in a horizontal direction when switchable diffuser 810 is in a second state and a narrow viewing angle output in a horizontal direction when switchable diffuser 810 is in a first state. In other embodiments, optical system 800 may have a narrow viewing angle output in both a vertical and a horizontal direction when switchable diffuser 810 is in a first state and a wide viewing angle output in both a vertical and a horizontal direction when switchable diffuser 810 is in a second state.

Switchable diffuser 810 has opposing outer surfaces and each of optional optical components 830 and 835 has opposing outer surfaces. At least one of the outer surfaces of the switchable diffuser 810 and of the optional optical components 830 and 835, if present, includes light redirecting structures (not illustrated). The light redirection structures of optical system 800 are configured to increase the FWHM of the light output of optical system 800 or of optical system 801 relative to an otherwise equivalent optical system that does not include the light redirecting structures. The FWHM of the optical system 800 or 801 may be increased by an amount given in any of the ranges described elsewhere.

FIG. 9 is a schematic side view of optical system 901 that includes optical system 900, display panel 950 and output surface 902. Optical system 901 is capable of having a narrow viewing angle output 904 or a wide viewing angle output 906. Optical system 900 includes lighting component 920 that is capable of producing light having optical path 908. Optical system 900 includes electrically switchable diffuser 910 in optical communication with lighting component 920 and includes diffuser controller 940 which provides diffuser state data and diffuser control signals to switchable diffuser 910 on diffuser data channel 942. Lighting component 920 includes light source 922 and light guide 924. Lighting component 920 is disposed adjacent switchable diffuser 910 opposite output surface 902. Optical system 900 can also include optional optical component 930, optional optical component 935, and optional optical component 939. Optional optical components 930, 935 and 939, if included, are in optical communication with lighting component 922 and in optical communication with switchable diffuser 910. Optional optical component 930 is adjacent the switchable diffuser 910 opposite the lighting component 920. Optional optical component 935 is adjacent the switchable diffuser 910 opposite output surface 902. Optional optical component 939 is adjacent the lighting component 924 opposite the switchable diffuser 910. One or more of optional optical components 930, 935 and 939 can be a single film or can be a stack of films which may be laminated together with an optically clear adhesive or may be stacked together with an air gap between layers. In some embodiments, one or more of optional optical components 930, 935 and 939 are low-index layers. In some embodiments, optional optical components 930, 935 and 939 are not included. In some embodiments, one or more of optical components 930, 935 and 939 are additional diffusers and may be surface diffusers or may be additional electrically switchable diffusers.

In some embodiments, when switchable diffuser 910 is in a first state, optical system 901 produces a narrow viewing angle output 904 having a characteristic viewing angle $\theta_N$ and when switchable diffuser 910 is in a second state, optical system 901 produces a wide viewing angle output 906 having a characteristic viewing angle $\theta_W$. The first state may be a clearest state of the switchable diffuser and the second state may be a high haze state. In some embodiments, optical system 900 has a first characteristic viewing angle along a first direction and a second characteristic viewing angle along a second direction different from the first direction and in some embodiments the characteristic viewing angle is substantially the same in two orthogonal directions.

Switchable diffuser 910 has opposing outer surfaces and each of optional optical components 930, 935 and 939 has opposing outer surfaces. At least one of the outer surfaces of the switchable diffuser 910 and of the optional optical components 930, 935 and 939, if present, includes light redirecting structures (not illustrated). The light redirection structures of optical system 900 are configured to increase the FWHM of the light output of optical system 900 or of optical system 901 relative to an otherwise equivalent optical system that does not include the light redirecting structures. The FWHM of the optical system 900 or 901 may be increased by an amount given in any of the ranges described elsewhere.

The various components of the optical systems of the present description may be separated by an air gap or may be separated by a low-index layer. For example, light guide 924 may be attached to optional optical components 935 or 939 or may be attached to light guide 910 though a low-index adhesive layer.

Optical systems 801 or 901 may be used in various display applications. For example, optical systems 801 or 901 may be used in a computer display, a tablet display, or a phone display to provide wide and narrow viewing modes. As another example, optical systems 801 or 901 may be used in a sign to provide differing viewing modes depending on an advertisement or other content to be displayed or depending on other factors.

In some embodiments, the switchable diffuser is substantially parallel with the low absorbing optical component. In other embodiments, the switchable diffuser may be disposed at some angle relative to the low absorbing optical component. In some embodiments, one or both of the switchable diffuser and a low absorbing optical component may have a curved shape. In some embodiments, the switchable diffuser is disposed in an optical volume that includes one or more reflective or transflective outer surfaces. In some embodiments, at least a portion of the switchable diffuser and/or at least a portion of a low absorbing optical component has a normal direction that is not parallel to an optical axis of the optical volume. The normal direction of a component refers to the surface normal of the component if the surface is unstructured and in the case of a component with a structured surface, the normal direction refers to the surface normal of an otherwise equivalent component with the surface structure removed.

The optical axis of an optical volume having a light injection region (e.g., an input surface or a region containing a light source such as one or more LEDs) and an output surface refers to a line between the center of the light injection region and the center of the output surface. The light injection region, the output surface and the optical volume may or may not have any particular symmetry. The center of the light injection region may be defined as a centroid (geometric center of a volume or surface) of the light injection region and the center of the output surface may be defined as the centroid of the output surface. In this way, an optical axis can be defined for an optical volume even when the optical volume has no symmetry axis. In some embodiments, the optical axis is a symmetry axis of the optical volume. In some embodiments, the optical axis corresponds to an average light output direction of the optical volume when the switchable diffuser is in its clearest state.

Having a switchable diffuser or a low absorbing optical component with light redirecting structures having a normal that is not parallel to the optical axis and/or to the average light output direction has been found to aid in diffusion of the output light and may soften or spread high intensity regions (i.e., "hot spots") associated with one or more lighting components. In embodiments where the light source includes different color light emitting diodes (LEDs), such switchable diffuser geometries have been found to aid in mixing the different colors.

Figure 10:
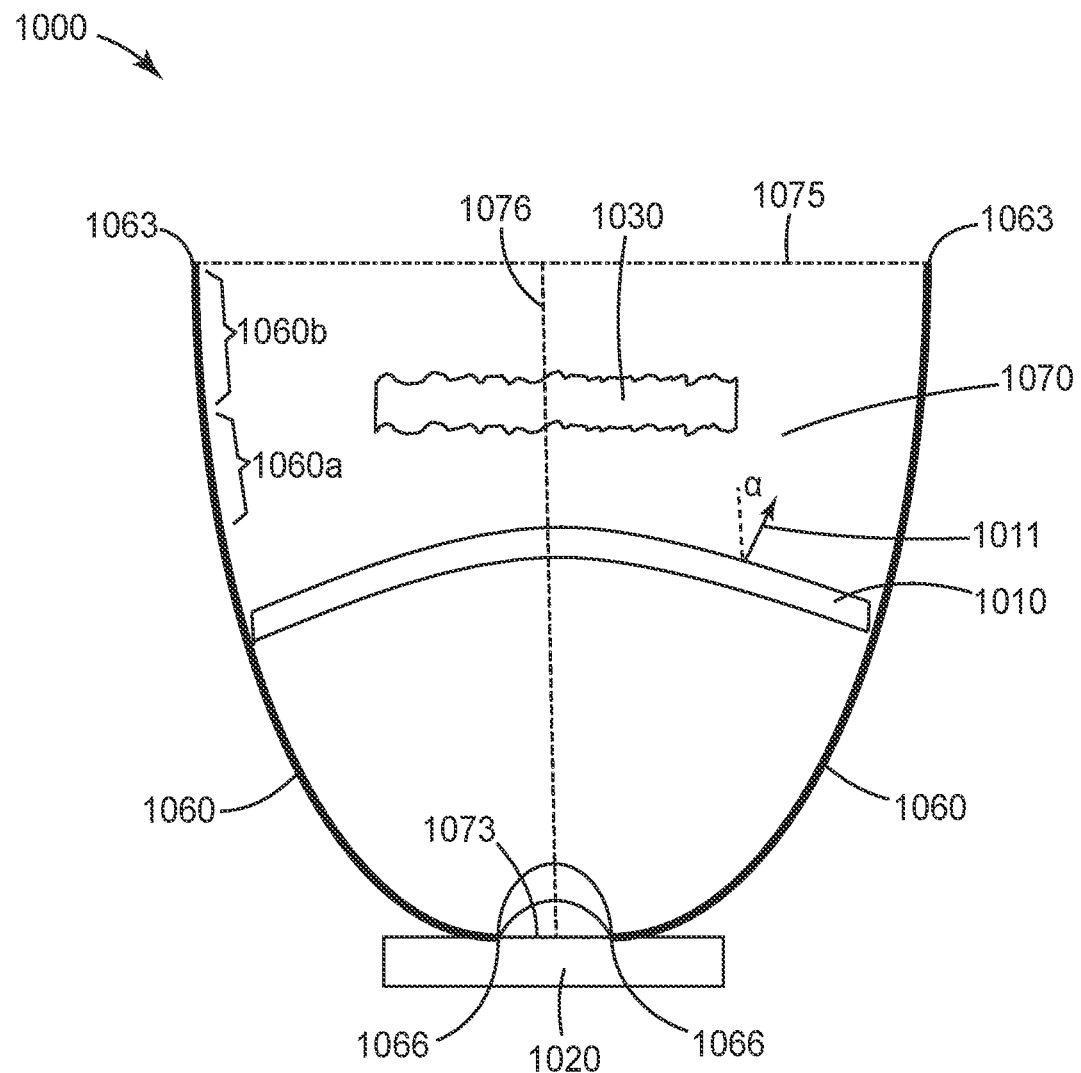
FIG. 10 is a cross-sectional view of an optical system.

FIG. 10 show a cross-sectional of optical system 1000 including switchable diffuser 1010 having normal vector 1011, lighting component 1020, low absorbing optical component 1030, reflective or transflective outer major surface 1060 having distal edge 1063 and proximal edge 1066, optical volume 1070, light injection region 1073, and output major surface 1075. As used herein, the terms distal and proximal refer to positions relative to a light injection region. Output major surface 1075 is a distal surface adjacent distal edge 1063 of reflective or transflective outer major surface 1060. Light injection region 1073 is adjacent proximal edge 1066 of reflective or transflective outer major surface 1060. In the illustrated embodiment, light injection region 1073 is an input surface of the optical volume 1070. In other embodiments, light injection region 1073 is a volume adjacent the proximal edge 1066 which contains a light source or light sources and/or optical elements such as a lens or lenses. The light source may include one or more light emitting diodes (LEDs) and may extend into the optical volume 1026. In the illustrated embodiment, switchable diffuser 1010 is disposed entirely in optical volume 1070. In other embodiments, a switchable diffuser may be only partially disposed in an optical volume. Output major surface 1075 may be a planar surface defined by distal edge 1063. For example, output major surface 1075 may be a planar region bounded by distal edge 1063. Similarly, light injection region 1073 may be a planar surface defined by proximal edge 1066. For example, light injection region 1073 may be a planar region bounded by proximal edge 1066. Low absorbing optical component 1030, switchable diffuser 1010 and lighting component 1020 are in optical communication with each other.

In the illustrated embodiment, low absorbing optical component 1030 has outer surfaces that include light redirecting structures configured to increase the FWHM of the light output of optical system 1000 in any of the ranges described elsewhere. In other embodiments, any one or more of the outer surfaces of low absorbing optical component 1030 and of switchable diffuser 1010 may include light redirecting structures configured to increase the FWHM of the light output of optical system 1000.

Lighting component 1000 has an optical axis 1076 which may coincide with a direction of average light output. In some embodiments, the direction of average light output is determined by a symmetry axis of the lighting component 1000. In some embodiments, the switchable diffuser 1010, the low absorbing optical component 1030, and/or the reflective or transflective outer major surface 1060 is asymmetric and the direction of average light output may depend on the state of the switchable diffuser 1010. In some embodiments, the output major surface 1075, which is a distal surface of the optical volume 1070, is substantially orthogonal to the direction of average light output of the optical volume 1070 when the switchable diffuser 1010 is in a substantially spatially uniform state, which may be a substantially clear state or may be a lowest haze state. In some embodiments, the output major surface 1075, is substantially orthogonal to the optical axis 1076. In some embodiments, switchable diffuser 1010 includes a normal direction 1011 which, in at least a portion of the switchable diffuser 1010, is not parallel to the optical axis 1076. This can occur when the switchable diffuser has a curved shape as illustrated in FIG. 10 or can occur with a flat switchable diffuser disposed in the lighting component 1000 at an angle α relative to the optical axis 1076. In other embodiments, the low absorbing optical component 1030 may have a normal direction, in at least a portion of the low absorbing optical component, is not parallel to optical axis 1076. The angle α between the normal direction 1011 and the optical axis 1076 (or between a normal direction of a low absorbing optical component and the optical axis 1076), may be greater than 10 degrees or greater than 20 degrees or greater than 30 degrees and may be less than or equal to 90 degrees, in at least some sections of the switchable diffuser (or in at least some sections of the low absorbing optical component). An angle greater than 90 degrees is equivalent to a complement angle less than 90 degrees, so only angles from zero to 90 degrees need to be considered.

In some embodiments, reflective or transflective outer major surface 1060 may have uniform or substantially uniform reflectance and/or transmittance, while in other embodiments the reflective or transflective outer major surface 1060 may have reflectance and/or transmittance properties that varies along the surface. The variation may be substantially continuous or discrete regions may have distinct reflectance and/or transmittance properties. For example, region 1060a and region 1060b may have differing reflectance and/or transmittance properties. The reflective or transflective outer major surface 1060 may have any spatially varying reflective property. For example, the ratio of reflectance to transmission may vary spatially. In some embodiments, the spatially varying reflective properties include one or more of the reflectivity of unpolarized light in a wavelength band of interest, the reflectivity of polarized light having a first polarization state in the wavelength band, the degree of diffuse reflectivity of unpolarized light in the wavelength band, and the degree of diffuse reflectivity of polarized light having the first polarization state in the wavelength band. The wavelength band of interest may be the visible wavelength band (e.g., wavelengths in the range of 380 nm-780 nm) or may be near infrared (IR) or ultraviolet (UV) bands or may be bands overlapping with one or more of the visible, IR and UV ranges. Near infrared may refer to wavelengths in the range of 780 nm-2000 nm, for example.

The shape and/or the reflectance and/or transmittance properties of reflective or transflective outer major surface 1060 may be selected such that switching the switchable diffuser from a first state to a second state changes the angular distribution and/or the spectral distribution and/or the polarization distribution of light output from lighting component 1000. The shape may be adjusted, for example, by providing a segmented or faceted surface having variable surface normal. The reflectance and/or transmittance properties of the reflective or transflective outer major surface 1060 can also be adjusted by varying the surface texture. In some embodiments, the reflective or transflective outer major surface 1060 may have a spatially varying texture that provides a spatially varying degree of diffuse reflectance or transmittance. For example, in some embodiments, the reflective or transflective outer major surface 1060 provides a ratio of diffuse to specular reflectivity that is spatially varying.

A reflective or transflective outer major surface of an optical volume may be formed using a reflective or transflective film. Suitable reflective or transflective film includes multilayer optical film (MOF) that includes a plurality of alternating birefringent polymer layers as described in U.S. Pat. No. 5,882,774 (Jonza et al.), U.S. Pat. No. 6,179,948 (Merrill et al.), and U.S. Pat. No. 6,783,349 (Neavin et al.). Differing distinct reflectance and/or transmittance properties can be achieved by using a perforated reflective or transflective film, which may be an MOF, where the perforation density varies along the reflective or transflective outer major surface. For example, reflective or transflective outer major surface 1060 may include a perforated reflective or transflective film having differing perforation densities in region 1060a and 1060b. The perforated reflective or transflective film may be a perforated reflector film or a perforated reflective polarizer, for example. The perforated reflector film may be a wide-band reflector, such as Enhanced Specular Reflector (available from 3M Company), or may be reflective in only some wavelength bands so that the reflective properties are wavelength dependent. Suitable reflective polarizers include DBEF (available from 3M Company). Other suitable reflective or transflective films include Transflective Display Film (available from 3M Company).

In some embodiments, a reflective or transflective outer major surface 1060 is formed using a transparent substrate with one or more MOF layers attached to the substrate. In some embodiments, one or more MOF layers may be disposed between two substrates. In such embodiments, the MOF layers may be understood as defining outer boundaries of an optical volume and one of the two substrate layers may be considered to be outside the optical volume established by the MOF layers. Regions 1060a and 1060b may include differing MOF layers. The MOF layers may include broad band reflectors, wavelength dependent reflectors, reflective polarizers, asymmetric reflectors (reflectors that reflect more of a first polarization than a second polarization orthogonal to the first polarization), or combinations thereof.

Other reflectors or transflectors may include, but are not limited to, metallic (e.g., aluminum) reflectors or transflectors, reflectors or transflectors made by physical vapor deposition, reflectors or transflectors having particles in a matrix (e.g., reflective particles in a polymer matrix), voided reflectors or transflectors (e.g., reflective particles in a polymer matrix that includes voids in order to provide diffuse reflectance), or reflectors or transflectors that provide total internal reflection (TIR). Suitable voided reflectors that include particles in a polyester matrix are described in U.S. Pat. No. 7,273,640 (Laney, et al.), for example.

In some embodiments, the optical volume includes a single reflective or transflective outer major surface which may be curved in a single direction to produce a cone, for example, or may be curved in two directions to produce a curved surface of revolution about an axis, for example. In the embodiment illustrated in FIG. 10, the reflective or transflective outer major surface 1060 may be described as a surface of revolution about optical axis 1076. In some embodiments, the curved surface of revolution is a compound curve, which may, for example, be generated by revolution of multiple curves about an axis. In some embodiments, the optical volume may include more than one reflective or transflective outer major surface. The at least one reflective or transflective outer major surface may include two or more planar surfaces not all in a common plane or may include one or more surfaces curved in one direction or curved in two directions.

A surface may be described as reflective if it reflects most of a light energy in a wavelength band of interest that is injected into the optical volume from the light injection region and incident on the surface. For example, a reflective surface may reflect at least about 70 percent, or at least about 80 percent, or at least about 90 percent of a light energy incident on the surface and injected into the optical volume from the light injection region. As described elsewhere, the wavelength band of interest may include light in the visible, IR and/or UV ranges. A surface may be described as transflective if it reflects a portion and transmits a portion of a light energy in a wavelength band of interest that is injected into the optical volume from the light injection region and incident on the surface. For example, a transflective surface may reflect in the range of 10 percent to 90 percent of a light energy incident on the surface and injected into the optical volume from the light injection region, and may transmit in the range of 10 percent to 90 percent of a light energy incident on the surface and injected into the optical volume from the light injection region. A transflective surface may reflect a substantial portion of a light energy incident on the surface and injected into the optical volume from the light injection region through a total internal reflection (TIR) mechanism.

Other optical volumes suitable for use with the optical systems of the present description are described in U.S. Prov. Pat. App. No. 62/076,946 (Du et al.).

Figure 14:
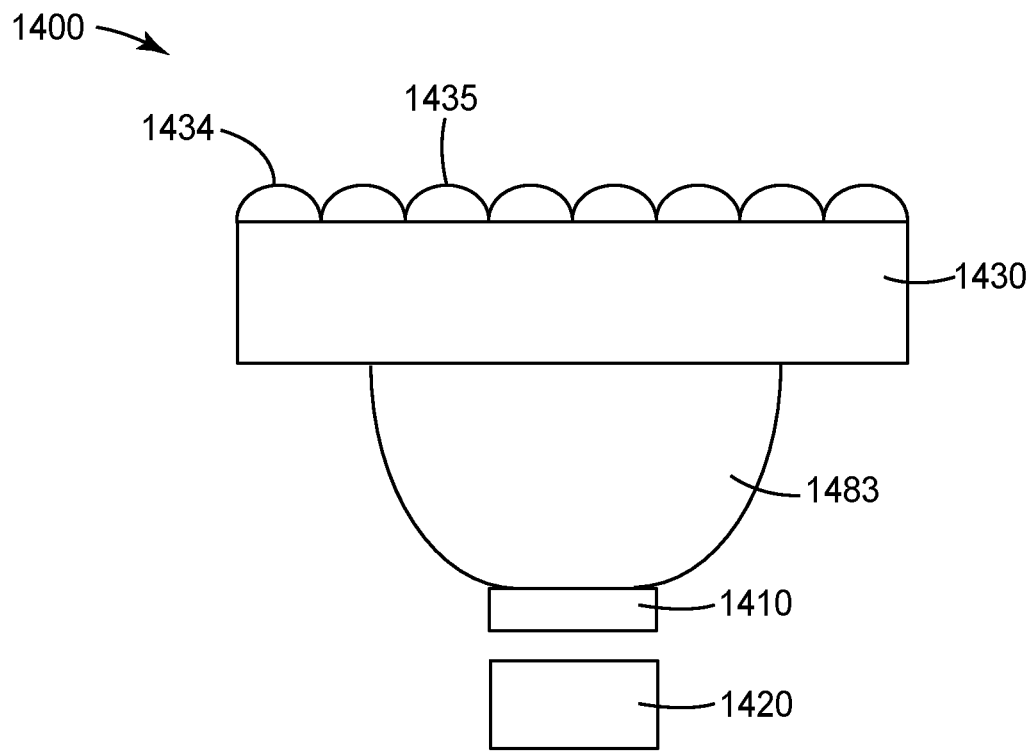
FIG. 14 is a cross-sectional view of an optical system.

In some embodiments, an optical system of the present description includes a lens which in optical communication with a lighting component, a switchable diffuser and a low-absorbing optical component. FIG. 14 is a schematic cross-sectional view of optical system 1400 including switchable diffuser 1410, lighting component 1420, low absorbing optical component 1430 having outer surface 1434 which includes light redirecting structures 1435, and lens 1483. The switchable diffuser 1410 is disposed between the lighting component 1420 and the low-absorbing optical component 1430 and the lens 1483 is disposed between the switchable diffuser 1410 and the low-absorbing optical component 1430. Any suitable lens can be used. In some embodiments the lens is a total internal reflection lens (TIR lens) where light from the lighting component 1420 that enters lens 1483 through switchable diffuser 1410 is reflected from an outer surface of lens 1483 via TIR. A lens may be disposed between the switchable diffuser 1410 and the low-absorbing optical component 1430 in order to direct light from a switchable diffuser having a first surface area onto a low-absorbing optical component having a second surface area larger than the first surface area.

Any of the switchable diffusers of the present description may include a plurality of independently addressable regions. In some embodiments, the plurality of independently addressable regions are passive matrix addressable. Each region is capable of being in a first state and a second state different from the first state. For example, the first state may be a clear or a lowest haze state and the second state may be a high haze state. In some embodiments, each region is capable of being in a first state, a second state different from the first state and a third state different from the first and the second state. For example, the first state may have a low haze, the second state may have a haze higher than that of the first state, and the third state may have a haze higher than that of the second state. In some embodiments, each region can be in a maximum haze state having the highest haze that can be achieved by the switchable diffuser and each region can be in a minimum haze having the lowest haze that can be achieved by the switchable diffuser. In some embodiments, each region can be in any of a minimum haze state and a plurality of hazy states that can be varied substantially continuously from the minimum haze state to the maximum haze state.

A voltage waveform may be applied to a switchable diffuser in order to change the state of the diffuser. In some embodiments, the waveform is applied using a switching device. In some embodiments, a switching device is provided as a component of the switchable diffuser. In some embodiments, a switching device may be disposed in a housing containing the switchable diffuser. In some embodiments, a switching device may be provided as a physically separate component located exterior to a housing that contains the switchable diffuser. In some embodiments, the switchable diffuser includes a layer of smectic A material. In some embodiments, the thickness of the smectic A material is in a range of 5 microns to 20 microns.

Voltage waveforms needed to cause smectic A material, or other switchable diffuser material, to change states are known in the art. Suitable waveforms are described, for example, in U.S. Pat. No. 4,893,117 (Blomley et al.). In some embodiments, a low-frequency waveform is applied to switch regions from a clear state to a haze state and a high-frequency waveform is used to switch regions from a hazy state to a clear state. In some embodiments, the low-frequency waveform has a frequency in the range of about 10 Hz to about 100 Hz (for example, about 50 Hz). In some embodiments, the high-frequency waveform has a frequency in the range of about 0.5 kHz to about 4 kHz (for example, about 1 kHz).

The hazy state can be adjusted by the time that the voltage waveform is applied to the switchable diffuser in the clear state. For example, a low-frequency waveform applied to a switchable diffuser in the substantially clear state for a first time period can result in a first hazy state having a first haze and a low-frequency waveform applied to a switchable diffuser in the substantially clear state for a second time period can result in a second hazy state having a second haze that is different from the first haze. For example, the first time period can be 800 ms and the second time period can be 400 ms resulting in a first haze that is higher than the second haze.

In some embodiments, when the switchable diffuser is in a state where some regions are in a clear state and some regions are in a hazy state and both clear to hazy and hazy to clear state changes are needed, a diffuser controller may be configured to first apply a low-frequency waveform to those regions that are to be changed from a clear state to a hazy state followed by applying a high-frequency waveform to those regions that are to be changed from a hazy state to a clear state. In some embodiments, when the switchable diffuser is in a state where some regions are in a clear state and some regions are in a hazy state and both clear to hazy and hazy to clear state changes are needed, the diffuser controller is configured to first apply a high-frequency waveform to those regions that are to be changed from a hazy state to a clear state followed by applying a low-frequency waveform to those regions that are to be changed from a clear state to a hazy state. In some embodiments, when the switchable diffuser is in a state where some regions are in a clear state and some regions are in a hazy state and both clear to hazy and hazy to clear state changes are needed, the diffuser controller is configured to apply a low-frequency waveform to those regions that are to be changed from a clear state to a hazy state in a first time period and apply a high-frequency waveform to those regions that are to be changed from hazy state to a clear state in a second time period where the first time period and the second time period overlap.

Figure 11A:
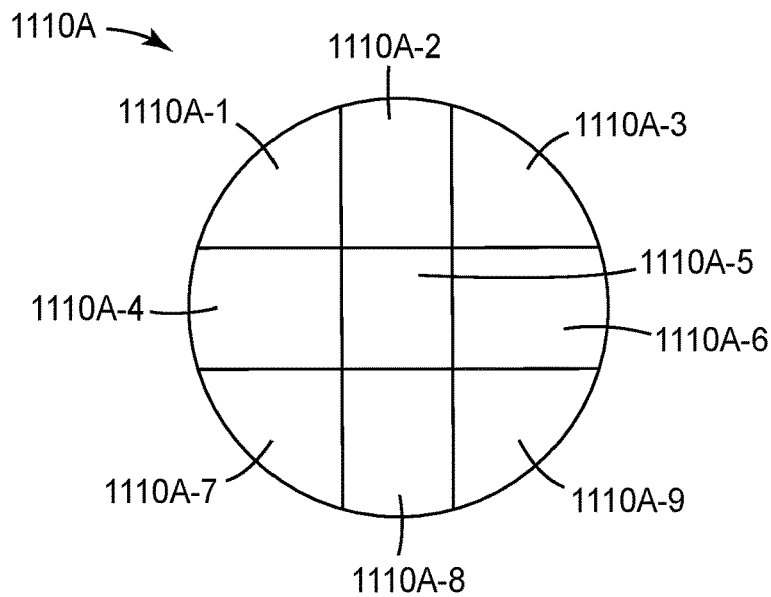
FIGS. 11A-11C are top views of switchable diffusers.
Figure 11B:
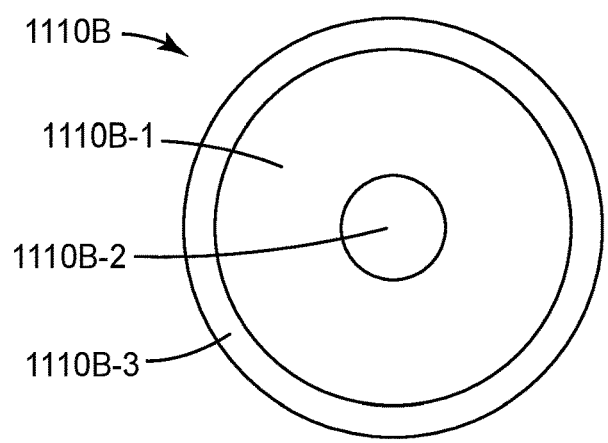
Figure 11C:
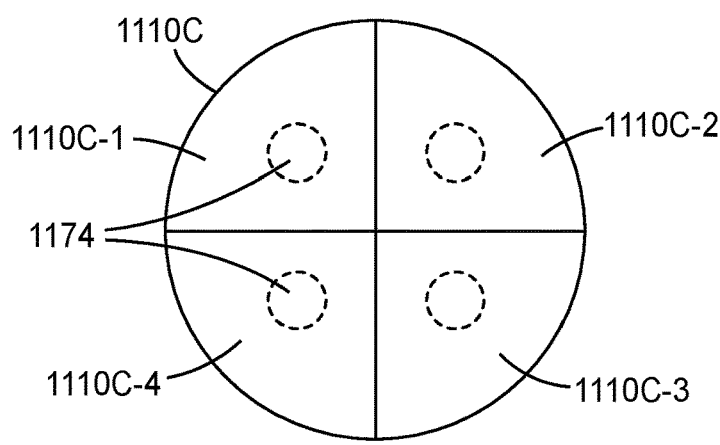

FIG. 11A is a top view of switchable diffuser 1110A having first through ninth independently addressable regions 1110A-1 through 1110A-9. FIG. 11B is a top view of switchable diffuser 1110B having first through third independently addressable regions 1110B-1 through 1110B-3. FIG. 7C is a top view of switchable diffuser 1110C having first through fourth independently addressable regions 1110C-1 through 1110C-4. Switchable diffuser 1110C is disposed above a light source having four LEDs which produce light on switchable diffuser 1110C in areas 1174. Each independently addressable region corresponds to an LED. Such an arrangement allows a useful degree of adjustability of the light output of a lighting component. The LEDs may have different spectral power distribution functions (e.g., the LEDs may be differently colored LEDs) or they may all have substantially the same spectral power distribution function (e.g., all LEDs may have the same color which may be white). If the LEDs are differently colored LEDs, switchable diffuser 1110C may be used to control the output distribution of the various colors which can produce differently tinted light output in different directions. This may be useful in various lighting applications such as, for example, stage lighting. Although four LEDs and four addressable regions are illustrated in FIG. 11C, any number of LEDs and any number of independently addressable regions may be used. In some embodiments, the switchable diffuser may be registered with a plurality of LEDs, but there may or may not be a 1-to-1 correspondence with the number of LEDs and the number or addressable regions of the switchable diffuser. For example, there may be two or more LEDs that correspond to a single region of the switchable diffuser.

Additional optical layers, such as a segmented layer, may be disposed adjacent a switchable diffuser. In some embodiments, a segmented layer is disposed adjacent the switchable diffuser and aligned with the independently addressable regions of the switchable diffuser. The segmented layer may have multiple segments that each produces an optical effect. In some embodiments, the switchable diffuser and the segmented layer may be registered with LEDs (as is FIG. 11C, for example) with each segment tailoring the light output from its corresponding LED. For example, the output distribution of a first LED after passing through the segmented layer when the corresponding region of the switchable diffuser is in a substantially clear state may have a substantially circular distribution (in a plane parallel to the switchable diffuser), while the output distribution of a second LED after passing through the segmented layer when the corresponding region of the switchable diffuser is in a substantially clear state may have an elliptical distribution (in a plane parallel to the switchable diffuser). The segmented layer may have a replicated pattern (e.g., microreplicated) that varies in different segments of the layer. Suitable materials that can be used in a segmented layer include, for example, the diffusers available from Luminit, LLC (Torrance, Calif.) which may utilize surface relief holograms. The combination of a switchable diffuser and a segmented layer where independently addressable regions of the switchable diffuser is in registration with the segmented layer and in registration with a plurality of LEDs allows for a high degree of tunability to the light output of a lighting component.

Although nine, three and four independently addressable regions are shown in FIGS. 11A-11C, respectively, any number of independently addressable regions may be used. For example, a switchable diffuser may have an x-y grid of independently addressable regions that includes at least 10, or at least 100 independently addressable regions. This may be useful for embodiments having at least one reflective or transflective surface shaped such that light from the light injection region that passes through a position in the x-y grid is reflected into a particular direction. Having an x-y grid of independently addressable regions may allow a high degree of adjustability to angular, spectral, and/or polarization output distribution from the lighting component. Other suitable switchable diffusers suitable for use with the optical systems of the present description are described in U.S. Prov. Pat. App. No. 62/076,946 (Du et al.).

Figure 12:
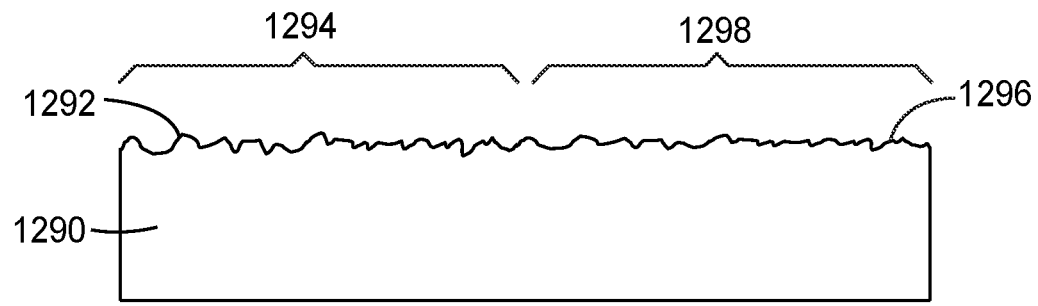
FIG. 12 is a cross sectional view of an optical component.

FIG. 12 is a cross sectional view of optical component 1290 which may be an electrically switchable diffuser or may be a low absorbing optical component. Optical component 1290 may correspond with any of the switchable diffuser or low absorbing optical components used in any of the optical systems of the present description. Optical component 1290 includes a first set of light redirecting structures 1292 in first region 1294 and a second set of light redirecting structures 1296 in second region 1298. The first set of light redirecting structures 1292 are different from the second set of light redirecting structures 1296. In the illustrated embodiment, the first set of light redirecting structures 1292 have a larger size than the second set of light redirecting structures 1296. In some embodiments, the first and second set of light redirecting structures have differing distributions of size, shape, spacing or slope. In the illustrated embodiment, there are two regions of light redirecting structures on the same side of an optical component. In other embodiments, there are more than two regions and the regions may be disposed on one or both of the outer surfaces of optical component 1290.

In some embodiments, the light redirecting structures have spatially regular distributions of size, shape and spacing. In some embodiments, the light redirection structures have a spatially irregular (random or pseud-random) distribution of at least one of size, shape and spacing. In some embodiments, the light redirecting structures include refractive structures, diffractive structures, or a combination thereof.

The light redirecting structures can be formed on an outer surface of an optical component (e.g., a switchable diffuser or a low absorbing optical component) using any of a variety of suitable means. For example, light redirecting structures may be formed using a microreplicated tool containing a desirable pattern or structure by casting a polymerizable resin composition onto an outer surface and curing the resin composition when it is in contact with the tool surface. Such cast and cure processes are described in U.S. Pat. No. 5,175,030 (Lu et al.) and U.S. Pat. No. 5,183,597 (Lu), for example. Embossing or other surface structuring methods could also be used.

The light redirecting structures can have any suitable shape or distribution of shapes. Suitable shapes include lenslets, linear prisms, pyramids, cones, and combinations thereof, for example. When included, lenslets may be have any suitable shape and may have an arcuate cross-section. The lenslets may be spherical or ellipsoidal caps, for example. The shapes can be randomly or pseudo-randomly arranged or can be arranged in a repeating pattern, such as on a square lattice or such as on a hexagonal lattice, which may also be referred to as an equilateral triangular lattice. In some embodiments, the light redirecting structures substantially cover a surface with neighboring light redirecting structures immediately adjacent to each other. In some embodiments, the light redirecting structures can be arranged with spaces between neighboring structures. In some embodiments, the light redirecting structures are arranged with a spatially invariant distribution, such as a periodic distribution. In some embodiments, the light redirecting structures are arranged with a spatially variant distribution, such as a random or otherwise a-periodic distribution. In some embodiments, the light redirecting structures are arranged into concentric rings of structures, such as lenticular structures, which may be arranged on circles, ellipses or the like. In some embodiments, the light redirecting structures may serpentine lenticular structures, such as serpentine prisms.

In some embodiments, at least about 50 percent, or at least about 60 percent, or at least about 80 percent, or at least about 90 percent of a surface area of the light redirecting structures have a surface normal that has an angle relative to the normal of the plane of substrate in the range of about 10 degrees, or about 15 degrees to about 40 degrees, or to about 45 degrees.

Figure 15:
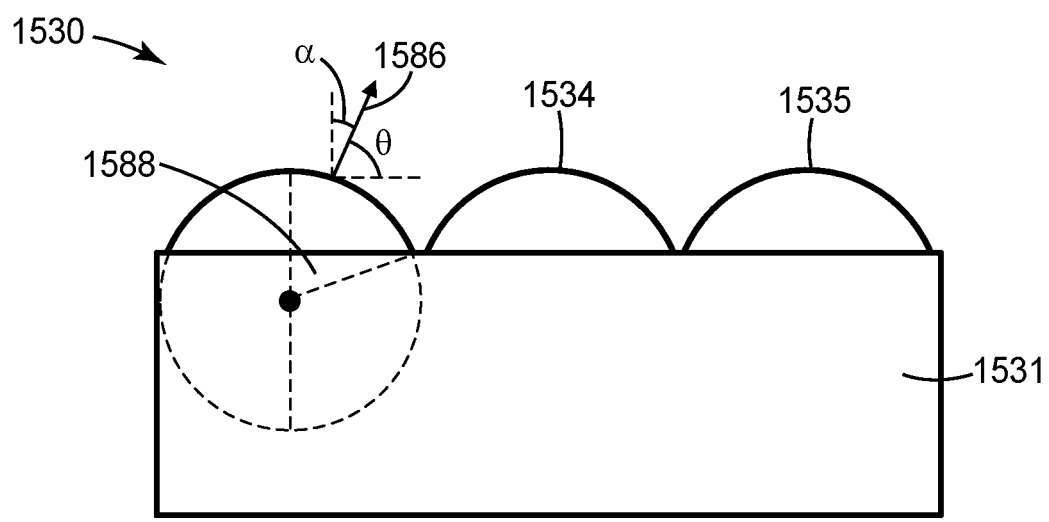
FIG. 15 is a schematic cross-sectional view of a portion of an optical component.

Spherical caps are illustrated in FIG. 15 which is a schematic cross-sectional view of a portion of optical component 1530, which may be a low absorbing optical component or may be a switchable diffuser. Optical component 1530 includes a substrate 1531 and a structured surface 1534 including light redirecting structures 1535, which in the illustrated embodiments, are spherical caps having a half arc angle 1588. The light redirecting structures 1535 have a surface normal 1586 that makes an angle θ (taken to be in the range of 0 to 90 degrees) relative to a plane of the substrate and makes an angle α (which equals 90 degrees minus θ) relative to a normal to the plane of the substrate. The light redirecting structures 1535 may face towards or away from a lighting component. In some embodiments, the spherical caps face away from the light source and have a half arc angle 1588 in the range of about 25 degrees, or about 30 degrees to about 40 degrees or to about 45 degrees. In some embodiments, an average over the structured surface 1534 of the angle α between the surface normal and normal to the plane of the substrate is in a range of 10 degrees, or 15 degrees, or 20 degrees to 30 degrees, or 35 degrees, or 40 degrees. In some embodiments, an average over the structured surface 1534 of the angle θ between the surface normal and the plane of the substrate is in a range of 50 degrees, or 55 degrees, or 60 degrees, to 70 degrees, or 75 degrees, or to 80 degrees. In some embodiments, the spherical caps face toward the light source and have a half arc angle 1588 in the range of about 30 degrees or about 35 degrees to about 80 degrees or to about 90 degrees. In some embodiments, an average over the structured surface 1534 of the angle α between the surface normal and normal to the plane of the substrate is in a range of 15 degrees or 20 degrees to 60 degrees, or 65 degrees. In some embodiments, an average over the structured surface 1534 of the angle θ between the surface normal and the plane of the substrate is in a range of 30 degrees or 35 degrees to 70 degrees or to 75 degrees. As illustrated in the Examples, such geometries have been found to give desired levels of light spreading while maintaining a high transmission through the optical component.

Figure 16:
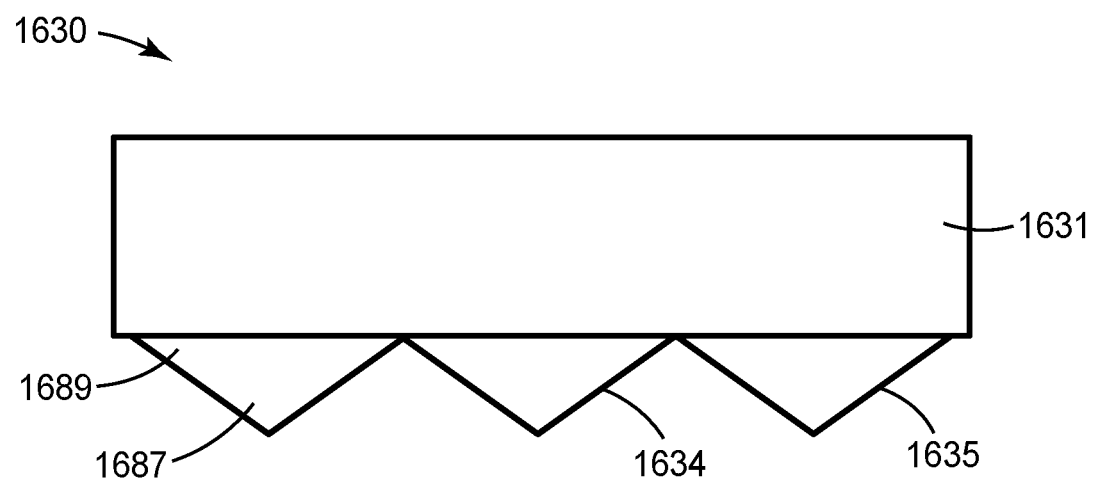
FIG. 16 is a schematic cross-sectional view of a portion of an optical component.

Linear prisms are illustrated in FIG. 16 which is a schematic cross-sectional view of a portion of optical component 1630, which may be a low absorbing optical component or may be a switchable diffuser. Optical component 1630 includes a substrate 1631 and a structured surface 1634 including light redirecting structures 1635, which in the illustrated embodiments, are linear prisms having an apex angle 1687 and having a slope angle 1689. In the case of prisms with flat sides, the slope angle 1689 is equal to an angle between the normal to the surface 1634 and a plane of the substrate. The light redirecting structures 1635 may face towards or away from a lighting component. In some embodiments, the prisms face away from the light source and have a slope angle 1689 in the range of about 10 degrees (corresponding to an apex angle 1687 of about 160 degrees), or about 15 degrees (corresponding to an apex angle 1687 of about 150 degrees) to about 30 degrees (corresponding to an apex angle 1687 of about 120 degrees), or to about 35 degrees (corresponding to an apex angle 1687 of about 110 degrees). In some embodiments, the prisms face toward the light source and have a slope angle 1689 in the range of about 10 degrees (corresponding to an apex angle 1687 of about 160 degrees), or about 15 degrees (corresponding to an apex angle 1687 of about 150 degrees) to about 40 degrees (corresponding to an apex angle 1687 of about 100 degrees), or to about 45 degrees (corresponding to an apex angle 1687 of about 90 degrees). As illustrated in the Examples, such geometries have been found to give desired levels of light spreading while maintaining a high transmission through the optical component.

Cones with a relatively large slope can provide an output distribution with a ring shaped region of high intensity which may be desirable in some applications. Linear prisms with relatively large slope angles can provide an output distribution with a 2-lobed shaped region of high intensity which may be desirable in some applications. Pyramids having a base and n-faces (n may be any suitable number, and may be 3, 4, 5 or 6, for example) may be used to provide an output distribution with an n-lobed shaped region of high intensity which may be desirable in some applications. Sharp tipped pyramids with walls having relatively steep slopes and relatively sharp peaks tend to produce n-lobed output distributions. Pyramids with walls having relatively shallow slopes and pyramids with rounded tips peaks tend to produce an output distribution where the lobes are merged together. Such distributions may be desired in some applications. The slope needed to produce a ring shaped distribution in the case of cones or lobes in the case of prisms or pyramids can depend on the input light distribution with a relatively shallow slope needed to produce a ring shaped region for a sharply peaked input light and a higher slope needed for light inputs with broader distributions.

In some embodiments, a lighting system that includes one or more of the optical systems described herein is provided.

The lighting system may be used in a display applications, sign applications, or in room lighting applications, for example. The lighting system or individual optical systems may include at least one sensor and a controller. The sensor may be included in or adjacent to an individual optical system or may be spatially separate from any of the optical systems. The sensor may be or include, for example, at least one of an optical sensor, an electrical sensor, a thermal sensor, an acoustical sensor, a pressure sensor, an electromagnetic sensor, a time sensor (e.g., a timer or a clock), a motion sensor, a proximity sensor, and an accelerometer. The sensor may be a light sensor which detects when the lighting in a room or a portion of a room is too dim or too bright and may provide a signal to the controller that includes such information. In some embodiments, the sensor may be a proximity sensor that detects when someone is in a room or a section of a room or may detect the number of people in a room or a section of the room. In some embodiments, the sensor may be a time sensor which signals the controller to change states of the switchable diffuser at certain times of the day or after a certain amount of time has elapsed. In some embodiments, the one or more sensors include both a timer and another sensor. The controller may change the state of the switchable diffuser after a certain amount of time has passed after a trigger event was detected by the other sensor. For example, the controller may turn off or dim a lighting system after a certain amount of time has elapsed since a proximity sensor or a motion sensor last detected that someone was in a room. The controller may receive information from the at least one sensor and determine an appropriate state of switchable diffuser(s) in the optical system(s). The controller may then send a control signal to one or more switchable diffusers in one or more optical systems if it determines that a state change is needed. The controller may also control the light source or light sources of one or more optical systems in response to signals received by the one or more sensors. In some embodiments, the controller may alter the output level of a light source as the state of the corresponding switchable diffuser is changed. This may be useful for masking optical effects associated with the state change. For example, the controller may dim or lower the output level of the light source as the switchable diffuser is switched from a clear state to a hazy state and then subsequently change the output level of the light source back to its level prior to the state change or to a different level.

Figure 13:
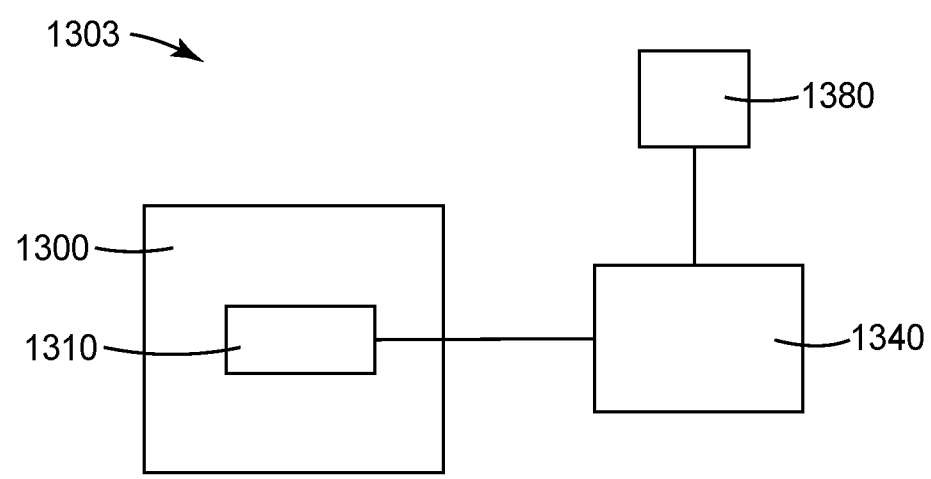
FIG. 13 is a schematic drawing of a lighting system.

FIG. 13 schematically illustrates lighting system 1303 including optical system 1300 that includes switchable diffuser 1310. Optical system 1300 is connected to controller 1340 which is connected to sensor 1380. The connection between the optical system 1300 and controller 1340 may be a wired connector or a wireless connection. Similarly, the connection between controller 1340 and sensor 1380 may be wired or wireless. Controller 1340 is configured to provide control signal to optical system 1300. The control signal may include a lighting control signal sent to the lighting component of the optical system 1300 that sets an output level of optical system 1300 as well as a diffuser control signal that sets the appropriate state of the switchable diffuser 1310. In the illustrated embodiment, one optical system and one sensor are provided. In other embodiments, the lighting system may include multiple optical systems and/or multiple sensors. The number of optical systems, controllers, and/or sensors may or may not be in one to one correspondence. In some embodiments, the lighting system provides a controller for each optical system. In other embodiments, a lighting system includes a plurality of optical systems of the present description, one or more sensors, and a controller that is configured to receive one or more signals from the one or more sensors and to provide control signals to the plurality of switchable diffusers of the optical systems. In the illustrated embodiment, the sensor 1380 is separate from the optical system 1300. In other embodiments, sensor 1380 may be disposed adjacent to, within, or partially within optical system 1300. Similarly, controller 1340 may be disposed separate from, adjacent to, within, or partially within optical system 1300.

EXAMPLES

Simulations utilizing standard ray-tracing techniques were performed for a system having a light source providing a light which was directed towards an optical component having a substrate with light redirecting structures on a surface of the substrate. The light source provided a light input to the optical component which produced a resulting light output. The light input to the optical component was modeled as having a half width and half maximum (HWHM) distribution centered on a normal to a plane of the optical component. The HWHM of a light distribution is one half of the FWHM of the light distribution. The light input (light from the source) was modeled as either having a HWHM of 12 degrees or of 30 degrees. The transmission and distribution of light output through the optical component was determined and the corresponding output HWHM was found. Linear prisms were modeled as having a 50 micrometer pitch with no gap between adjacent prisms. Cones and partial spheres were modeled as having a 101 micrometer diameter and were arranged in a close packed hexagonal pattern.

The optical component can be understood to correspond to a low-absorbing optical component, as described herein, having light redirecting structures on an outer surface, or the optical component can be understood to correspond to a switchable diffuser, as described herein, that is in a substantially clear state and that has light redirecting structures on an outer surface.

Figure 17:
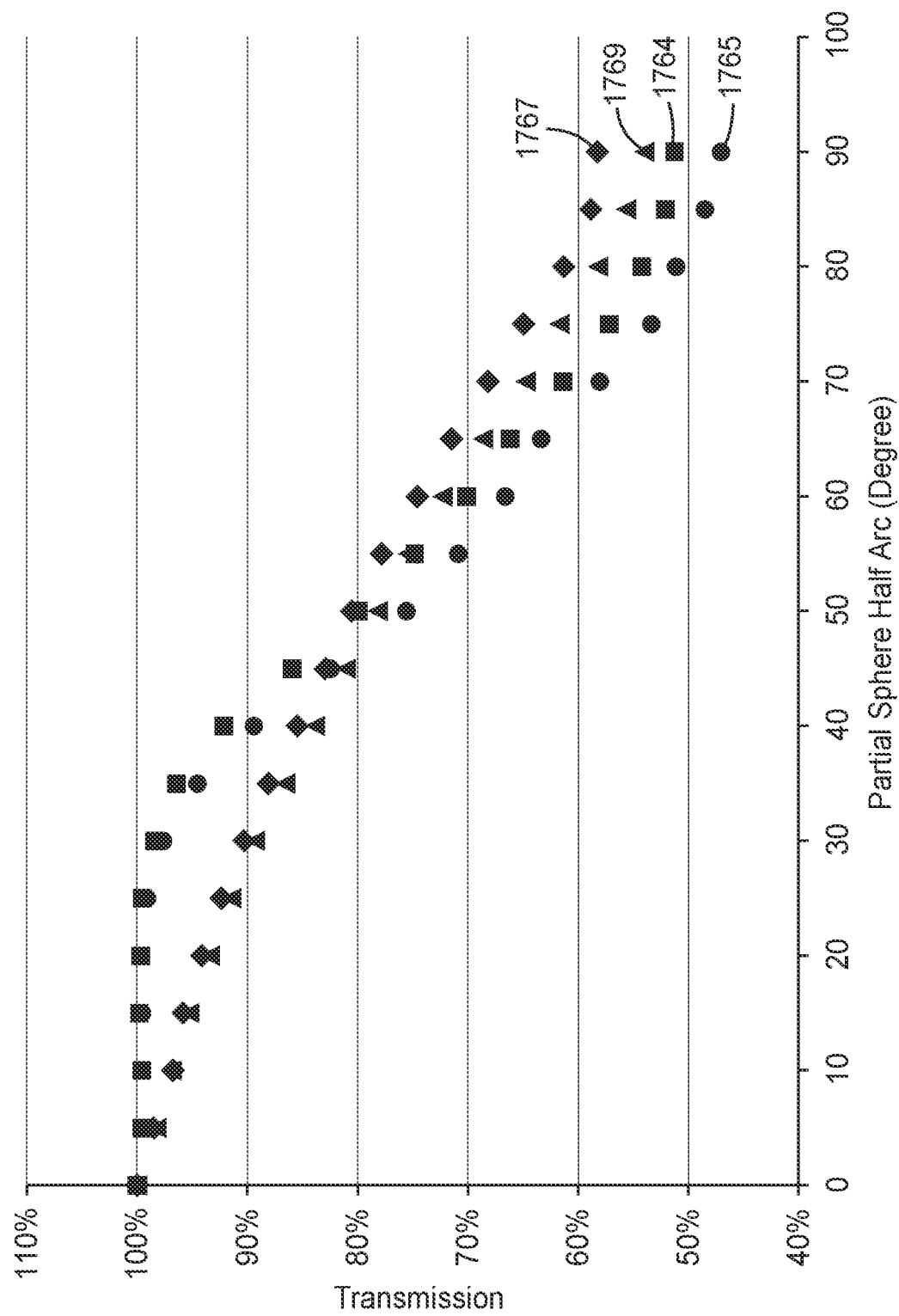
FIG. 17 is a plot of percent transmission through an optical component having light redirecting structures versus the partial sphere half arc angle of the light redirecting structures.

FIG. 17 shows the results for percent transmission through the optical component for the case of spherical caps (as in FIG. 15) facing away from the light source as a function of the partial sphere half arc angle. The percent transmission was normalized by dividing by the percent transmission through a flat film having the same refractive index as the optical component. The case of a source HWHM of 12 degrees and a refractive index of 1.5 for the spherical caps and substrate is shown as data series 1764. The case of a source HWHM of 12 degrees and a refractive index of 1.6 for the spherical caps and substrate is shown as data series 1765. The case of a source HWHM of 30 degrees and a refractive index of 1.5 for the spherical caps and substrate is shown as data series 1767. The case of a source HWHM of 30 degrees and a refractive index of 1.6 for the spherical caps and substrate is shown as data series 1769.

Figure 18:
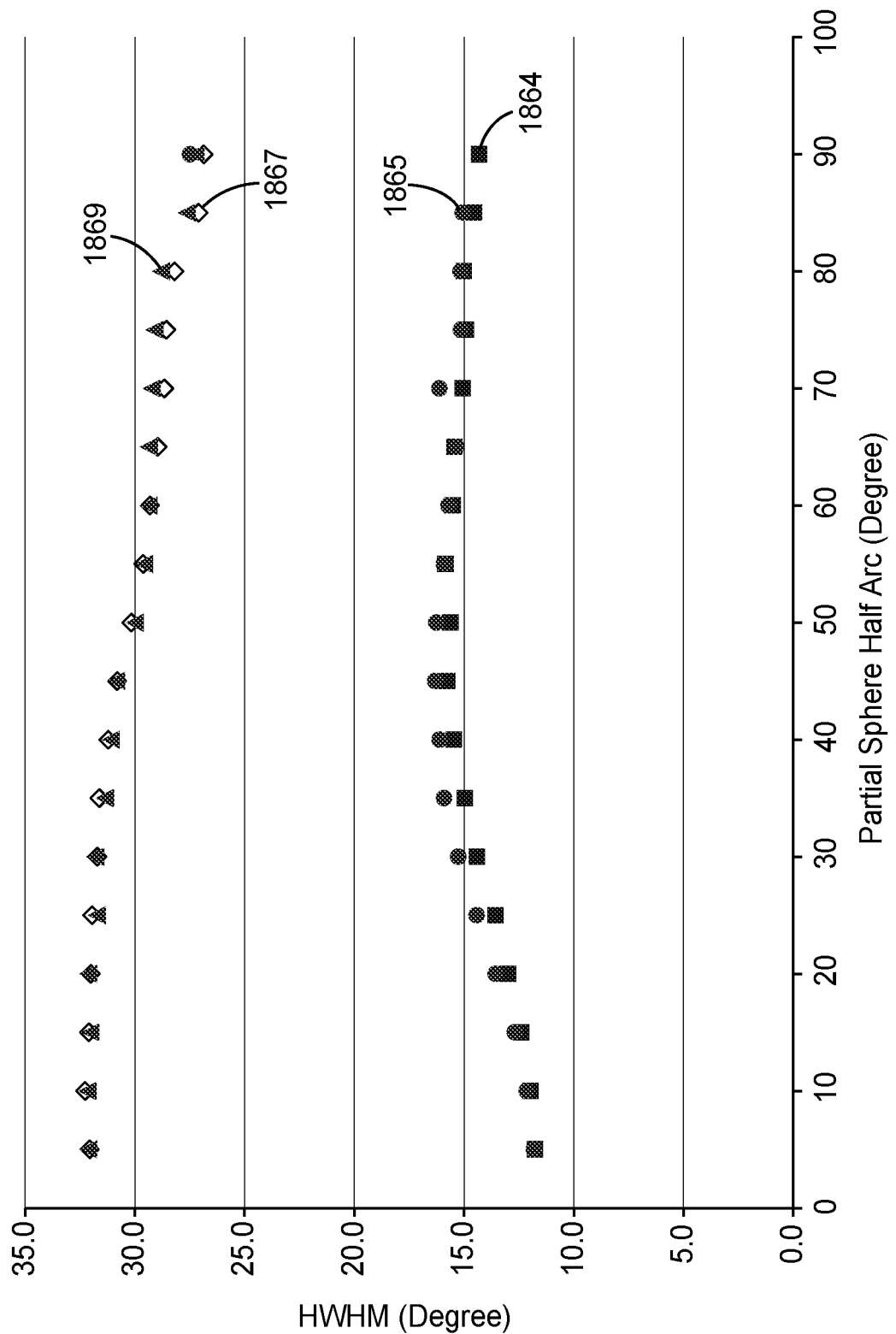
FIG. 18 is a plot of the half width at half maximum of an output distribution through an optical component having light redirecting structures versus the partial sphere half arc angle of the light redirecting structures.

FIG. 18 shows the results for HWHM of the light output from the optical component for the case of spherical caps (as in FIG. 15) facing away from the light source as a function of the partial sphere half arc angle. The case of a source HWHM of 12 degrees and a refractive index of 1.5 for the spherical caps and substrate is shown as data series 1864. The case of a source HWHM of 12 degrees and a refractive index of 1.6 for the spherical caps and substrate is shown as data series 1865. The case of a source HWHM of 30 degrees and a refractive index of 1.5 for the spherical caps and substrate is shown as data series 1867. The case of a source HWHM of 30 degrees and a refractive index of 1.6 for the spherical caps and substrate is shown as data series 1869.

Figure 19:
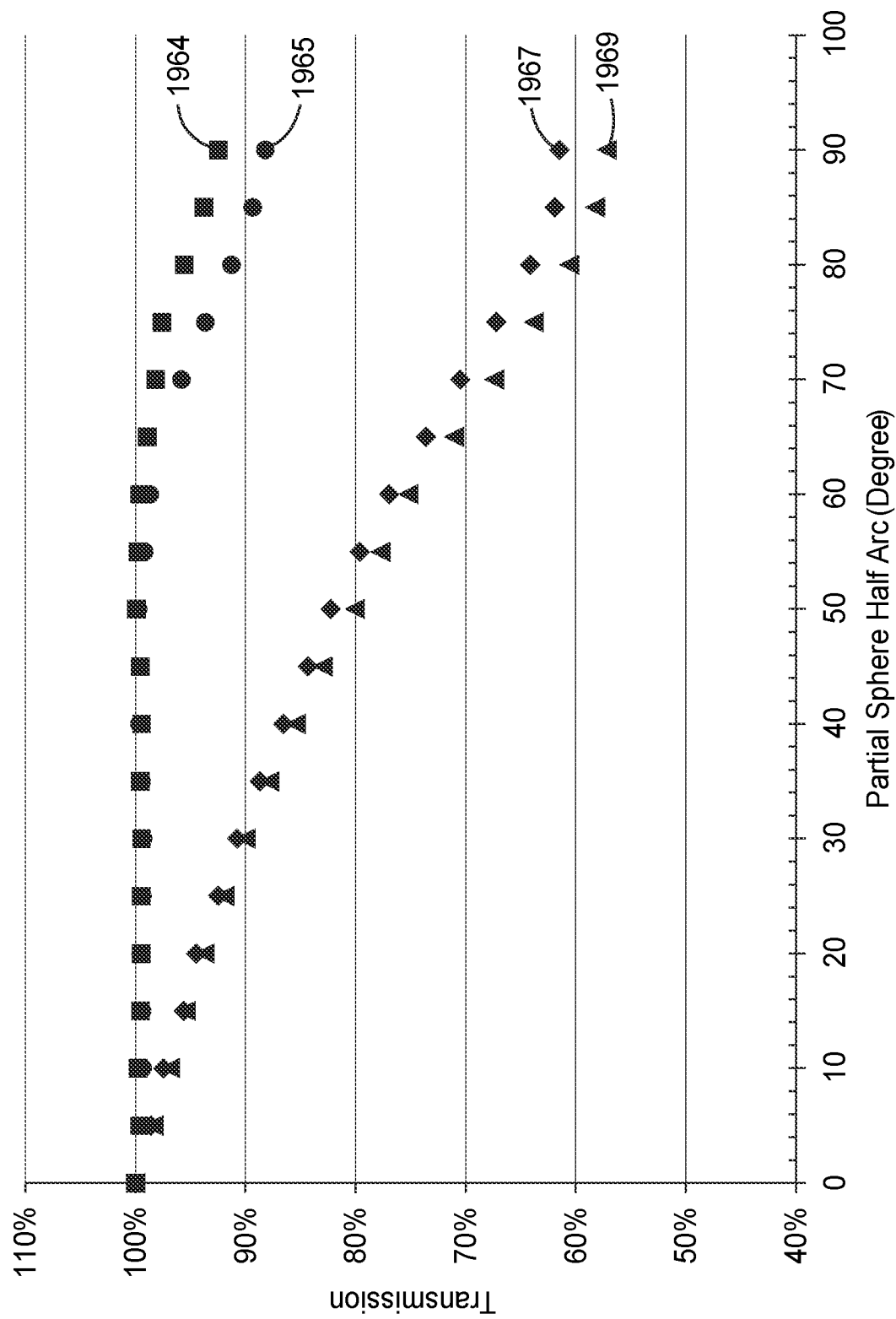
FIG. 19 is a plot of percent transmission through an optical component having light redirecting structures versus the partial sphere half arc angle of the light redirecting structures.

FIG. 19 shows the results for percent transmission through the optical component for the case of spherical caps (as in FIG. 15) facing towards the light source as a function of the partial sphere half arc angle. The percent transmission was normalized by dividing by the percent transmission through a flat film having the same refractive index as the optical component. The case of a source HWHM of 12 degrees and a refractive index of 1.5 for the spherical caps and substrate is shown as data series 1964. The case of a source HWHM of 12 degrees and a refractive index of 1.6 for the spherical caps and substrate is shown as data series 1965. The case of a source HWHM of 30 degrees and a refractive index of 1.5 for the spherical caps and substrate is shown as data series 1967. The case of a source HWHM of 30 degrees and with a refractive index of 1.6 for the spherical caps and substrate is shown as data series 1969.

Figure 20:
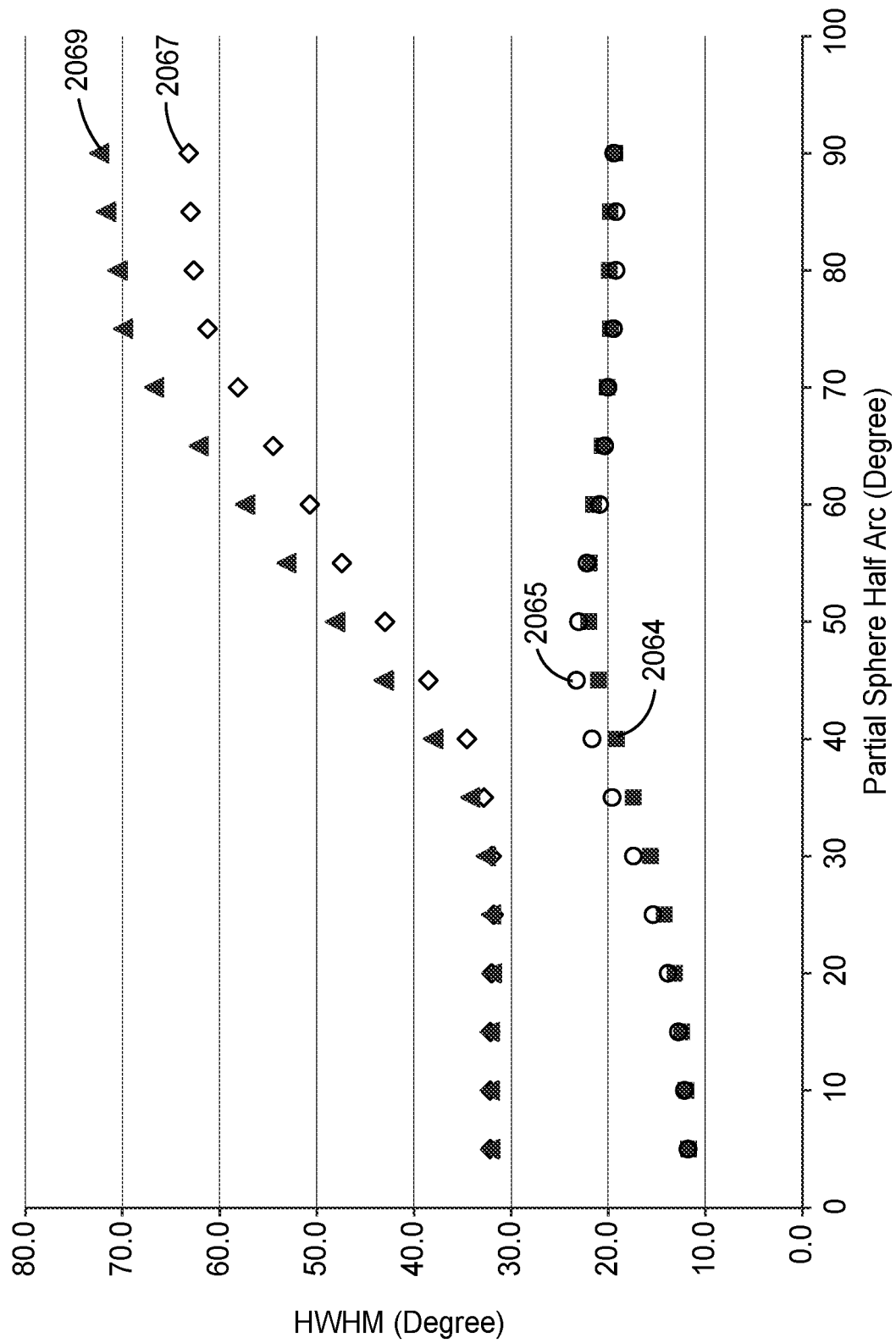
FIG. 20 is a plot of the half width at half maximum of an output distribution through an optical component having light redirecting structures versus the partial sphere half arc angle of the light redirecting structures.

FIG. 20 shows the results for HWHM of the light output from the optical component for the case of spherical caps (as in FIG. 15) facing towards the light source as a function of the partial sphere half arc angle. The case of a source HWHM of 12 degrees and a refractive index of 1.5 for the spherical caps and substrate is shown as data series 2064. The case of a source HWHM of 12 degrees and a refractive index of 1.6 for the spherical caps and substrate is shown as data series 2065. The case of a source HWHM of 30 degrees and a refractive index of 1.5 for the spherical caps and substrate is shown as data series 2067. The case of a source HWHM of 30 degrees and a refractive index of 1.6 for the spherical caps and substrate is shown as data series 2069.

Figure 21:
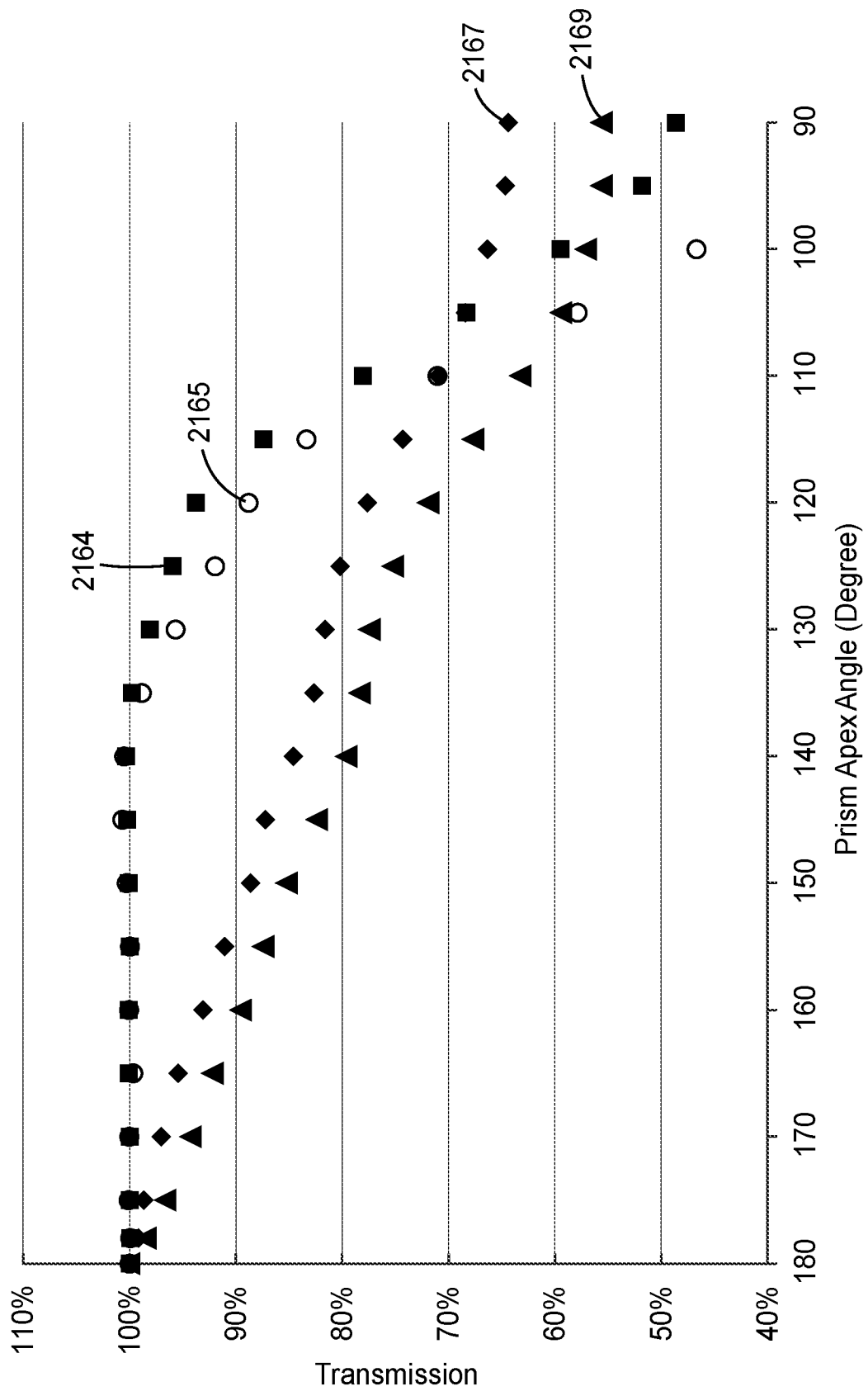
FIG. 21 is a plot of percent transmission through an optical component having light redirecting structures versus the prism apex angle of the light redirecting structures.

FIG. 21 shows the results for percent transmission through the optical component for the case of linear prisms (as in FIG. 16) facing away from the light source as a function of the prism apex angle. The percent transmission was normalized by dividing by the percent transmission through a flat film having the same refractive index as the optical component. The case of a source HWHM of 12 degrees and a refractive index of 1.5 for the prisms and substrate is shown as data series 2164. The case of a source HWHM of 12 degrees and a refractive index of 1.6 for the prisms and substrate is shown as data series 2165. The case of a source HWHM of 30 degrees and a refractive index of 1.5 for the prisms and substrate is shown as data series 2167. The case of a source HWHM of 30 degrees and with a refractive index of 1.6 for the prisms and substrate is shown as data series 2169.

Figure 22:
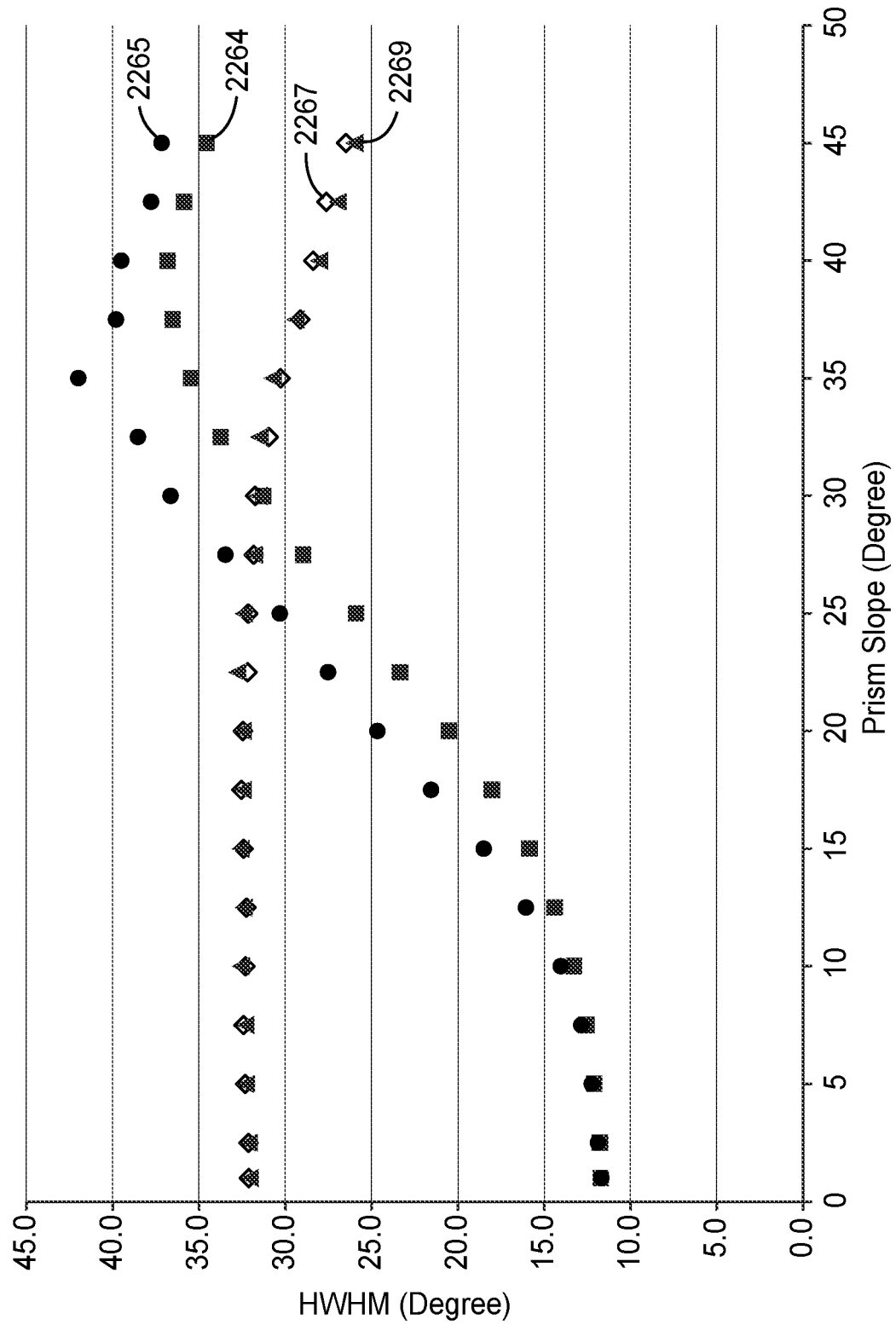
FIG. 22 is a plot of the half width at half maximum of an output distribution through an optical component having light redirecting structures versus the prism slope of the light redirecting structures.

FIG. 22 shows the results for HWHM of the light output from the optical component for the case of linear prisms (as in FIG. 16) facing away from the light source as a function of the prism slope. The case of a source HWHM of 12 degrees and a refractive index of 1.5 for the prisms and substrate is shown as data series 2264. The case of a source HWHM of 12 degrees and a refractive index of 1.6 for the prisms and substrate is shown as data series 2265. The case of a source HWHM of 30 degrees and a refractive index of 1.5 for the prisms and substrate is shown as data series 2267. The case of a source HWHM of 30 degrees and a refractive index of 1.6 for the prisms and substrate is shown as data series 2269.

Figure 23:
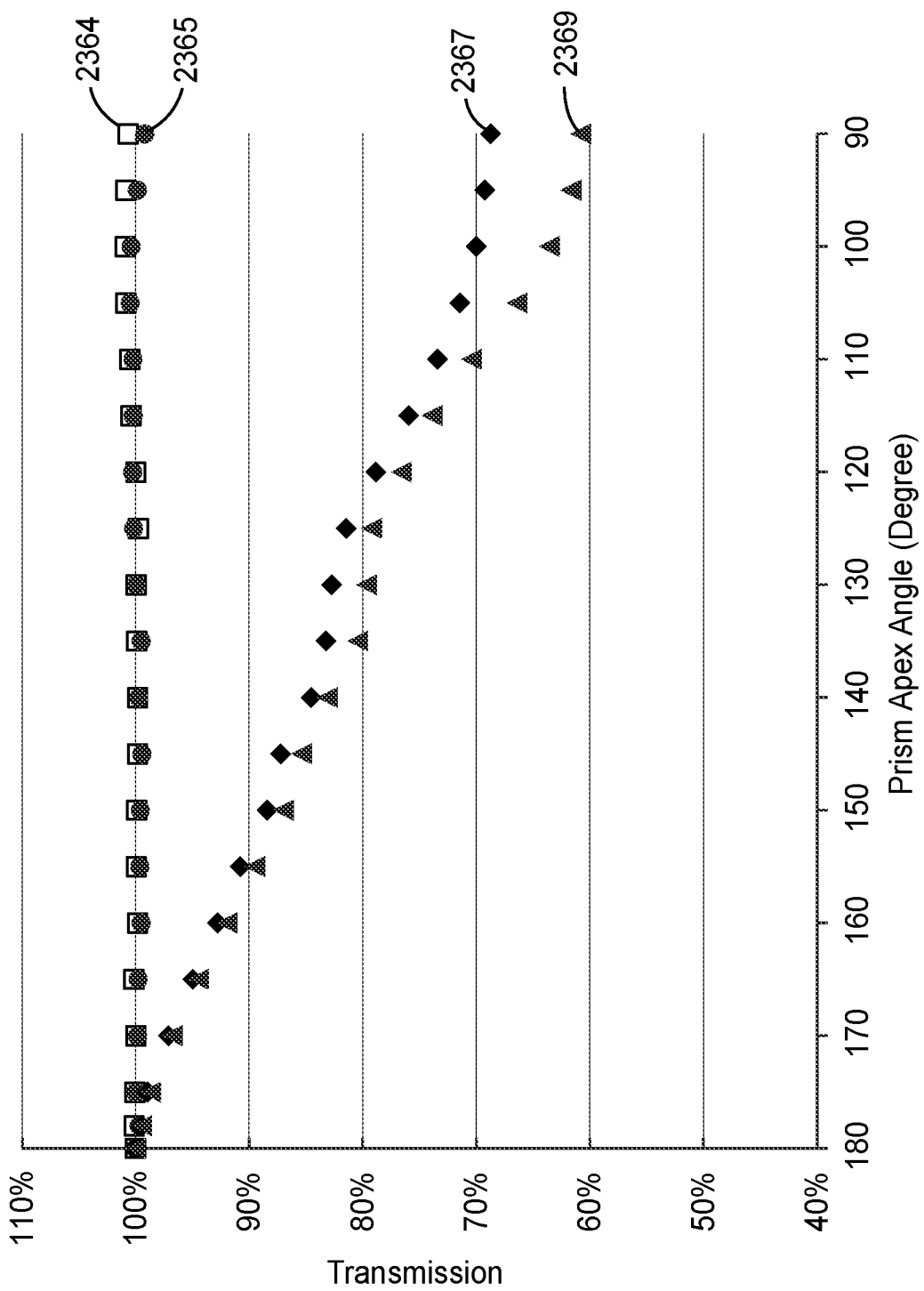
FIG. 23 is a plot of percent transmission through an optical component having light redirecting structures versus the prism apex angle of the light redirecting structures.

FIG. 23 shows the results for percent transmission through the optical component for the case of linear prisms (as in FIG. 16) facing towards the light source as a function of the prism apex angle. The percent transmission was normalized by dividing by the percent transmission through a flat film having the same refractive index as the optical component. The case of a source HWHM of 12 degrees and a refractive index of 1.5 for the prisms and substrate is shown as data series 2364. The case of a source HWHM of 12 degrees and a refractive index of 1.6 for the prisms and substrate is shown as data series 2365. The case of a source HWHM of 30 degrees and a refractive index of 1.5 for the prisms and substrate is shown as data series 2367. The case of a source HWHM of 30 degrees and a refractive index of 1.6 for the prisms and substrate is shown as data series 2369.

Figure 24:
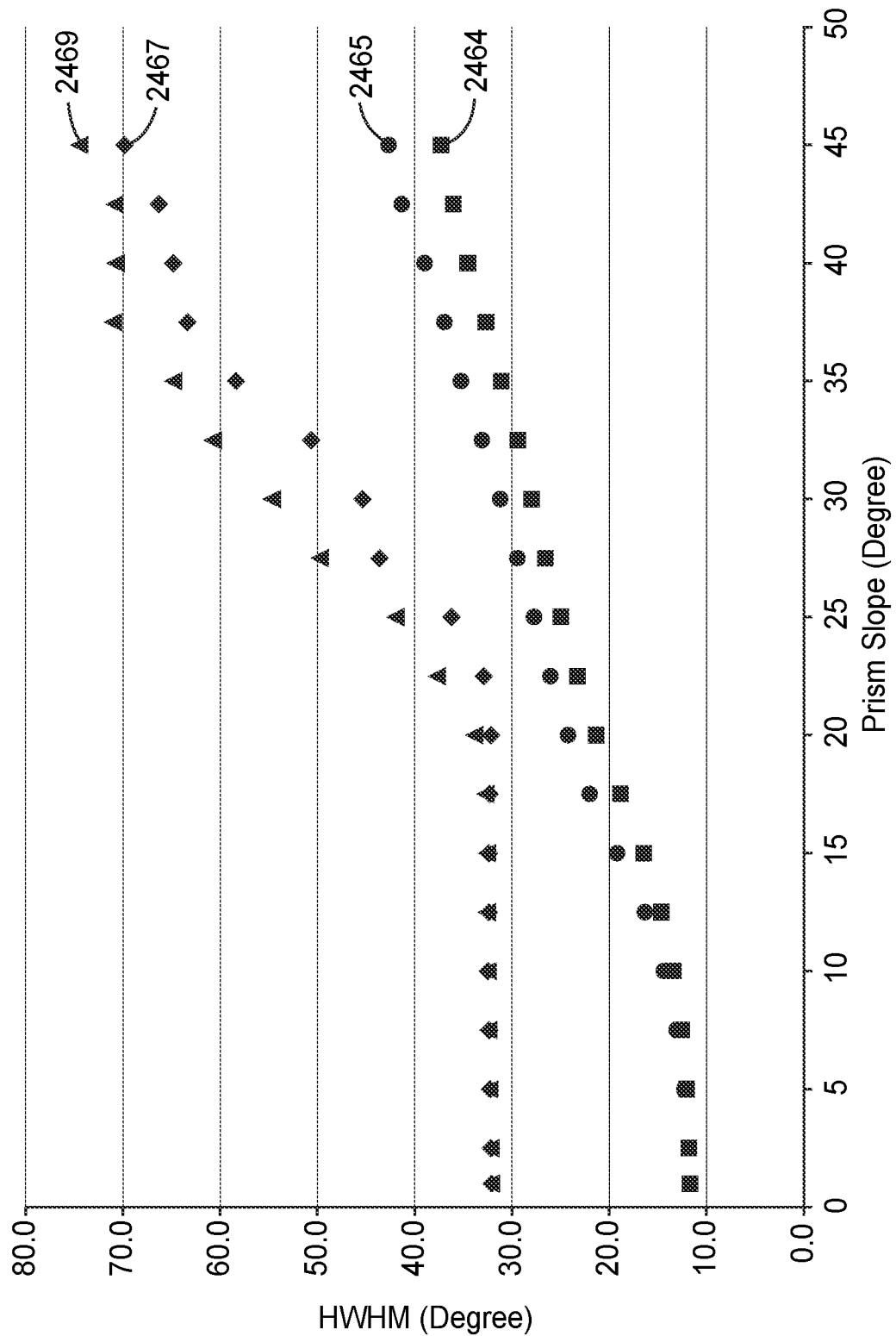
FIG. 24 is a plot of the half width at half maximum of an output distribution through an optical component having light redirecting structures versus the prism slope of the light redirecting structures.

FIG. 24 shows the results for HWHM of the light output from the optical component for the case of linear prisms (as in FIG. 16) facing towards the light source as a function of the prism slope. The case of a source HWHM of 12 degrees and a refractive index of 1.5 for the prisms and substrate is shown as data series 2464. The case of a source HWHM of 12 degrees and a refractive index of 1.6 for the prisms and substrate is shown as data series 2465. The case of a source HWHM of 30 degrees and a refractive index of 1.5 for the prisms and substrate is shown as data series 2467. The case of a source HWHM of 30 degrees and a refractive index of 1.6 for the prisms and substrate is shown as data series 2469.

For comparison, the HWHM of light output through a volume diffuser was calculated when light having a HWHM of 12 or 30 degrees was transmitted through the volume diffuser. The volume diffuser was modeled using a Henyey-Greenstein diffusion model. The model assumed a host material refractive index of 1.5 and a diffuser thickness of 1 mm. The model includes two further parameters, the scattering coefficient $\mu$ (having units of inverse length) and a dimensionless parameter g used in the Henyey-Greenstein scattering anisotropy function $p(\theta)$. The Henyey-Greenstein model is described, for example, in Kienle et al., "Determination of the scattering coefficient and the anisotropy factor from laser Doppler spectra of liquids including blood", Applied Optics, Vol. 25, No. 19, 1996. When the parameter g is zero, the scattering is isotropic, while g less than zero favors back scattering and g greater than zero favors forward scattering. When $\mu$ is approximately the inverse thickness of the diffuser, a large fraction of light rays incident on the diffuser pass through without scattering. This is referred to as punch-through. When is much larger than the inverse thickness of the diffuser, punch-through is eliminated and the scattered light distribution has is widest HWHM value for a given transmission value. Transmission and HWHM are fixed for constant values of the product of $\mu$ times (1-g) times the diffuser thickness. Transmission versus HWHM values were determined for randomly chosen parameters $\mu$ and g and results are shown in FIGS. 25-29. The thickly populated upper limits, shown as a dotted line in these figures, are sigmoidal curves delimiting the condition that $\mu$ is much larger than the inverse diffuser thickness.

Figure 25:
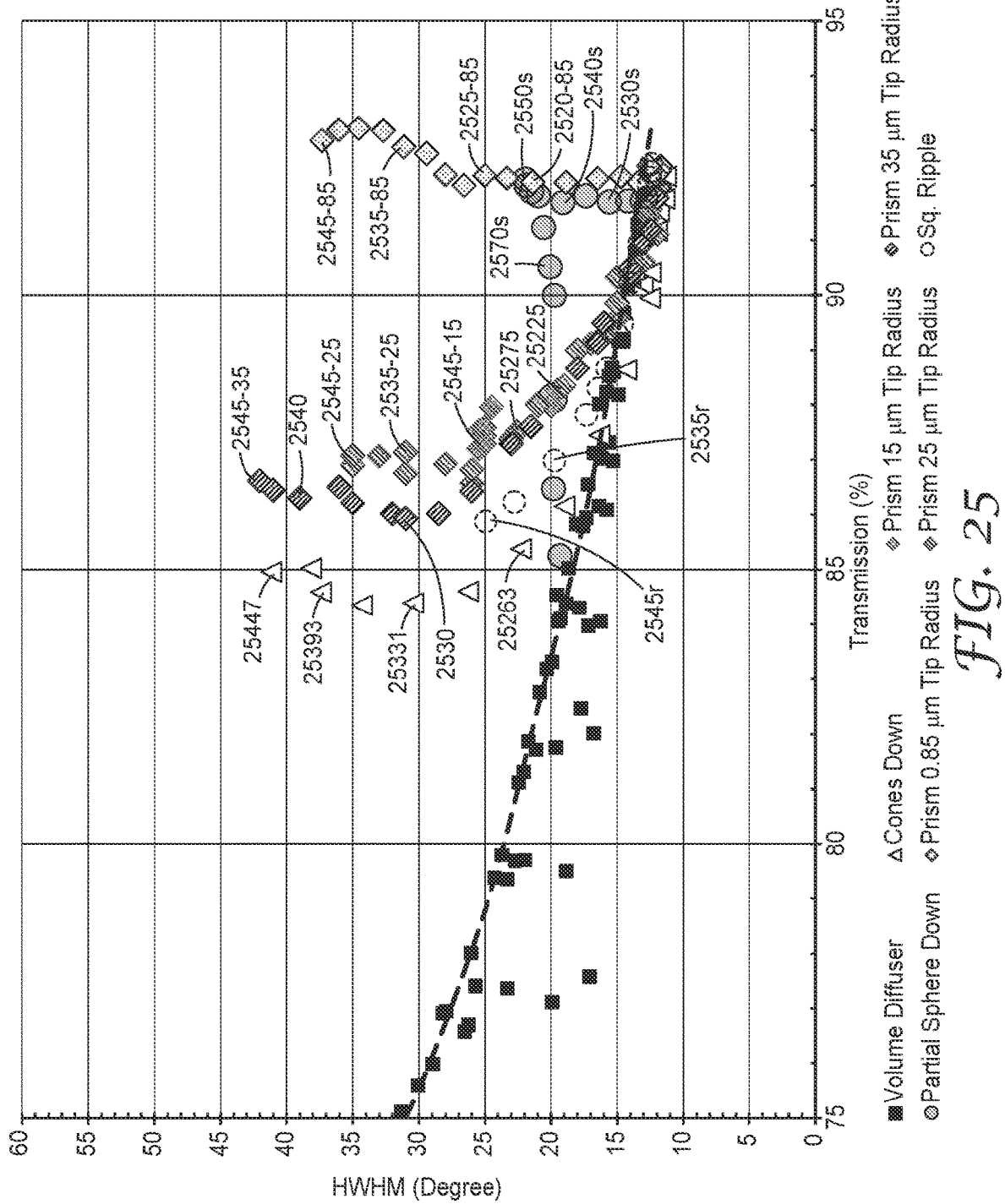
FIGS. 25-29 are plots of the half width at half maximum of the output distribution through an optical component versus the percent transmission through the optical component.
Figure 26:
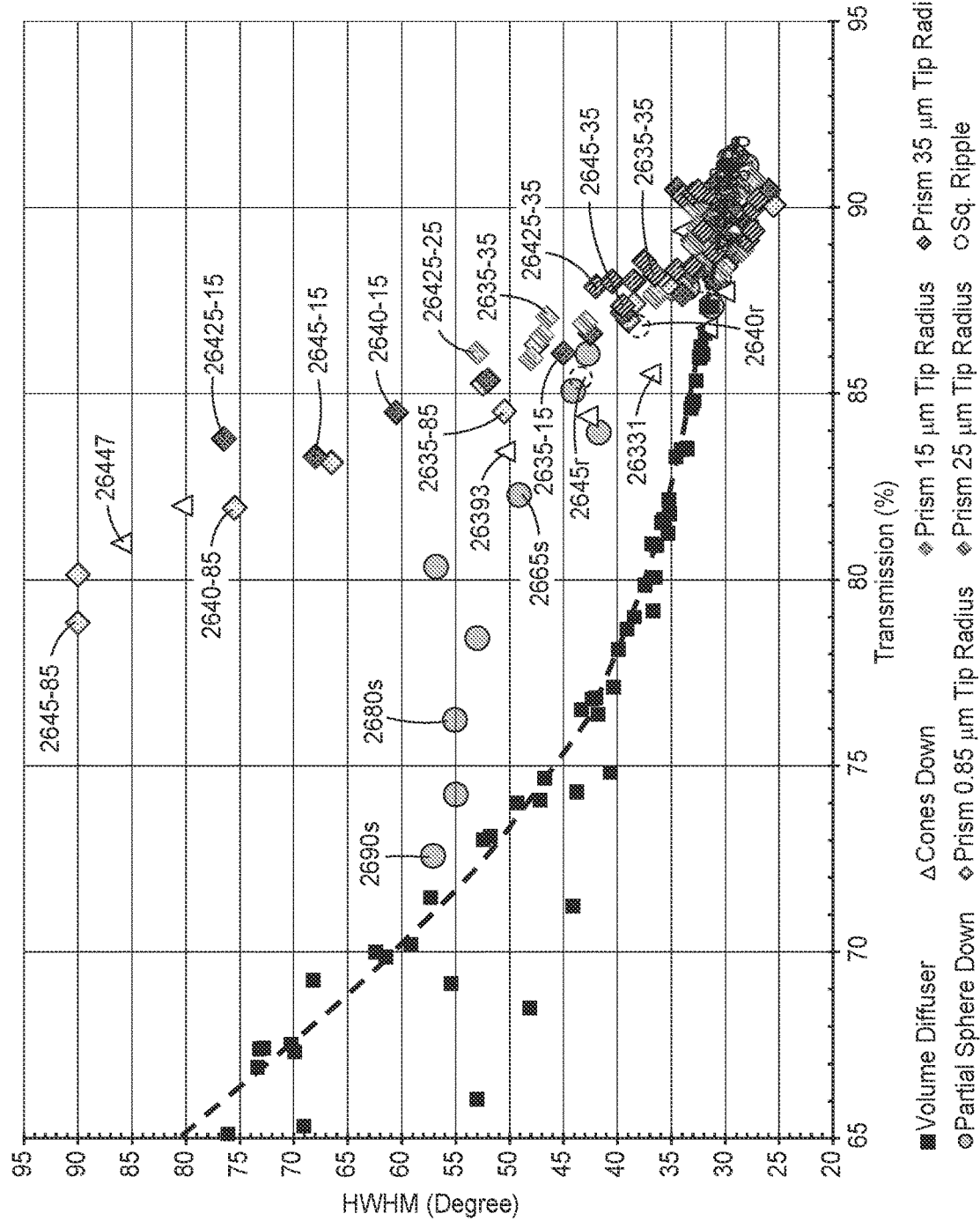

FIG. 25 shows results for the HWHM output as a function of the percent transmission when the input had a 12 degree HWHM and FIG. 26 shows results for the HWHM output as a function of the percent transmission when the input had a 30 degree HWHM. The percent transmission was not normalized in the graphs so the maximum is less than 100 percent due to Fresnel reflections. Results are shown for the volume diffuser and for various optical components having light redirecting structures. The light redirecting structures considered were partial spheres facing the light source, cones facing the light source, prisms with a 500 micrometer base facing the light source and having rounded tips with radius of curvature of 0.85 micrometers, 15 micrometers, 25 micrometers and 35 micrometers. Results for square ripples are also shown. Square ripples refer to random distribution of surface normal angles relative to the normal to the plane of the substrate that is constant up to a maximum angle and is zero for larger angles. The refractive index of the optical components was 1.5.

Referring to FIG. 25, the partial sphere data includes data point 2530s for a partial sphere half arc angle of 30 degrees, data point 2550s for a partial sphere half arc angle of 50 degrees, and data point 2570s for a partial sphere half arc angle of 70 degrees. The cone data includes data point 25263 for an apex angle of 26.3 degrees, data point 25331 for an apex angle of 33.1 degrees, data point 25393 for an apex angle of 29.3 degrees, and data point 25447 for an apex angle of 44.7 degrees. The results for prisms with 0.85 micrometer tip radius includes data point 2520-85 for a prism slope angle of 20 degrees, data point 2525-85 for a prism slope angle of 25 degrees, data point 2535-85 for a prism slope angle of 35 degrees, and data point 2545-85 for a prism slope angle of 45 degrees. The results for prisms with 15 micrometer tip radius includes data point 25225 for a prism slope angle of 22.5 degrees, data point 25275 for a prism slope angle of 27.5 degrees, and data point 2545-15 for a prism slope angle of 45 degrees. The results for square ripples include data point 2535r for a maximum angle of 35 degrees and data point 2545r for a maximum angle of 45 degrees.

Referring to FIG. 26, the partial sphere data includes data point 2565s for a partial sphere half arc angle of 65 degrees, data point 2680s for a partial sphere half arc angle of 80 degrees, and data point 2690s for a partial sphere half arc angle of 90 degrees. The cone data includes data point 26331 for an apex angle of 33.1 degrees, data point 26393 for an apex angle of 39.3 degrees, and data point 26447 for an apex angle of 44.7 degrees. The results for prisms with 0.85 micrometer tip radius includes data point 2635-85 for prisms having a prism slope angle of 35 degrees, data point 2640-85 for prisms having a prism slope angle of 40 degrees, and data point 2645-85 for prisms having a prism slope angle of 45 degrees. The results for prisms with 15 micrometer tip radius includes data point 2635-15 for prisms having a prism slope angle of 35 degrees, data point 2640-15 for prisms having a prism slope angle of 40 degrees, data point 26425-15 for prisms having a prism slope angle of 42.5 degrees, and data point 2645-15 for prisms having a prism slope angle of 45 degrees. The results for square ripples include data point 2640r for a maximum angle of 40 degrees and data point 2645r for a maximum angle of 45 degrees.

FIGS. 25-26 show that there is a wide range of surface structures that produce a higher transmission for a given HWHW output and/or produce a higher HWHM for a given transmission compared to a volume diffuser.

Figure 27:
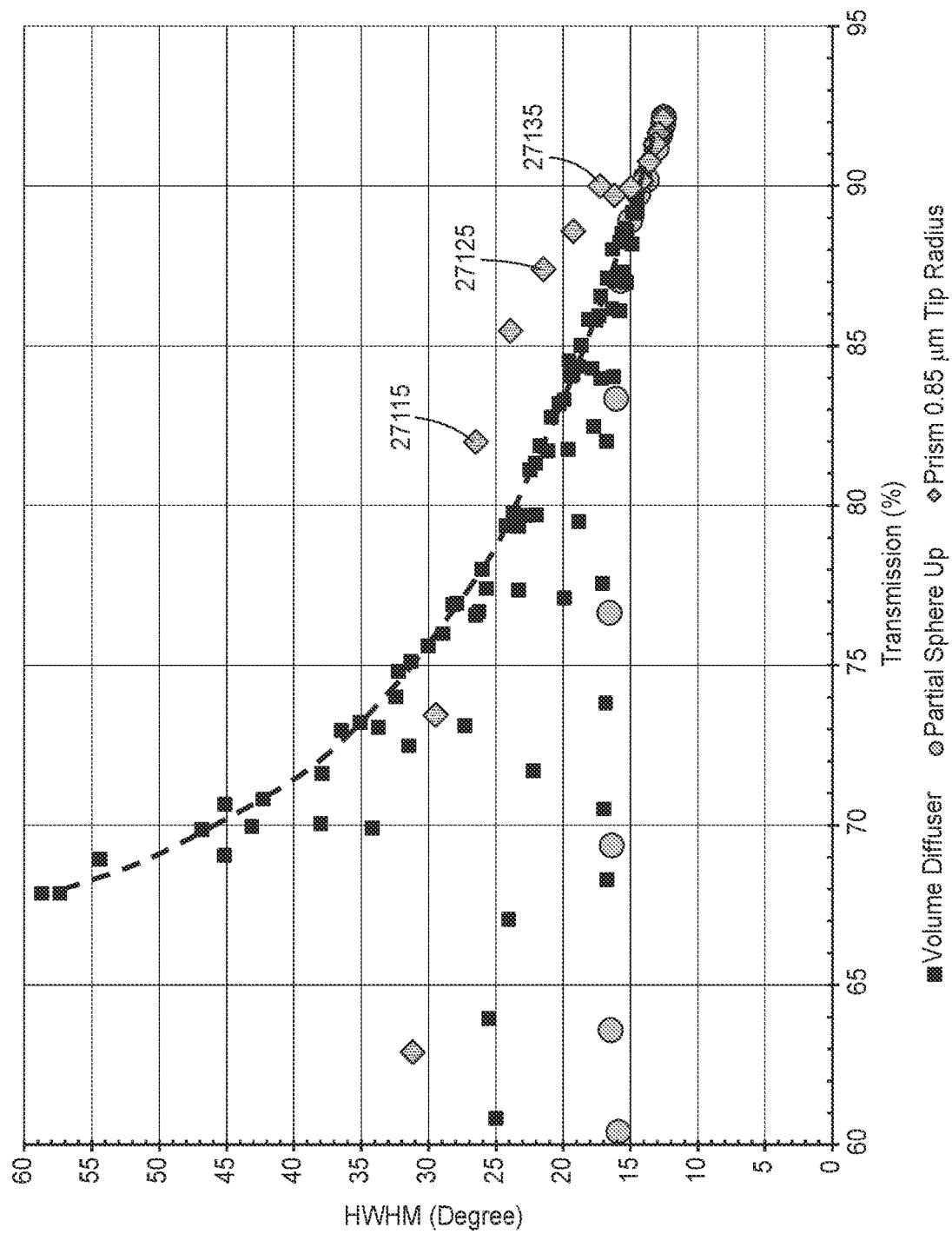

FIG. 27 shows results for the HWHM output as a function of the percent transmission when the input had a 12 degree HWHM and the structured surface of the optical component was facing away from the light source. Linear prisms having a base of 50 micrometers and tips with and 0.85 micrometer radius of curvature were modeled. Partial spheres were also included. The refractive indices of the optical component was 1.5. The results for the prisms include data point 27135 for prisms having an apex angle of 135 degrees, data point 27125 for prisms having an apex angle of 125 degrees, and data point 27115 for prisms having an apex angle of 115 degrees. The linear prisms gave higher transmission for a given HWHM compared to the volume diffuser at least for apex angles in the range of 115 degrees to 145 degrees.

Figure 28:
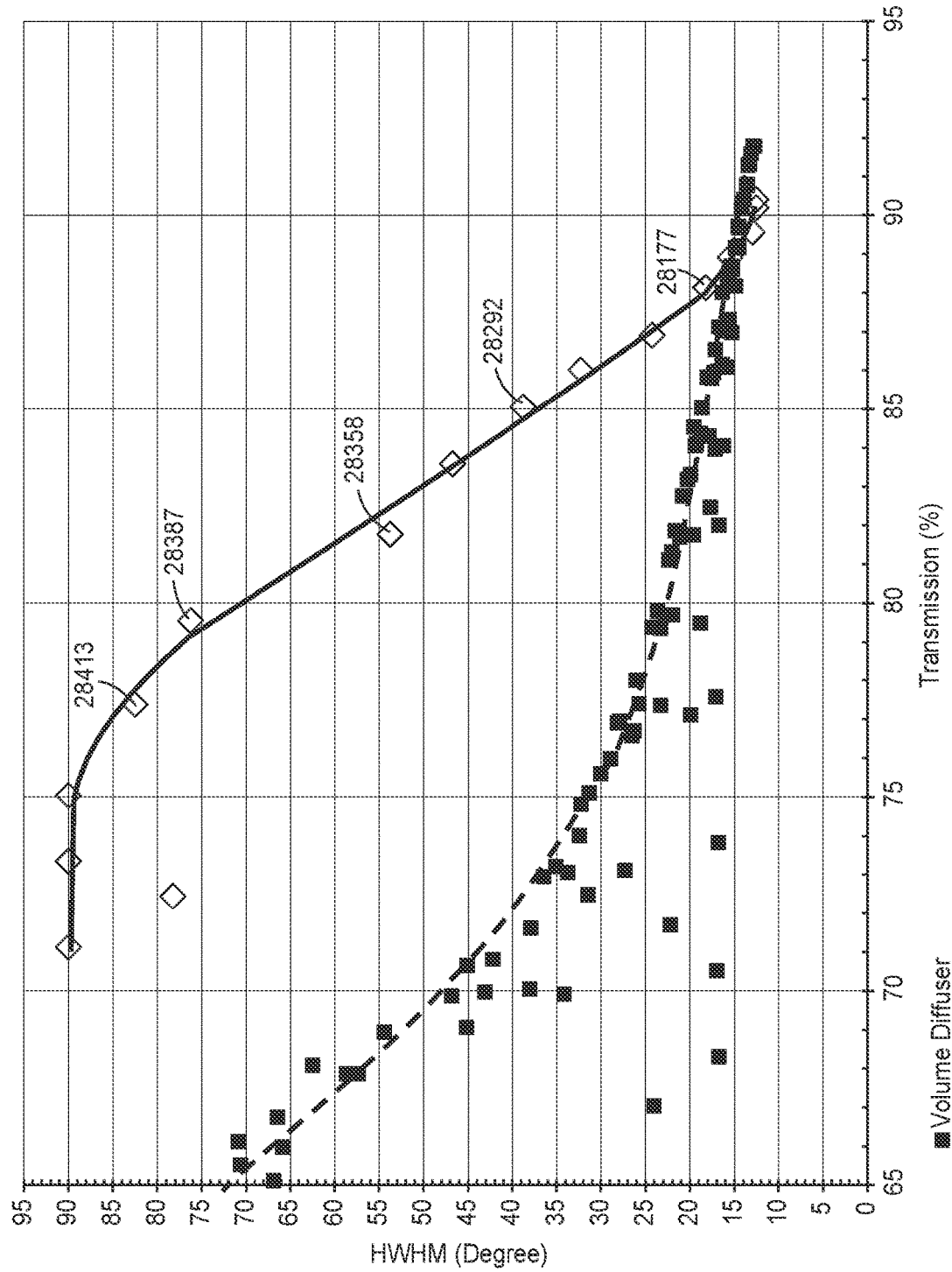
Figure 29:
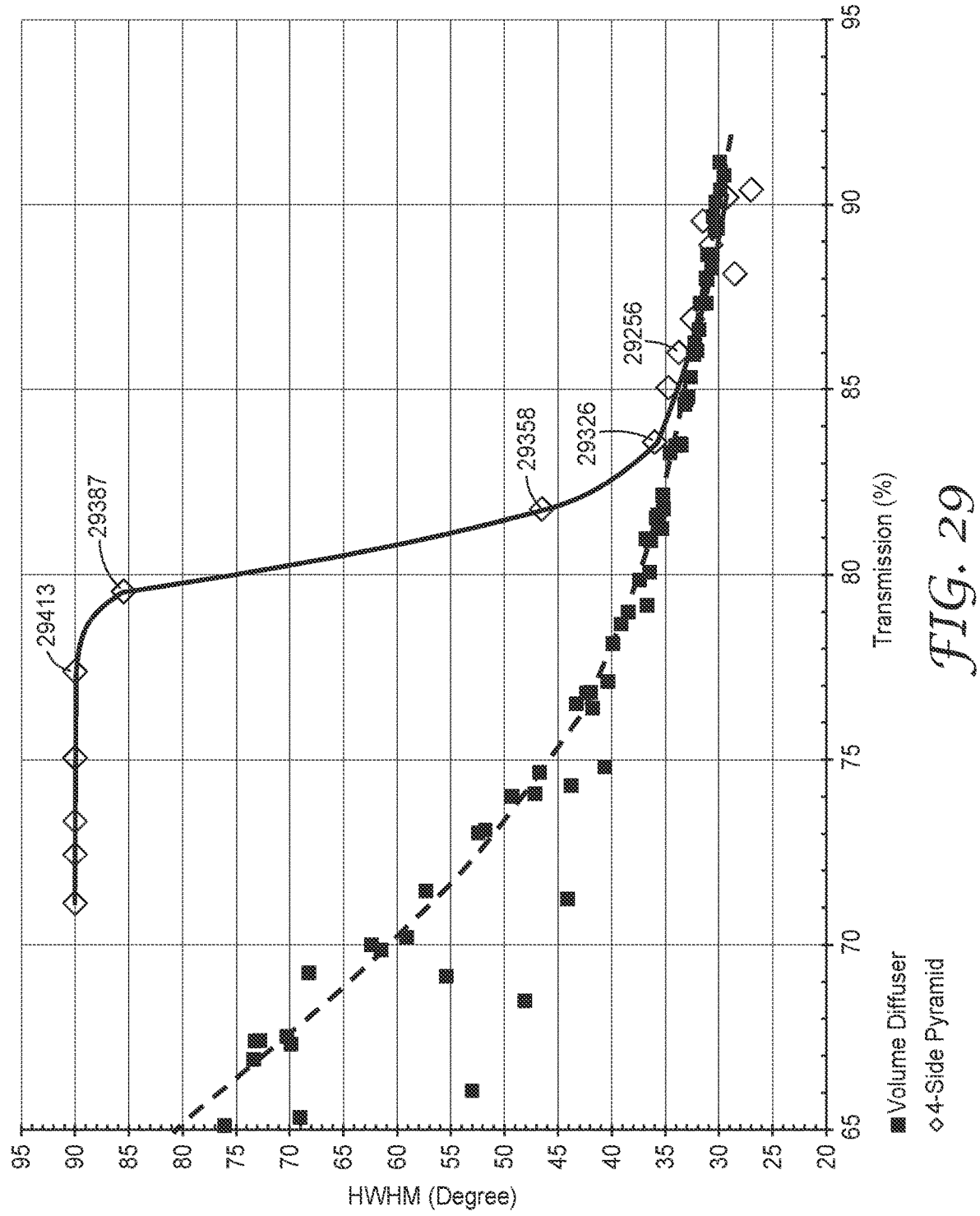

Optical components having pyramids with four sides facing toward the light source and arranged on a square lattice with no gaps between adjacent pyramids were modeled for input light having 12 and 30 degree HWHM. The sides of the pyramids had a slope relative to the plane of the substrate that was varied. The optical components had a refractive index of 1.5. Results are shown in FIG. 28 for 12 degree HWHM input and in FIG. 29 for 30 degree HWHM input. The results shown in FIG. 28 include data point 28177 for pyramids having sides with slopes of 17.7 degrees, data point 28292 for pyramids having sides with slopes of 29.2 degrees, data point 28358 for pyramids having sides with slopes of 35.8 degrees, data point 28387 for pyramids having sides with slopes of 38.7 degrees, and data point 28413 for pyramids having sides with slopes of 41.3 degrees. The results shown in FIG. 29 include data point 29256 for pyramids having sides with slopes of 25.6 degrees, data point 29326 for pyramids having sides with slopes of 32.6 degrees, data point 29358 for pyramids having sides with slopes of 35.8 degrees, data point 29387 for pyramids having sides with slopes of 38.7 degrees, and data point 28413 for pyramids having sides with slopes of 41.3 degrees.

The following is a list of exemplary embodiments of the present description.

Embodiment 1 is an optical system comprising:
 a lighting component;
 a switchable diffuser in optical communication with the lighting component, the switchable diffuser having at least a first state and a second state, the first state characterized by a first haze and the second state characterized by a second haze different from the first haze;
 a low absorbing optical component in optical communication with the lighting component and in optical communication with the switchable diffuser,
 wherein the low absorbing optical component includes opposing first and second outer surfaces, at least one of the first and second outer surfaces including light redirecting structures,
 wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

Embodiment 2 is an optical system comprising:
 a lighting component;
 a switchable diffuser in optical communication with the lighting component, the switchable diffuser having at least a first state and a second state, the first state characterized by a first haze and the second state characterized by a second haze different from the first haze;
 wherein the switchable diffuser includes an active layer disposed between a first outer layer and a second outer layer, the first outer layer having a first outer surface opposite the active layer, the second outer layer having a second outer surface opposite the active layer, the second outer layer facing the lighting component, at least one of the first and second outer surfaces including light redirecting structures;
 wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

Embodiment 3 is an optical system comprising:
 a lighting component;
 a switchable diffuser in optical communication with the lighting component, the switchable diffuser having at least a first state and a second state, the first state characterized by a first haze and the second state characterized by a second haze different from the first haze;

wherein the switchable diffuser includes an active layer disposed between a first outer layer and a second outer layer, the first outer layer having a first outer surface opposite the active layer, the second outer layer having a second outer surface opposite the active layer, a low absorbing optical component in optical communication with the lighting component and in optical communication with the switchable diffuser, the low absorbing optical component including opposing third and fourth outer surfaces, wherein at least one of the first, second, third and fourth outer surfaces includes light redirecting structures, wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that does not include the light redirecting structures.

Embodiment 4 is the optical system of any of embodiments 1 to 3, wherein an average direction of the light output of the optical system when the switchable diffuser is in the first state is the same as an average direction of a light output of the otherwise equivalent optical system when the switchable diffuser is in the first state.

Embodiment 5 is the optical system of any of embodiments 1 to 3, wherein an average direction of the light output of the optical system when the switchable diffuser is in the first state is different from an average direction of a light output of the otherwise equivalent optical system when the switchable diffuser is in the first state.

Embodiment 6 is the optical system of embodiment 1, wherein the switchable diffuser has a haze less than about 5 percent at all angles of incidence in the range of zero degrees to about 85 degrees when the switchable diffuser is in the first state.

Embodiment 7 is the optical system of embodiment 2 or 3, wherein the active layer has a haze less than about 5 percent at all angles of incidence in the range of zero degrees to about 85 degrees when the switchable diffuser is in the first state.

Embodiment 8 is the optical system of any of embodiments 1 to 3, wherein the FWHM of the light output of the optical system is increased in two orthogonal directions relative to that of the otherwise equivalent optical system.

Embodiment 9 is the optical system of any of embodiments 1 to 3, wherein the switchable diffuser includes a plurality of independently addressable regions.

Embodiment 10 is the optical system of embodiment 1 or 3, wherein the light redirecting structures include a first set of light redirecting structures in a first region of the low absorbing optical component and a second set of light redirecting structures in a second region of the low absorbing optical component different from the first region of the low absorbing optical component.

Embodiment 11 is the optical system of embodiment 10, wherein the first and second set of light redirecting structures have differing distributions of size, shape, spacing or slope.

Embodiment 12 is the optical system of embodiment 2 or 3, wherein the light redirecting structures include a first set of light redirecting structures in a first region of the switchable diffuser and a second set of light redirecting structures in a second region of the switchable diffuser different from the first region of the switchable diffuser.

Embodiment 13 is the optical system of embodiment 12, wherein the first and second set of light redirecting structures have differing distributions of size, shape, spacing or slope.

Embodiment 14 is the optical system of any of embodiments 1 to 3, wherein the light output is axially symmetric.

Embodiment 15 is the optical system of any of embodiments 1 to 3, wherein the light output is axially asymmetric.

Embodiment 16 is the optical system of any of embodiments 1 to 3, wherein the light redirecting structures have spatially regular distributions of size, shape and spacing.

Embodiment 17 is the optical system of any of embodiments 1 to 3, wherein the light redirecting structures have a spatially irregular distribution of at least one of size, shape and spacing.

Embodiment 18 is the optical system of any of embodiments 1 to 3, wherein the light redirecting structures include diffractive structures.

Embodiment 19 is the optical system of any of embodiments 1 to 3, wherein the light redirecting structures are configured to increase the full width at half-maximum (FWHM) of the light output in at least one direction by at least 10 degrees relative to that of the otherwise equivalent optical system.

Embodiment 20 is the optical system of embodiment 1, wherein the low absorbing optical component is disposed adjacent the switchable diffuser opposite the lighting component.

Embodiment 21 is the optical system of embodiment 3, wherein the low absorbing optical component is disposed adjacent the switchable diffuser opposite the lighting component.

Embodiment 22 is the optical system of any of embodiments 2, 20, or 21 wherein an air gap separates the switchable diffuser and the lighting component.

Embodiment 23 is the optical system of any of embodiments 1 to 3, wherein the switchable diffuser is spaced from the lighting component by a distance less than about 10 times a width of the switchable diffuser.

Embodiment 24 is the optical system of embodiment 1 or embodiment 3, wherein the light redirecting structures face the switchable diffuser.

Embodiment 25 is the optical system of embodiment 1 or embodiment 3, wherein the light redirecting structures face away from the switchable diffuser.

Embodiment 26 is the optical system of any of embodiments 1 to 3 further comprising an additional diffuser in optical communication with the lighting component.

Embodiment 27 is the optical system of embodiment 26, wherein the additional diffuser is an electrically switchable diffuser.

Embodiment 28 is the optical system of any of embodiments 1 to 3, wherein the switchable diffuser includes smectic A liquid crystal.

Embodiment 29 is the optical system of any of embodiments 1 to 3, wherein the lighting component includes one or more light emitting diodes.

Embodiment 30 is the optical system of any of embodiments 1 to 3, wherein the lighting component includes a light guide.

Embodiment 31 is a lighting system comprising:
one or more optical systems according to any of embodiments 1 to 3;
a controller configured to provide a diffuser control signal to one or more of the switchable diffusers of the one or more optical systems; and one or more sensors,
wherein the controller is configured to receive one or more signals from the one or more sensors.

Embodiment 32 is the lighting system of embodiment 31, wherein the one or more sensors include at least one of an optical sensor, an electrical sensor, a thermal sensor, an acoustical sensor, a pressure sensor, an electromagnetic sensor, a time sensor, a motion sensor, a proximity sensor, and an accelerometer.

Embodiment 33 is the lighting system of embodiment 31, wherein the controller is configured to change a state of one or more of the switchable diffusers of the optical systems in response to the one or more signals from the one or more sensors.

Embodiment 34 is the lighting system of embodiment 31, wherein the controller is configured to provide a lighting control signal to one or more of the lighting components of the one or more optical systems.

Embodiment 35 is the lighting system of embodiment 34, wherein the controller is configured to dim one or more of the lighting components of the one or more optical system during at least one change of state of one or more of the switchable diffusers of the one or more optical systems.

Embodiment 36 is a display comprising the optical system of any of embodiments 1 to 3.

Embodiment 37 is a display comprising the lighting system of embodiment 31.

Embodiment 38 is a sign comprising the optical system of any of embodiments 1 to 3.

Embodiment 39 is a sign comprising the lighting system of embodiment 31.

Embodiment 40 is a luminaire comprising the optical system of any of embodiments 1 to 3.

Embodiment 41 is a luminaire comprising the lighting system of embodiment 31.

Embodiment 42 is the optical system of embodiment 1 or embodiment 3, further comprising a lens, wherein the switchable diffuser is disposed between the lighting component and the low-absorbing optical component and the lens is disposed between the switchable diffuser and the low-absorbing optical component.

Embodiment 43 is the optical system of embodiment 42, wherein the lens is a total internal reflection lens.

Embodiment 44 is the optical system of any of embodiments 1 to 3, wherein the light redirecting structures are selected from the group consisting of lenslets, linear prisms, pyramids, cones, and combinations thereof.

Embodiment 45 is the optical system of embodiment 44, wherein the light redirecting structures are lenslets.

Embodiment 46 is the optical system of embodiment 45, wherein the lenslets are spherical caps or ellipsoidal caps.

Embodiment 47 is the optical system of any of embodiments 1 to 3, wherein at least about 60 percent of a surface area of the light redirecting structures have a surface normal that has an angle relative to a normal to a plane of a substrate comprising the light redirecting structures that is in a range of about 15 degrees to about 40 degrees.

Embodiment 48 is the optical system of any of embodiments 1 to 3, wherein at least about 80 percent of a surface area of the light redirecting structures have a surface normal that has an angle relative to a normal to a plane of a substrate comprising the light redirecting structures that is in a range of about 15 degrees to about 40 degrees.

Embodiment 49 is the optical system of any of embodiments 1 to 3, wherein the light redirecting structures include spherical caps facing the lighting component.

Embodiment 50 is the optical system of embodiment 49, wherein the spherical caps have a surface normal that has an angle relative to a normal to a plane of a substrate comprising the light redirecting structures, and the angle averaged over a surface area of the light redirecting structures is in a range of about 10 to about 30 degrees.

Embodiment 51 is the optical system of embodiment 49, wherein the spherical caps have a half arc angle in a range of about 30 degrees to about 40 degrees.

Embodiment 52 is the optical system of any of embodiments 1 to 3, wherein the light redirecting structures include spherical caps facing away from the lighting component.

Embodiment 53 is the optical system of embodiment 52, wherein the spherical caps have a surface normal that has an angle relative to a normal to a plane of a substrate comprising the light redirecting structures, and the angle averaged over a surface area of the light redirecting structures is in a range of about 20 degrees to about 55 degrees.

Embodiment 54 is the optical system of embodiment 52, wherein the spherical caps have a half arc angle in a range of about 35 degrees to about 90 degrees.

Embodiment 55 is the optical system of any of embodiments 1 to 3, wherein the light redirecting structures include linear prisms facing the lighting component.

Embodiment 56 is the optical system of embodiment 55, wherein the linear prism have an apex angle in a range of about 120 degrees to about 150 degrees.

Embodiment 57 is the optical system of any of embodiments 1 to 3, wherein the light redirecting structures include linear prisms facing away from the lighting component.

Embodiment 58 is the optical system of embodiment 57, wherein the linear prism have an apex angle greater than 90 degrees and less than about 150 degrees.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system comprising:
   a lighting component;
   a switchable diffuser in optical communication with the lighting component, the switchable diffuser having at least a first state and a second state, the first state characterized by a first haze and the second state characterized by a second haze different from the first haze, the switchable diffuser comprising opposing first and second outer surfaces;
   a low absorbing optical component in optical communication with the lighting component and in optical communication with the switchable diffuser, the low absorbing optical component including opposing third and fourth outer surfaces,
   wherein at least one of the first, second, third and fourth outer surfaces includes light redirecting structures, the light redirecting structures being spherical caps,
   wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that is equivalent to the optical system except that it does not include the light redirecting structures.

2. The optical system of claim 1, wherein the spherical caps face the lighting component, the spherical caps having a surface normal having an angle relative to a plane of a substrate comprising the light redirecting structures, the angle averaged over a surface area of the light redirecting structures being in a range of 10 degrees to 30 degrees.

3. The optical system of claim 1, wherein the spherical caps face away from the lighting component, the spherical caps having a surface normal having an angle relative to a plane of a substrate comprising the light redirecting structures, the angle averaged over a surface area of the light redirecting structures being in a range of 20 degrees to 55 degrees.

4. The optical system of claim 1, wherein the switchable diffuser includes a plurality of independently addressable regions.

5. The optical system of claim 4, wherein the light redirecting structures comprise first and second sets of light redirecting structures corresponding to respective first and second regions of the plurality of independently addressable regions, the first and second sets of light redirecting structures having different distributions of size, spacing or slope.

6. The optical system of claim 1, further comprising:
a controller configured to provide a diffuser control signal to the switchable diffuser; and
one or more sensors,
wherein the controller is configured to receive one or more signals from the one or more sensors.

7. The optical system of claim 6, wherein the one or more sensors comprise at least one of an optical sensor, an electrical sensor, a thermal sensor, an acoustical sensor, a pressure sensor, an electromagnetic sensor, a time sensor, a motion sensor, a proximity sensor, and an accelerometer.

8. The optical system of claim 6, wherein the controller is configured to change a state of the switchable diffuser in response to the one or more signals from the one or more sensors.

9. The optical system of claim 6, wherein the controller is configured to provide a lighting control signal to the lighting component.

10. The optical system of claim 9, wherein the controller is configured to dim the lighting component during at least one change of state of the switchable diffuser.

11. The optical system of claim 1, wherein the switchable diffuser is disposed in an optical volume defined by one or more reflective or transflective outer surfaces, each reflective or transflective outer surface configured to reflect at least 10 percent of a light energy incident on the reflective or transflective outer surface that is injected into the optical volume by the lighting component.

12. The optical system of claim 11, wherein the low absorbing optical component is disposed in the optical volume.

13. An optical system comprising:
a lighting component;
a switchable diffuser in optical communication with the lighting component, the switchable diffuser having at least a first state and a second state, the first state characterized by a first haze and the second state characterized by a second haze different from the first haze, the switchable diffuser comprising opposing first and second outer surfaces;
a low absorbing optical component in optical communication with the lighting component and in optical communication with the switchable diffuser, the low absorbing optical component including opposing third and fourth outer surfaces,
wherein at least one of the first, second, third and fourth outer surfaces includes light redirecting structures,
wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that is equivalent to the optical system except that it does not include the light redirecting structures, and
wherein the switchable diffuser and the low absorbing optical component are disposed in an optical volume defined by one or more reflective or transflective outer surfaces, each reflective or transflective outer surface configured to reflect at least 10 percent of a light energy incident on the reflective or transflective outer surface that is injected into the optical volume by the lighting component.

14. The optical system of claim 13, further comprising:
a controller configured to provide a diffuser control signal to the switchable diffuser; and
one or more sensors,
wherein the controller is configured to receive one or more signals from the one or more sensors.

15. The optical system of claim 14, wherein the one or more sensors comprise at least one of an optical sensor, an electrical sensor, a thermal sensor, an acoustical sensor, a pressure sensor, an electromagnetic sensor, a time sensor, a motion sensor, a proximity sensor, and an accelerometer.

16. The optical system of claim 14, wherein the controller is configured to change a state of the switchable diffuser in response to the one or more signals from the one or more sensors, and wherein the controller is configured to provide a lighting control signal to the lighting component.

17. The optical system of claim 13, wherein when the switchable diffuser is in the first state and the optical system produces a light output, an average direction of the light output of the optical system is the same as an average direction of a light output of the otherwise equivalent optical system.

18. A lighting system comprising:
a controller;
one or more sensors; and
one or more optical systems, each optical system comprising:
a lighting component;
a switchable diffuser in optical communication with the lighting component, the switchable diffuser having at least a first state and a second state, the first state characterized by a first haze and the second state characterized by a second haze different from the first haze, the switchable diffuser comprising opposing first and second outer surfaces;
a low absorbing optical component in optical communication with the lighting component and in optical communication with the switchable diffuser, the low absorbing optical component including opposing third and fourth outer surfaces,
wherein at least one of the first, second, third and fourth outer surfaces includes light redirecting structures,
wherein when the switchable diffuser is in the first state and the optical system produces a light output, the light redirecting structures are configured to increase the full width at half-maximum (FWHM) of the light output of the optical system in at least one direction by at least 5 degrees relative to that of an otherwise equivalent optical system that is equivalent to the optical system except that it does not include the light redirecting structures, and wherein the controller is configured to receive one or more sensor signals from the one or more sensors, and in response to the one or more sensor signals, the controller is configured to provide diffuser control signals to the switchable diffusers of the optical systems and to provide lighting control signals to the lighting components of the optical systems.

19. The lighting system of claim 18, wherein the one or more sensors comprise at least one of an optical sensor, an electrical sensor, a thermal sensor, an acoustical sensor, a pressure sensor, an electromagnetic sensor, a time sensor, a motion sensor, a proximity sensor, and an accelerometer.

20. The lighting system of claim 18, wherein for at least one optical system, the switchable diffuser is disposed in an optical volume defined by a reflective or transflective outer surface configured to reflect at least 10 percent of a light energy incident on the reflective or transflective outer surface that is injected into the optical volume by the lighting component, the reflective or transflective outer surface being a surface of revolution about an optical axis of the optical volume.

* * * * *